United States Patent
Araki et al.

(10) Patent No.: US 8,271,797 B2
(45) Date of Patent: Sep. 18, 2012

(54) SERVICE USE METHOD AND MANAGEMENT METHOD

(75) Inventors: Satoshi Araki, Tokyo (JP); Jun Moriya, Tokyo (JP); Toshikazu Minoshima, Kanagawa (JP); Junichi Nakamura, Chiba (JP); Naoki Yuasa, Chiba (JP); Shinsuke Yamashita, Kanagawa (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 10/561,187

(22) PCT Filed: May 18, 2004

(86) PCT No.: PCT/JP2004/007014
§ 371 (c)(1),
(2), (4) Date: Dec. 16, 2005

(87) PCT Pub. No.: WO2005/006203
PCT Pub. Date: Jan. 20, 2005

(65) Prior Publication Data
US 2006/0168651 A1  Jul. 27, 2006

(30) Foreign Application Priority Data

Jul. 14, 2003 (JP) ................. 2003-274302
Aug. 11, 2003 (JP) ................. 2003-291741
Sep. 4, 2003 (JP) ................. 2003-313167
Sep. 29, 2003 (JP) ................. 2003-338921

(51) Int. Cl.
H04L 29/06 (2006.01)
(52) U.S. Cl. ................. 713/182; 713/183; 726/2; 726/3; 726/4; 726/5; 726/6; 705/51; 708/135

(58) Field of Classification Search .................. 713/182, 713/183; 705/51; 726/2, 3, 4, 5, 6; 708/135
See application file for complete search history.

(56) References Cited

U.S. PATENT DOCUMENTS

| 6,574,611 B1 * | 6/2003 | Matsuyama et al. ............ 705/57 |
| 2002/0073102 A1 * | 6/2002 | Okamoto et al. ............. 707/200 |
| 2002/0083123 A1 * | 6/2002 | Freedman et al. ............ 709/203 |

(Continued)

FOREIGN PATENT DOCUMENTS
JP   63-228258   9/1988
(Continued)

OTHER PUBLICATIONS

U.S. Appl. No. 10/526,902, filed Aug. 16, 2005, Yamashita et al.

(Continued)

*Primary Examiner* — Nathan Flynn
*Assistant Examiner* — Sarah Su
(74) *Attorney, Agent, or Firm* — Oblon, Spivak, McClelland, Maier & Neustadt, L.L.P.

(57) ABSTRACT

A user sets an apparatus name easily identified by the user to a terminal, transmits the apparatus name together with user identification information to a terminal management server for managing a terminal, and the terminal management server registers the apparatus name as associated with the user identification information, thereby allowing the terminal management server to uniquely identify each terminal based on the apparatus name associated with the user identification information. Furthermore, a user can easily identify an apparatus name, thereby realizing a service utilizing system capable of reducing the laborious procedure of operating the terminal management server, and easily identifying each terminal.

30 Claims, 22 Drawing Sheets

U.S. PATENT DOCUMENTS

| | | | |
|---|---|---|---|
| 2002/0087892 A1* | 7/2002 | Imazu | 713/202 |
| 2002/0095571 A1* | 7/2002 | Bradee | 713/164 |
| 2002/0115449 A1* | 8/2002 | Allen | 455/456 |
| 2002/0184515 A1* | 12/2002 | Oho et al. | 713/193 |
| 2003/0037237 A1* | 2/2003 | Abgrall et al. | 713/166 |
| 2003/0115142 A1* | 6/2003 | Brickell et al. | 705/51 |
| 2003/0177073 A1* | 9/2003 | Ogai | 705/26 |
| 2003/0191964 A1* | 10/2003 | Satyavolu et al. | 713/201 |
| 2004/0068524 A1* | 4/2004 | Aboulhosn et al. | 707/200 |
| 2004/0117660 A1* | 6/2004 | Karaoguz et al. | 713/201 |
| 2004/0143661 A1* | 7/2004 | Higashi et al. | 709/224 |
| 2004/0148525 A1* | 7/2004 | Aida et al. | 713/201 |
| 2004/0165206 A1* | 8/2004 | Aoki et al. | 358/1.13 |
| 2004/0187018 A1* | 9/2004 | Owen et al. | 713/200 |
| 2004/0208500 A1* | 10/2004 | Kiyosu et al. | 396/549 |
| 2004/0249961 A1* | 12/2004 | Katsube et al. | 709/229 |
| 2005/0033699 A1* | 2/2005 | Umeo et al. | 705/56 |
| 2005/0060701 A1 | 3/2005 | Murase | |
| 2005/0091679 A1 | 4/2005 | Tanaka et al. | |
| 2006/0149970 A1* | 7/2006 | Imazu | 713/183 |
| 2008/0133716 A1* | 6/2008 | Rao et al. | 709/220 |
| 2009/0157531 A1* | 6/2009 | Bui | 705/27 |
| 2009/0234991 A1* | 9/2009 | Kale et al. | 710/72 |

FOREIGN PATENT DOCUMENTS

| | | |
|---|---|---|
| JP | 5-197687 | 8/1993 |
| JP | 7-212662 A | 8/1995 |
| JP | 11-205455 A | 7/1999 |
| JP | 2000-148845 | 5/2000 |
| JP | 2000-224207 A | 8/2000 |
| JP | 2000-285039 A | 10/2000 |
| JP | 2001-7824 A | 1/2001 |
| JP | 2002-197353 A | 7/2002 |
| JP | 2002-217945 A | 8/2002 |
| JP | 2002-268986 A | 9/2002 |
| JP | 2002-353968 A | 12/2002 |
| JP | 2003-52092 A | 2/2003 |
| JP | 2003-122376 | 4/2003 |
| JP | 2003-196563 | 7/2003 |
| JP | 2004-5181 A | 1/2004 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murse et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

TBL MANAGEMENT TABLE

| USER NAME | USER ID | PASSWORD | TERMINAL DEVICE | |
|---|---|---|---|---|
| | | | NAME | DISCLOSURE |
| USER A | yamada | pass000 | sakura | YES |
| | | | momo | NO |
| | | | sumire | YES |
| USER B | kato | 1234abcd | yuri | YES |
| | | | kaede | YES |
| ⋮ | ⋮ | ⋮ | ⋮ | ⋮ |

FIG. 7

17
```
KATO'S TERMINAL:
    >yuri
    >kaede
```

(A) DISPLAY VIEW OF DEVICE NAME OF USER B

17
```
YAMADA'S TERMINAL:
    >sakura
    >sumire
```

(B) DISPLAY VIEW OF DEVICE NAME OF USER A

FIG. 10

SERVICE USE METHOD AND MANAGEMENT METHOD

TECHNICAL FIELD

The present invention is related to a service utilizing method and management method, and is suitable, for example, for such an application as a service utilizing system in which management equipment identifies and manages individual terminal devices.

BACKGROUND ART

In some service utilizing systems in the past, the terminal management servers connected to a network are designed to identify individual terminal devices and to manage various kinds of information about them (refer to the patent document 1 for example).

In such a service utilizing system, a different ID (Identification) is given to each terminal device and is stored in its nonvolatile memory. When a terminal device communicates with various kinds of servers through the network, it sends its terminal ID to the servers.

The terminal management server of the service utilizing system is designed to identify each device with its ID sent from it and to communicate with it.

Patent Document 1: Japanese Patent Laid-Open No. 2003-85145 (P5; FIG. 1)

The service utilizing system in such a configuration, however, requires extra work to store a different terminal ID in each terminal device as well as the management of the terminal IDs of all the terminal devices by the terminal management server.

The terminal management server, therefore, needs to frequently update the terminal IDs under its responsibility in order to support all the terminal devices manufactured successively in the factories, which required extra work to operate the terminal management server and complicated the configuration of the service utilizing system as a whole.

Furthermore, the terminal ID was comprised of the combination of alphanumeric such as "ABC12345", which was easy for the terminal management server to identify a terminal device but was hard for the user to become familiar with and to identify it.

DISCLOSURE OF THE INVENTION

The present invention has been developed with the above-mentioned problems taken into account, and aims at providing a service utilizing system capable of reducing the laborious operations of a terminal management server and easily identifying an individual terminal by a user.

To solve the above-mentioned problems, the service utilizing method of the present invention includes: a registration information transmitting step of transmitting registration information which is externally input and includes user identification information for use in utilizing a service in the service utilizing apparatus, a password corresponding to the user identification information, and an apparatus name of the service utilizing apparatus to a management apparatus for managing the service utilizing apparatus; and a registration completion information receiving step of receiving registration completion information transmitted from the management apparatus after completing registration with the user identification information, the password, and the apparatus name associated in the registration information.

As a result, the service utilizing method can set a name easily identified by a user for a service utilizing apparatus, and can allow the management apparatus to identify each service utilizing apparatus based on the association between the user identification information and the name.

The service utilizing apparatus according to the present invention includes: registration information transmission means for transmitting registration information which is externally input and includes user identification information for use in utilizing a service in the service utilizing apparatus, a password corresponding to the user identification information, and an apparatus name of the service utilizing apparatus to a management apparatus for managing the service utilizing apparatus; and registration completion information reception means for receiving registration completion information transmitted from the management apparatus after completing registration with the user identification information, the password, and the apparatus name associated in the registration information.

As a result, the service utilizing apparatus can set a name easily identified by a user for a service utilizing apparatus, and can allow the management apparatus to identify each service utilizing apparatus based on the association between the user identification information and the name.

The service utilizing program according to the present invention includes: a registration information transmitting step of transmitting registration information which is externally input and includes user identification information for use in utilizing a service in the service utilizing apparatus, a password corresponding to the user identification information, and an apparatus name of the service utilizing apparatus to a management apparatus for managing the service utilizing apparatus; and a registration completion information receiving step of receiving registration completion information transmitted from the management apparatus after completing registration with the user identification information, the password, and the apparatus name associated in the registration information.

As a result, the service utilizing program can set a name easily identified by a user for a service utilizing apparatus, and can allow the management apparatus to identify each service utilizing apparatus based on the association between the user identification information and the name.

The management method according to the present invention is a method for managing a service utilizing apparatus for using a predetermined service, and includes: a registration information receiving step of receiving registration information which is transmitted from a service utilizing apparatus and includes user identification information for use in utilizing a service in the service utilizing apparatus, a password corresponding to the user identification information, and an apparatus name of the service utilizing apparatus; a registering step of registering the user identification information, the password, and the apparatus name in the received registration information as associated among them; and a registration completion information transmitting step of transmitting registration completion information indicating the completion of the registration of the user identification information, the password, and the apparatus name to the service utilizing apparatus when the registration is completed.

As a result, the management method can allow a service utilizing apparatus to set a name easily identified by a user, and can allow the management apparatus to identify each service utilizing apparatus based on the association between the user identification information and the name.

The management apparatus according to the present invention is an apparatus for managing a service utilizing apparatus for using a predetermined service, and includes: registration information reception means for receiving registration information which is transmitted from a service utilizing apparatus and includes user identification information for use in utilizing a service in the service utilizing apparatus, a password corresponding to the user identification information, and an apparatus name of the service utilizing apparatus; registration means for registering the user identification information, the password, and the apparatus name in the received registration information as associated among them; and registration completion information transmission means for transmitting registration completion information indicating the completion of the registration of the user identification information, the password, and the apparatus name to the service utilizing apparatus when the registration is completed.

As a result, the management apparatus can allow a service utilizing apparatus to set a name easily identified by a user, and can allow the management apparatus to identify each service utilizing apparatus based on the association between the user identification information and the name.

The management program according to the present invention includes: a registration information receiving step of receiving registration information which is transmitted from a service utilizing apparatus and includes user identification information for use in utilizing a service in the service utilizing apparatus, a password corresponding to the user identification information, and an apparatus name of the service utilizing apparatus; a registering step of registering the user identification information, the password, and the apparatus name in the received registration information as associated among them; and a registration completion information transmitting step of transmitting registration completion information indicating the completion of the registration of the user identification information, the password, and the apparatus name to the service utilizing apparatus when the registration is completed.

As a result, the management program can allow a service utilizing apparatus to set a name easily identified by a user, and can allow the management apparatus to identify each service utilizing apparatus based on the association between the user identification information and the name.

According to the present invention, the service utilizing apparatus can set a name easily identified by a user for a service utilizing apparatus, and can allow the management apparatus to identify each service utilizing apparatus based on the association between the user identification information and the name, thereby realizing a service utilizing method, a service utilizing apparatus, a service utilizing program, a management method, a management apparatus, and a management program capable of reducing the laborious operations of a management apparatus and easily identifying an individual service utilizing apparatus by a user.

BRIEF DESCRIPTIONS OF THE DRAWINGS

FIG. 7 is the simple illustration of the management table;

FIG. 10 is the simple illustration for the list of the descriptions of the device names;

BEST MODE FOR CARRYING OUT INVENTION

We are going to describe the details of the implementation of the present invention using the following figures.

(1) Embodiment 1

(1-1) Entire Configuration of Service Utilizing System

Figure 1:
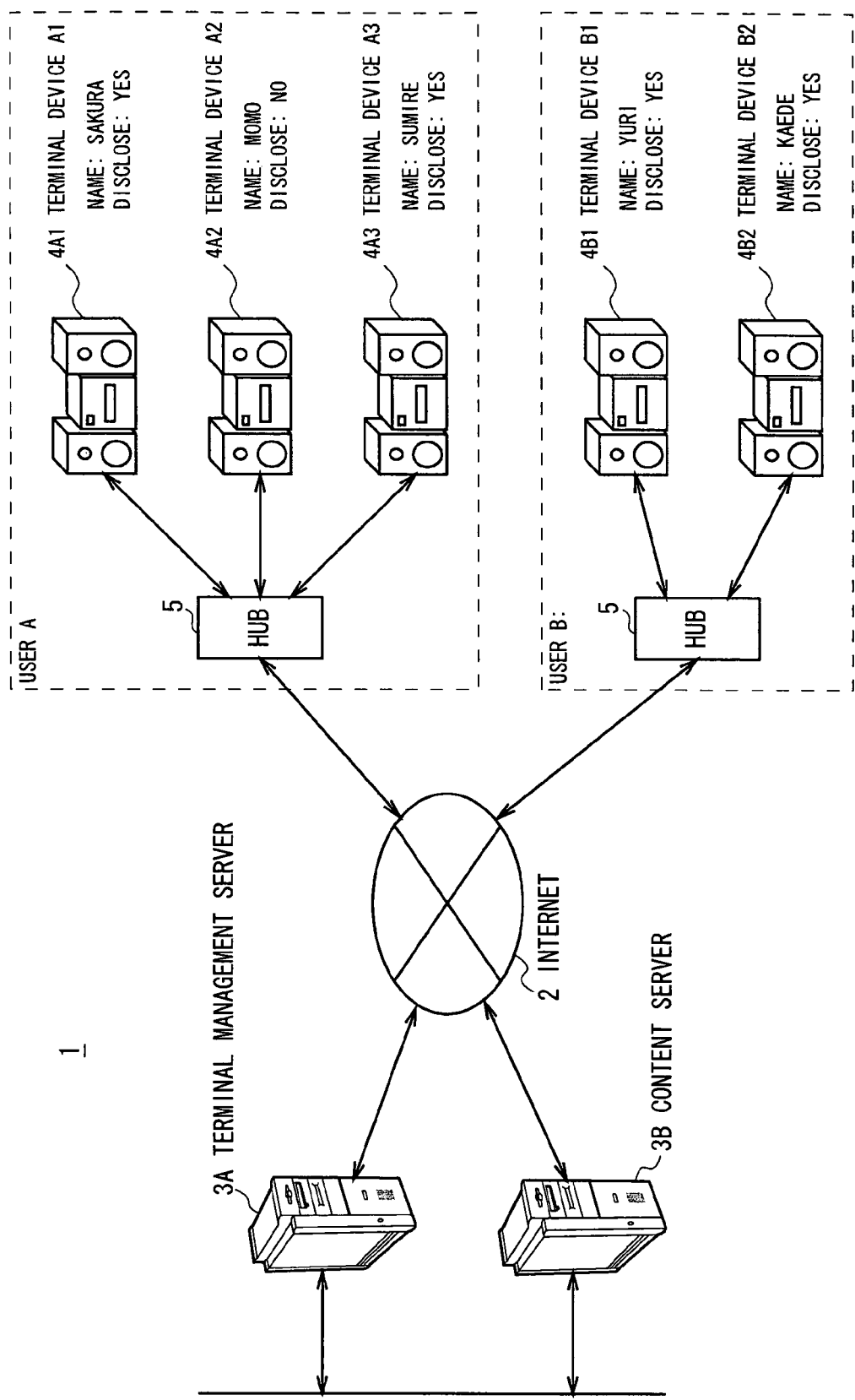
FIG. 1 is the illustration that shows the entire configuration of the service utilizing system in the No. 1 embodiment.

As for FIG. 1, (1) shows the service utilizing system that constitutes the present invention as a whole, in which the terminal management server 3A, the content server 3B and multiple terminal devices 4 are connected to the Internet 2 via HUB 5 or the like.

The terminal management server 3A is designed to manage the information of the terminal device 4 and that of the user who owns it.

The content server 3B is designed to store the content of music, for example, as data and to send the specified data to the terminal device in response to its request.

The terminal device 4 is designed not only to receive radiobroadcast or to play back CDs (Compact Discs) but also to receive content data from the above-mentioned content server 3B and to play it back.

(1-2) Configuration of Terminal Management Server

Figure 2:
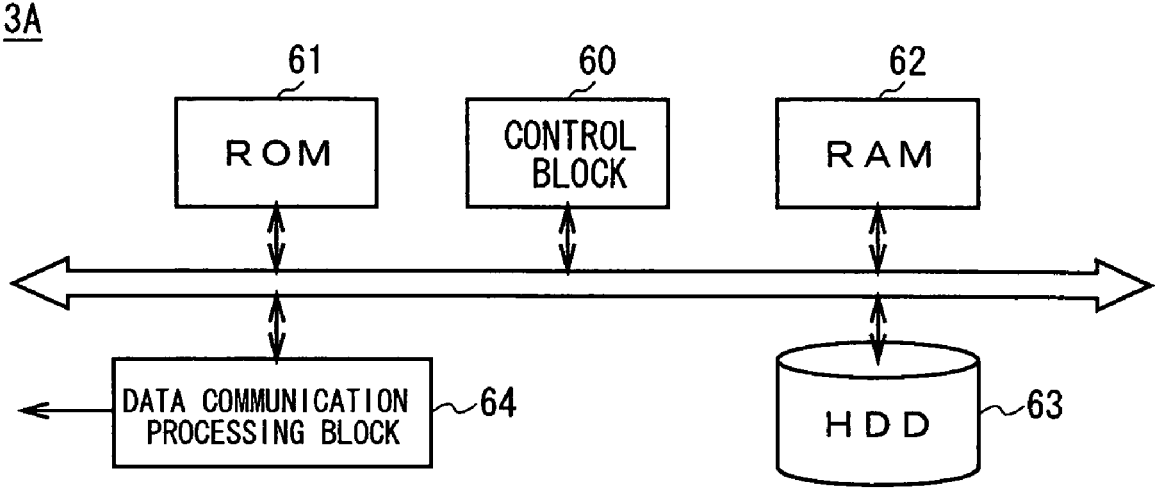
FIG. 2 is the simplified block diagram that shows the configuration of the terminal management server.

As FIG. 2 shows, the terminal management server 3A is designed to control the entire system and to carry out given calculation with its control block 60 consisting of a CPU (Central Processing Unit), based on the basic programs such as Operating System and various application programs started through the ROM (Read Only Memory) 61 and the RAM (Random Access Memory) 62.

This terminal management server 3A, which stores the management table TBL (to be discussed in detail later) in its hard disk drive (HDD) 63, is designed to register to or to delete from the management table TBL the information of the user and terminal device 4 in compliance with the request of registration or deletion from the terminal 4.

The terminal management server 3A, which is also connected to the content server 3B (FIG. 1), is designed to be able to read the information of the terminal device 4 and its user from the management table TBL and to provide the content server 3B with the information through the data communication processing block 64 when it accepts the request for the content from the terminal device 4.

(1-3) Configuration of Content Server

Figure 3:
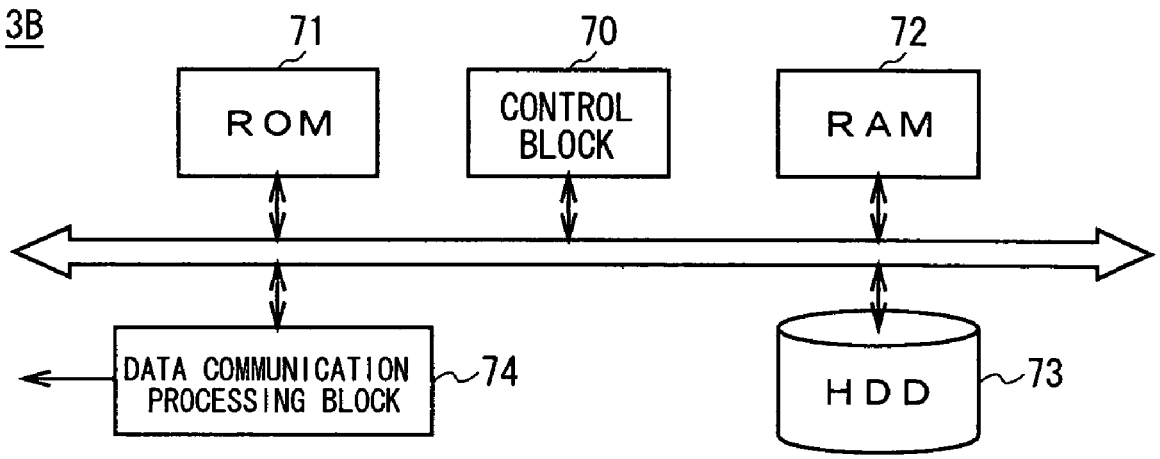
FIG. 3 is the simplified block diagram that shows the configuration of the content server.

As FIG. 3 shows, the content server 3B is designed to control the entire system and to carry out given calculation with its control block 70 consisting of a CPU based on the basic program such as Operating System and various application programs started through the ROM 71 and the RAM 72.

The content server 3B stores the content of music, for example, in the hard disk drive 73 as data.

The content server 3B, which is also connected to the terminal management server 3A (FIG. 1), is designed to be able to obtain the information of content data or information of the terminal device 4 that receives the content data through the data communication processing block 74 and to send the specified content data to the specified terminal device 4 when the terminal management server 3A has accepted the request of the content data from the terminal device 4.

(1-4) Circuitry of Terminal Device

Figure 4:
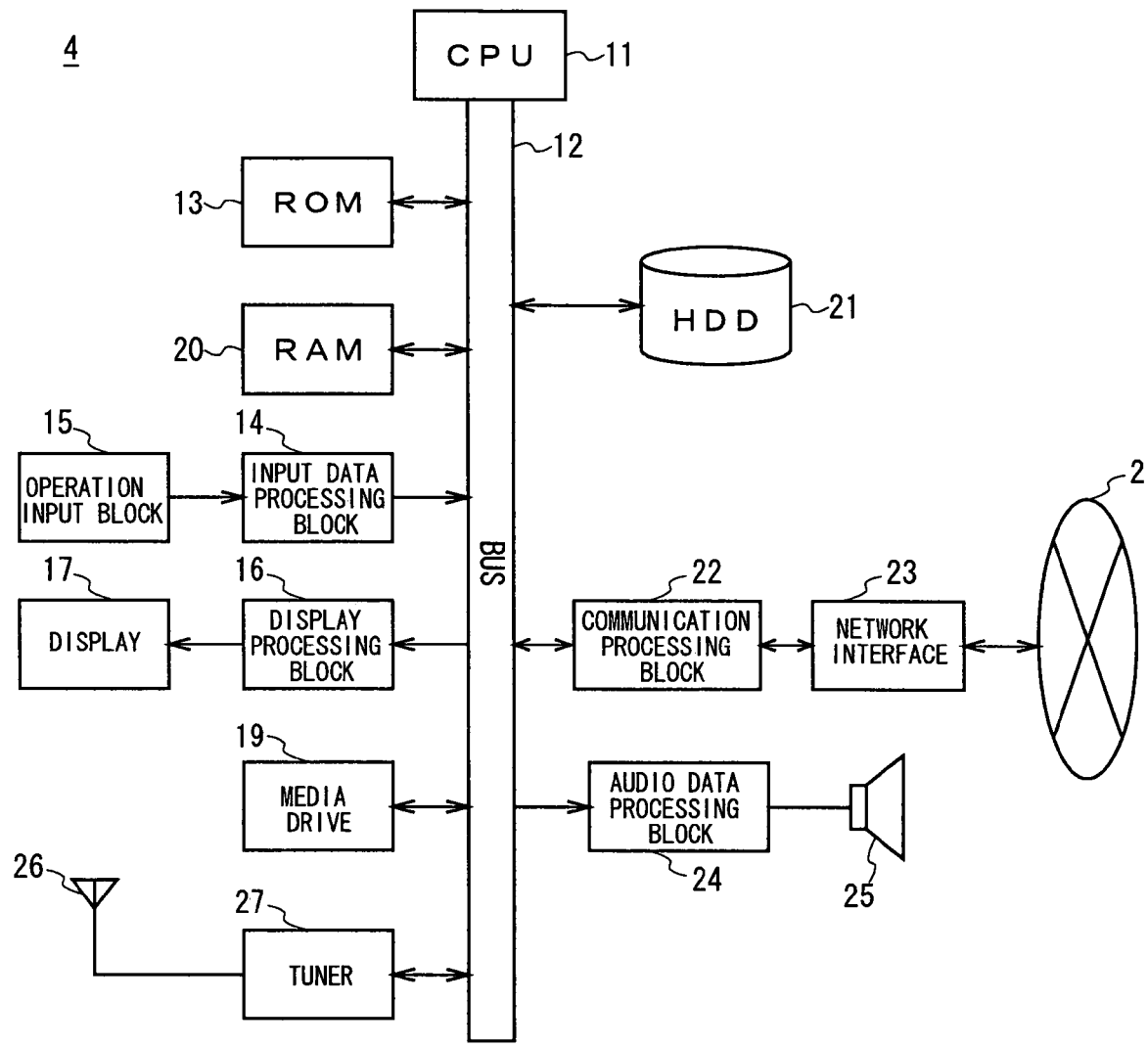
FIG. 4 is the simplified block diagram that shows the circuitry of the terminal device.

As FIG. 4 shows, the CPU 11 of the terminal device 4 is to control the entire system and to carry out given calculation based on the basic program such as Operating System and various application programs read from the ROM 13 connected through the bus 12 and extracted to the RAM 20. Specifically, it carries out communications through the network 2, the input/output operation of the user, the playback of the content from media, the writing of the content downloaded from the content server 3B to the hard disk drive 21 and its control.

The input operation block 15 is designed to send the input information of the user operation with various operation buttons on the cabinet of the main unit and on the remote controller (not illustrated) to the input data processing block 14, to carry out given processing at the input data processing block 14, to send the results of processing to the CPU 11 as a operation command and to carry out the processing with the CPU 11 in accordance with the operation command.

The display 17, which may be a liquid crystal display directly installed on the cabinet of the main body or an external display device, is designed to show the results of processing by the CPU 11 and various kinds of information.

The media drive 19, which may even be a drive for the playback of a Memory Stick (R) instead of a CD or a flash memory, is designed to output, as the playback results, the analog signals converted through digital-analog conversion processing with the audio data processing block 24 through the two-channel speaker 25.

When the data played back through the media drive 19 is audio content, the CPU 11 is also capable of storing it as an audio data file in the hard disk drive 21.

The CPU 11 can also read multiple still images recorded to the memory stick with the media drive 19 and show them on the display 17 as a slide show through the display processing block 16.

The CPU 11 can also read randomly multiple pieces of music stored in the hard disk drive 21 and play them back in the order desirable for the user just like he/she can do with a jukebox.

The tuner block 27, even if it is an AM and/or FM radio tuner, demodulates the broadcast signals received with the antenna 26 under the control of the CPU 11 and outputs the demodulated signals as broadcast audio from the speaker 25 via the audio data processing block 24.

The communication processing block 22 is designed to encode the transmit data under the control of the CPU 11, to send it to the external network-compliant equipment via the network 2 through the network interface 23, to decode the data received from the external network-compliant equipment through the network interface 23 and to transfer it to the CPU 11.

(1-5) Directory Management of Content

Figure 5:
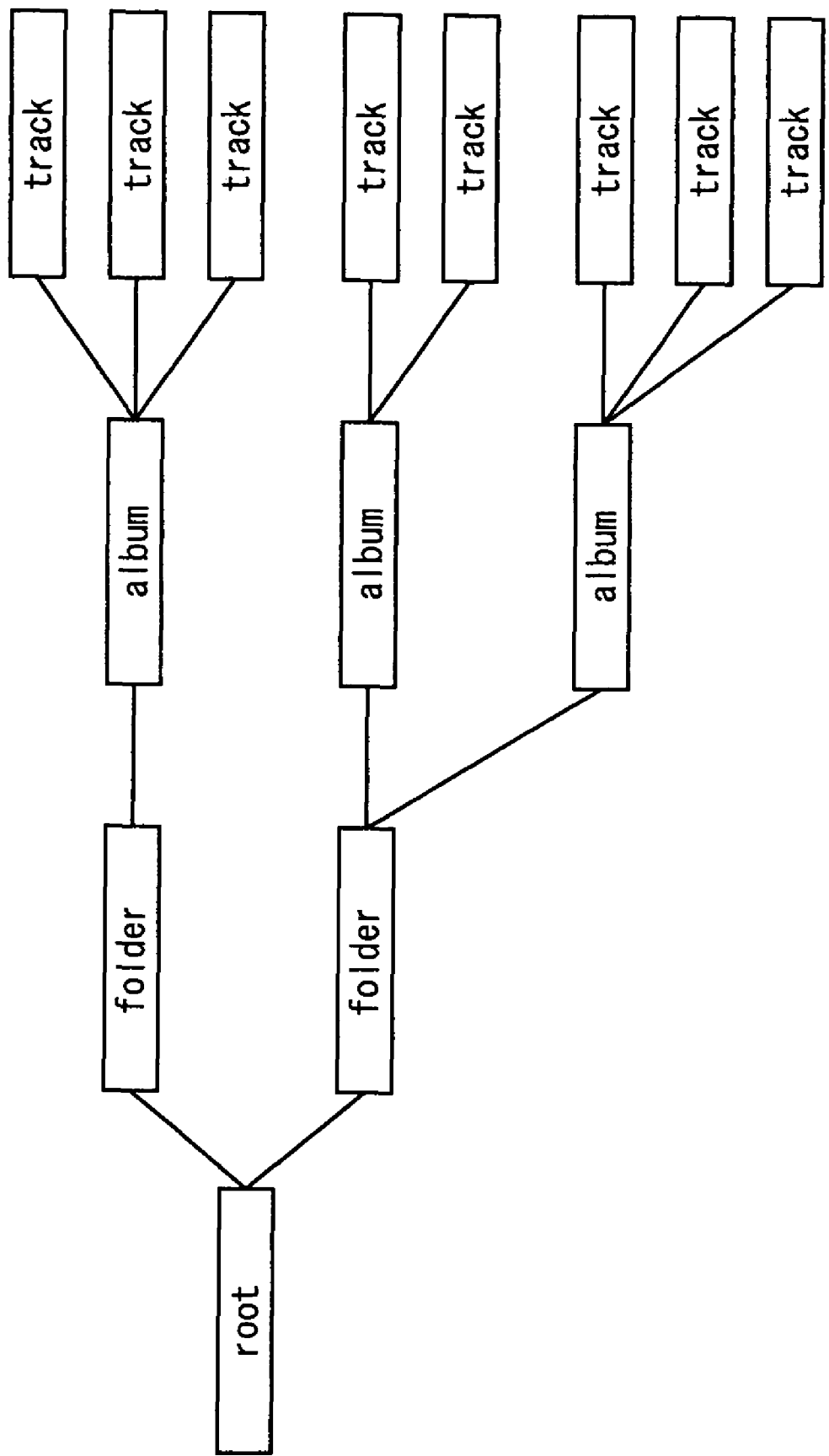
FIG. 5 is the simple illustration of the directory structure.

The CPU 11 of the terminal device 4 is designed to manage the content to be stored in the hard disk drive 21 in the directory structure shown in FIG. 5. In the lower layer of the "root" directory, the given number, but within a stipulated range, of "folder" directories is created. These "folder" directories are to be created in compliance with the category of content or its users.

In the lower layer of the "folder" directory, the given number, but within a stipulated range, of "album" directories is to be created, each of which is to correspond to each album title. In the lower layer of these "album" directories, one or more "track" files that belong to the "album" directory are stored, constituting one piece of music, namely content.

The directory of such content is to be managed by the database file stored in the hard disk drive 21.

(1-6) Program Module Configuration of Terminal Device

Figure 6:
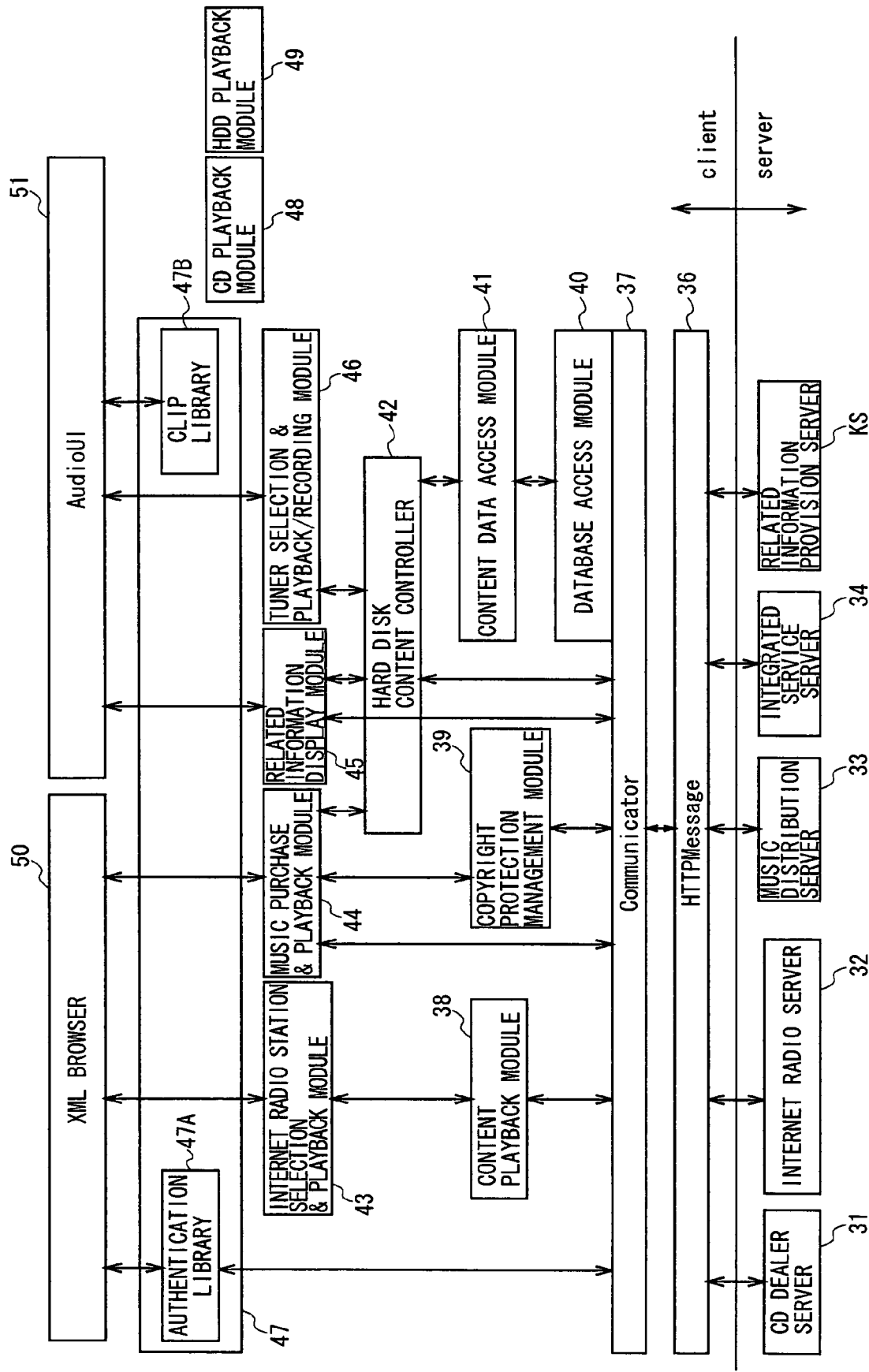
FIG. 6 is the simple illustration of the program modules of the terminal device.

The terminal device 4, of which programs is modularized to run on OS as shown in FIG. 6, exchanges data with various servers, specifically the CD dealer server 31 that sells CDs, the Internet radio server 32, the music distribution server 33 including the content server 3B, the integrated service server 34 including the terminal management server 3A and the related information provision server KS.

The HTTP (Hyper Text Transfer Protocol) message program is the program that communicates with various servers including the CD dealer server 31 that sell CDs, the integrated service server 34 that provides various kinds of integrated services and the related information provision server KS with the HTTP communications, while the communicator program 37 is the communication module that carries out various types of communications with the integrated service server 34 and others.

In the upper layer of the communicator program 37, the content playback module 38 that interprets Codec of content and plays back the outcomes, and the copyright protection information management module 39 that deals with the information of copyright protection exist. There also exist respectively the Internet radio station selection & playback module 43 that selects an Internet radio station and plays back music for the content playback module 38 and the copyright protection information management module 39, and the music purchase & playback module 44 that controls the purchase of music and the playback of test-listening music.

In the upper layer of those Internet radio station selection & playback module 43 and the music purchase & playback module 44, exists the XML (eXtensible Markup Language) browser 50, which interprets the XML files from various servers and shows the outcomes on the display 17.

The music that has been selected by the user through an XML browser 50, for example, is purchased with the music purchase & playback module 44 and is written to the hard disk drive 21 through the hard disk content controller 42.

The communicator program 37 is connected to the authentication library 4 of the library 47 so that the authentication library 47A can authenticate the integrated service server 34 and other servers.

In the upper layer of the communicator program 37, the database access module 40, the content data access module 41 and the hard disk content controller 42 exist as well.

This database access module 40 is to access various databases built in the hard disk drive 21, the content data access module 41 is to access the content saved in the hard disk drive 21 and the hard disk content controller 42 is to manage the content saved in the hard disk drive 21.

In the upper layer of the hard disk content controller 42, the related information display module 45 that is to show the title and artist name of the music broadcast by a radio station (not illustrated) and the tuner selection & playback/recording module 46 that selects a radio station (not illustrated) or records the content of the music received from the radio station to the hard disk drive 21 exist.

The music received from the radio station selected through the audio user interface 51 is to be written to the hard disk drive 21 through the content data access module 41.

The related information display module 45 receives, with the tuner selection & playback/recording module 46, the title and artist name of the music currently broadcast by a radio station as related information from the related information provision server KS via the HTTP message 36, and displays it on the display 17 via the audio user interface (UI) 51.

The related information displayed on the display 17 via the audio user interface 51 can also be saved temporarily to the clip library 47B of the library 47, and is to be finally saved to the hard disk drive 21 via the database access module 40 in compliance with the instructions from the user.

The program modules of the terminal device 4 contains the CD playback module 48 for the playback of CDs and the HDD playback module 49 for the playback of the hard disk drive 21, and outputs the playback results through the audio data processing block 24 and the speaker 25.

(1-7) Managing Device Names

Next, we will explain the management of the information of the users and the terminal device 4 with the terminal management server 3A.

The service utilizing system 1 is designed to allow the management server 3 to manage collectively the information of the user who owns the terminal device 4 and the owner to register a given user ID and password to the management server 3.

For information, the service utilizing system 1 is designed to allow the user to obtain a desirable user ID as far as it does not overlap others.

The service utilizing system 1 is designed to allow one user to own multiple terminal devices 4 and to allow the owner to register given names for them (hereinafter referred to as "device name").

The user, therefore, can select user-friendly device names such as "sakura" or "momo", which enables the user to identify easily his/her terminal devices 4.

The service utilizing system 1 is designed to allow also the user to set whether he/she discloses the existence of the terminal device(s) 4 to other users (hereinafter referred to as "disclosure settings").

The terminal management server 3A is to store the management table TBL in the hard disk drive 63 (FIG. 3) as shown in FIG. 7 as it manages the device name and disclosure settings of each terminal device 4 by associating them with the information of the user who owns the terminal device 4.

This management table TBL contains the user ID "yamada" specified by the user and the corresponding password "PASS000" as the information of the user name "User A".

The terminal management server 3A stores the information of all the terminal devices 4 owned by the user with this user ID in association with each user ID. For example, it is designed to store 3 terminal devices 4, "sakura" (terminal device 4A1), "momo" (terminal device 4A2) and "sumire" (terminal device 4A3) as the device names of the user ID "yamada" of the user A together with "Yes" or "No" about the disclosure settings of each device.

For information, as the service utilizing system 1 manages the device name in association with the user ID, it is designed to allow another user to set the same device name. It allows, for example, the user B to name his/her 3rd terminal device 4 as "sakura", the same name as that of the terminal device 4A1 of the user A.

The service utilizing system 1 is designed to be able to delete the registered device names and disclosure settings so that it allows another user to whom the terminal device 4 may be transferred later to register again a device name as he/she likes.

In this way, the user can name the terminal device 4 as he/she likes and register or delete it on the service utilizing system 1.

(1-7-1) Registering Device Names

Next, we are going to explain the procedure of registering the device name and disclosure settings to the terminal device 4A1 with the user operation, and that of registering the device name when you register the device name and disclosure settings of the terminal device 4 to the management table TBL of the terminal management server 3A.

Figure 8:
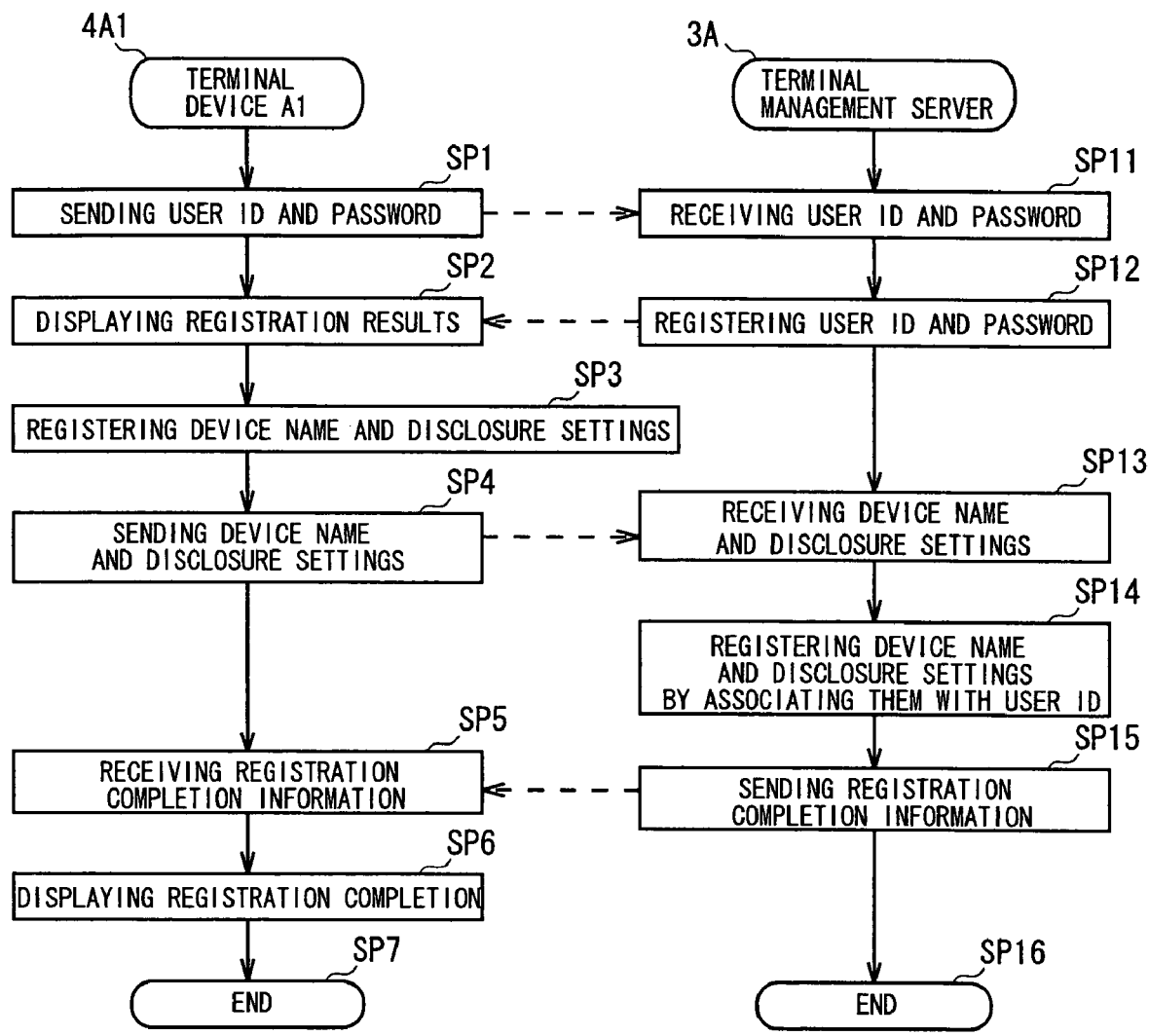
FIG. 8 is the sequence chart that shows the registration processing of the device names of the present invention.

As FIG. 8 shows, at the step SP1, the CPU 11 of the terminal device 4A1 sends the user ID and password to the terminal management server 3A as part of the registration information in order to register the user ID and password entered by the operation of the user A, and the processing proceeds to the next step SP2.

For information, all the communications between the terminal device 4 and the terminal management server 3A are carried out with SSL (Secure Socket Layer) in order to prevent information from leaking to the third parties In line with such security protection measures, the control block 60 of the terminal management server 3A receives the user ID and password as part of the registration information at the step SP11, and the processing proceeds to the next step SP12.

At the step SP12, the control block 60 compares the received user ID and password with those in the management table TBL, checks that the overlapping user ID does not exist, registers the user ID and notifies the terminal device 4A1 of the completion of the registration as the user registration completion information, and the processing proceeds to the next step SP13.

If the overlapping user ID exists at this step, the control block 60 sends to the terminal device 4 the message prompting the user to input another user ID and lets the terminal device 4 send the new user ID and password that the user re-entered.

At the step SP2, the CPU 11 of the terminal device 4A1 shows the completion of the registration of the user ID on the display 17 in accordance with the received user registration completion information, and the processing proceeds to the step SP3.

At the step SP3, the CPU 11 stores the device name and disclosure settings in the hard disk drive 21 of the terminal device 4A1 in accordance with the predetermined registration operation by the user, and the processing proceeds to the next step SP4. Namely, the device name and disclosure settings are arranged not to be cleared even if the terminal device 4A1 is turned off.

At the step SP4, the CPU 11 sends the device name and disclosure settings to the terminal management server 3A as the remainder of the registration information, and the processing proceeds to the step SP5.

Then, at the step SP13, the control block 60 of the terminal management server 3A receives the device name and disclosure settings as the remainder of the registration information sent from the terminal device 4A1, and the processing proceeds to the step SP14.

At the step SP14, the control block 60 registers the device name and disclosure settings to the management table TBL by associating them with the user ID, and the processing proceeds to the next step SP15.

At the step SP15, the control block 60 sends to the terminal device 4A1 the registration completion information that shows the completion of the registration of the device name and disclosure settings, and in the next step SP16, it finishes registering the device name managed by the terminal management server 3A.

At the step SP5, the CPU 11 of the terminal device 4A1 receives the registration completion information from the terminal management server 3A, and the processing proceeds to the next step SP6.

At the step SP6, the CPU 11 shows the completion of the registration of the device name and disclosure settings on the display 17 to notify the user of the information, and at the next step SP7, it finishes registering the device name.

(1-7-2) Deleting Device Name

Next, we are going to explain the procedure of deleting from the terminal device 4A1 the device name and disclosure settings registered thereto with the user operation, and that of deleting the device name when you delete the device name and disclosure settings of the terminal device 4 registered to the management table TBL of the terminal management server 3A.

Figure 9:
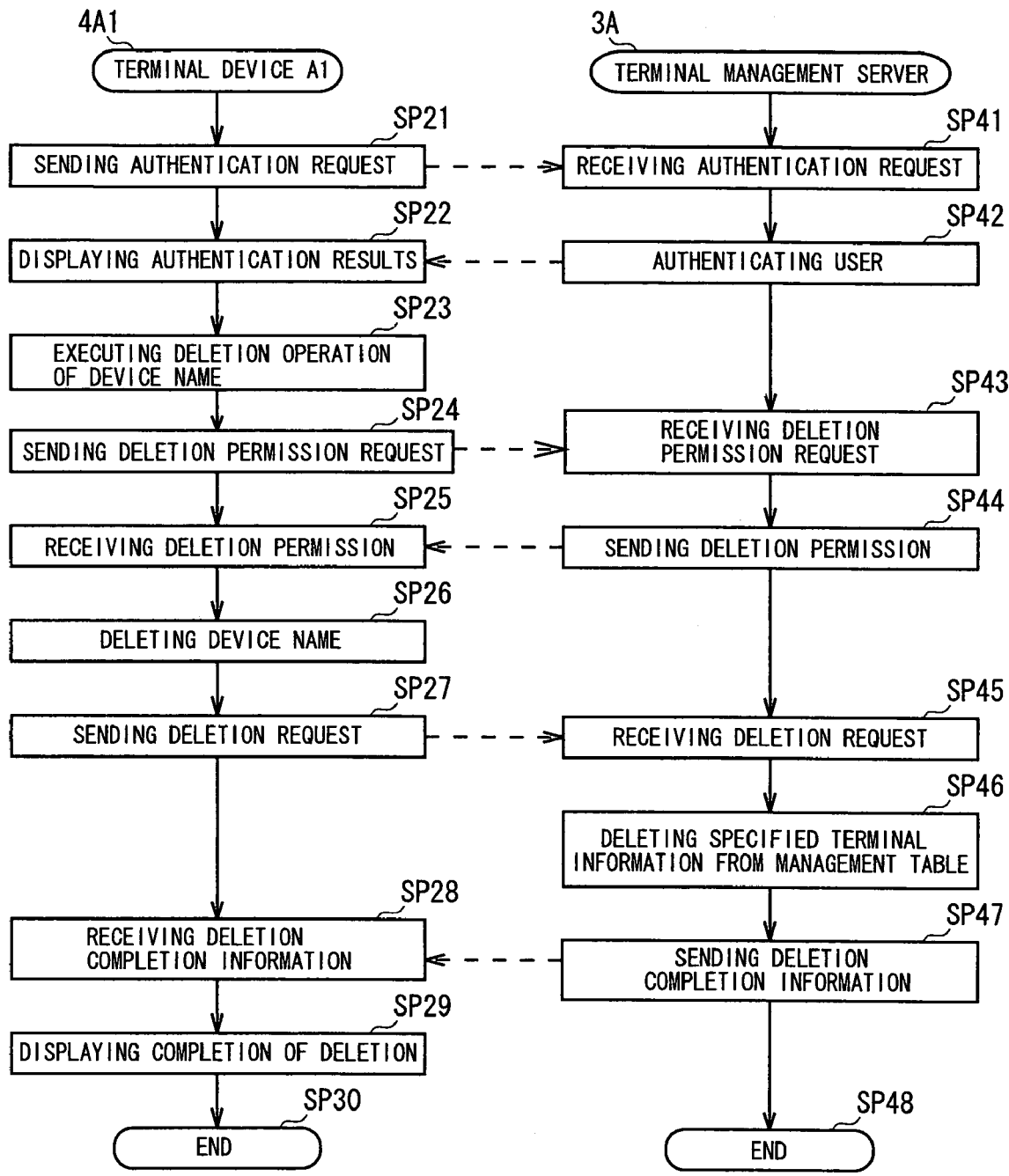
FIG. 9 is the sequence chart that shows the deletion processing of the device names of the present invention.

As FIG. 9 shows, at the step SP21, the CPU 11 of the terminal device 4A1 sends the user ID and password, which have been inputted by the user A, to the terminal management server 3A as the authentication request, and the processing proceeds to the next step SP22.

In response to the request, the control block 60 of the terminal management server 3A receives the authentication request at the step SP41, and the processing proceeds to the next step SP42.

At the step, SP42, the control block 60 compares the received authentication request with the information on the management table TBL, authenticates the user based on the user ID and password in the authentication request and sends the results of authentication to the terminal device 4A1. Then, the processing proceeds to the next step SP43.

At this step, the control block 60 may send the identification information of the service used under the device name given to the terminal device 4A1. In this case, the identification information of the service used under each device name must be managed by the management table.

In addition, the control block 60 may send the information of the device name registered under the user ID and password as the authentication results.

At the step SP22, on the other hand, the CPU 11 of the terminal device 4A1 shows the received authentication results on the display 17 to notify the user of the authentication results. Then, the processing proceeds to the next step SP23.

At this time, the CPU 11 may control the display 17 so that it shows the information of the service based on the identification information of the service that is used under the device name corresponding to the terminal device 4A1 among the received authentication results.

Furthermore, the CPU 11 may control the display 17 so that it shows the information of the device name registered to the user ID and password among the received authentication results.

At the step SP23, the CPU 11 accepts the operation of deleting a given device name by the user, and the processing proceeds to the next step SP24.

At the step SP24, the CPU 11 sends the deletion permission request, which requests the permission of deleting the device name and the disclosure settings registered to the terminal device 4A1, to the terminal management server 3A, and the processing proceeds to the next step SP25.

Then at the step SP43, the control block 60 of the terminal management server 3A receives the deletion permission request from the terminal device 4A1, and the processing proceeds to the next step SP44.

At the step SP44, the control block 60 compares the deletion permission request with the information on the management table TBL and sends the deletion permission to the terminal device 4A1, and the processing proceeds to the next step SP45.

At the step SP25, on the other hand, the CPU 11 of the terminal device 4A1 receives the deletion permission from the terminal management server 3A, and the processing proceeds to the next step SP26.

At the step SP26, the CPU 11 deletes the device name and disclosure settings stored in the hard disk drive 21 based on the deletion permission, and the processing proceeds to the next step SP27.

At the step SP27, the CPU 11 sends the deletion request information, which requests the deletion of the device name and the disclosure settings of the terminal device 4A1 registered to the terminal management server 3A, and the processing proceeds to the next step SP28.

Then, the control block 60 of the terminal management server 3A receives the deletion request information from the terminal device 4A1 at the step SP45, and the processing proceeds to the next step SP46.

At the step SP46, the control block 60 deletes the device name and disclosure settings of the terminal device 4A1 from the management table TBL based on the deletion request information, and the processing proceeds to the next step SP47.

At the step SP47, the control block 60 sends to the terminal device 4A1 the deletion completion information showing that the device name and the disclosure settings of the terminal device 4A1 have been successfully deleted, and then at the next step SP48, it finishes the device name deletion processing at the terminal management server 3A.

At the step SP28, on the other hand, the CPU 11 of the terminal device 4A1 receives the deletion completion information from the terminal management server 3A, and the processing proceeds to the next step SP29.

At the step SP29, the CPU 11 shows the completion of the deletion of the device name and disclosure settings on the display 17, and at the next step SP30, it finishes this device name deletion processing.

(1-8) Showing Other Users' Devices Names

The service utilizing system 1 is designed to allow a user to browse the device names of other users' terminal devices 4 on a list.

When the user A (yamada) wants to browse the list of the device names of the terminal devices 4 of the user B (kato) using the terminal device 4A1, for example, he/she should carry out predetermined operation to send the request for the list of the device names of the user ID (kato) to the terminal management server 3A.

When the terminal management server 3A receives it, it refers to the management table TBL and sends "yuri" and "kaede", the device names of the terminal devices 4 which disclosure settings have "Yes" among the terminal devices 4 registered in association with the user ID "kato", to the terminal device 4A1.

Then, the terminal device 4A1 displays, as shown in FIG. 10 (A), the received device names on the display 17 as they are.

Likewise, when the user B (kato) wants to browse the list of the device names of the terminal devices 4 of the user A (yamada) using the terminal device 4B1, he/she should carry out predetermined operation to send the request for the list of the device names of the user ID (yamada) to the terminal management server 3A.

When the terminal management server 3A receives it, it refers to the management table TBL and sends "sakura" and "sumire", the device names of the terminal devices 4 which disclosure settings have "Yes" among the terminal devices 4 registered in association with the user ID "yamada", to the terminal device 4A1.

At this time, the terminal management server 3A does not send the device name "momo" to the terminal device 4B1 as "No" is set to its disclosure settings.

Then, the terminal device 4B1 displays, as shown in FIG. 10 (B), the received device names on the display 17 as they are.

In this way, the service utilizing system 1 is designed to allow the user to browse the names of the devices which disclosure settings are set to "Yes" among other users, terminal devices 4.

(1-9) Purchasing Content

The service utilizing system 1 is designed to allow the user to download the purchased music content to store it in the hard disk drive 21 of the terminal device 4 and to play it back as music with the operation of the user.

The service utilizing system 1 is also designed to allow the user not only to download the content such as the purchased music to the terminal device 4 of the user (hereinafter referred to as purchasing content) but also to instruct its download to the terminal device 4 of another user (hereinafter referred to as the content present).

(1-9-1) Processing Content Purchase

First of all, a description will be made on the processing of content purchase when the user A purchases it.

Figure 11:
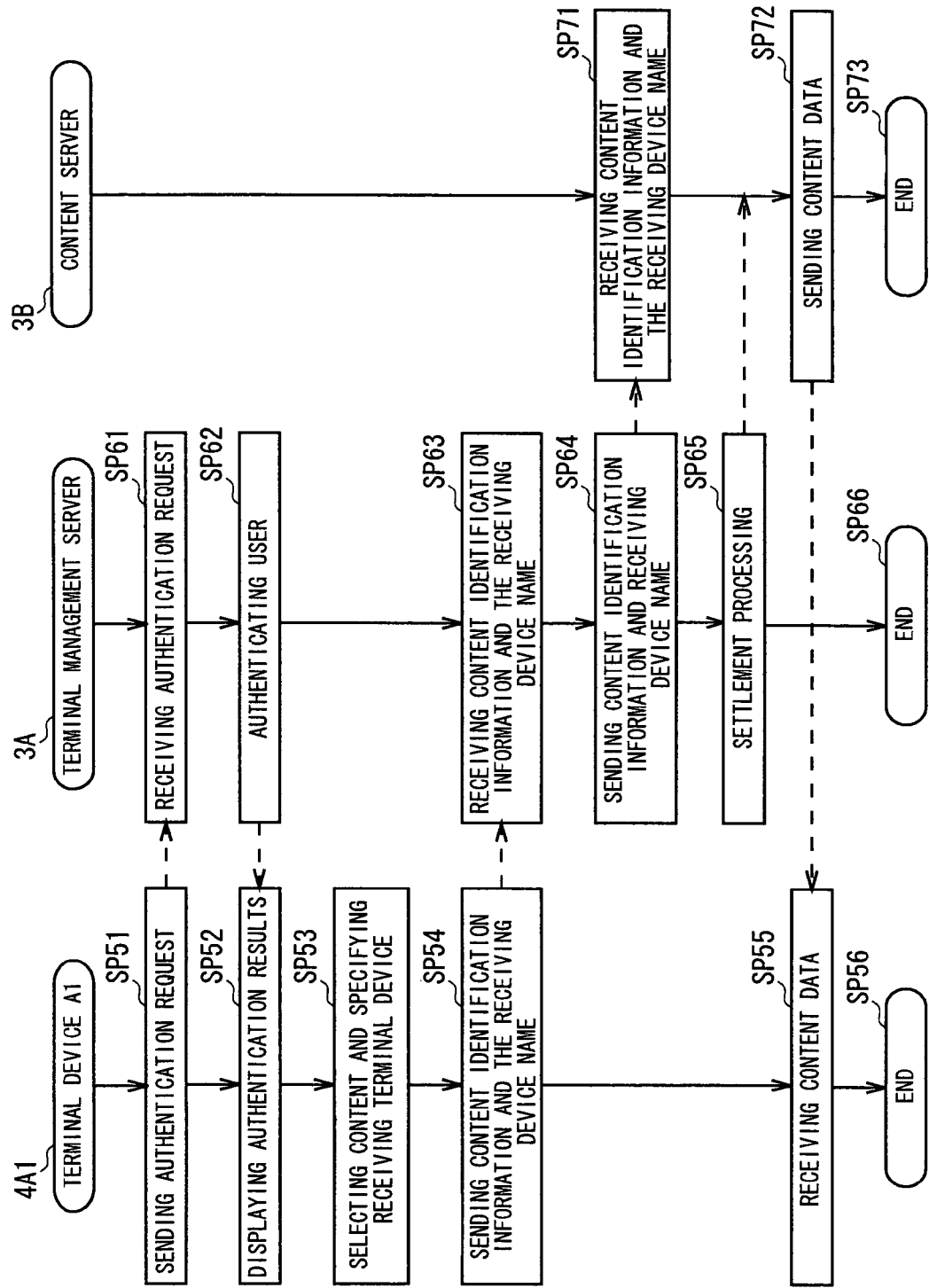
FIG. 11 is the sequence chart that shows the purchase processing of the content of the present invention.

As FIG. 11 shows, at the step SP51, the CPU 11 of the terminal device 4A1 sends to the terminal management server 3A the user ID and password entered by the user A as an authentication request, and the processing proceeds to the step SP52.

The control block 60 of the terminal management server 3A receives the authentication request from the terminal device 4A1 at the step SP61, and the processing proceeds to the next step SP62.

At the step SP62, the control block 60 of the terminal management server 3A compares the received authentication request with the information on the management table TBL, authenticates the user based on the user ID and password of the authentication request and sends the results to the terminal device 4A1 as the authentication results, and the processing proceeds to the next step SP63.

Then, the CPU 11 of the terminal device 4A1 shows the received authentication results on the display 17 at the step SP52, and the processing proceeds to the next step SP53.

At the step SP53, the CPU 11 selects the content to purchase based on the user operation and specifies the terminal device 4A1, its own terminal device 4, as the terminal to receive the content, and the processing proceeds to the next step SP54.

At the step SP54, the CPU 11 sends to the terminal management server 3A the content identification information for identifying the selected content and the device name "sakura" of the terminal device 4A1 that should receive the content, and the processing proceeds to the next step SP55.

At the step SP63, on the other hand, the control block 60 of the terminal management server 3A receives, from the terminal device 4A1, the content identification information and the device name of the terminal device that should receive the content (herein after referred to as the receiving device name), and the processing proceeds to the next step SP64.

At the step SP64, the control block 60 of the terminal management server 3A sends the content identification information and the receiving device name to the content server 3B, and the processing proceeds to the next step SP65.

Then, the control block 70 of the content server 3B receives the content identification information and the receiving device name from the terminal management server 3A at the step SP71, and the processing proceeds to the next step SP72.

At the step SP65, the control block 60 of the terminal management server 3A processes predetermine settlement based on the authenticated user ID and content identification information, and sends the results to the content server 3B. At the next step SP66, it finishes the content purchase processing of the terminal management server 3A.

Then, at the step SP72, the control block 70 of the content server 3B reads the content data corresponding to the content identification information from the hard disk drive 73 based on the content identification information, the receiving device name and the results of settlement processing and sends the readout data to the terminal device 4A1 corresponding to the receiving device name. At the next step SP73, it finishes the content purchase processing of the content server 3B.

The CPU 11 of the terminal device 4A1, on the other hand, receives the content data sent from the content server 3B at the step SP55 and stores it in the hard disk drive 21. At the next step SP56, the CPU 11 finishes the content purchase processing.

(1-9-2) Processing Content Present

Next, we are going to explain the processing of a content present when the user A purchased content and give it to the user B as a present.

Figure 12:
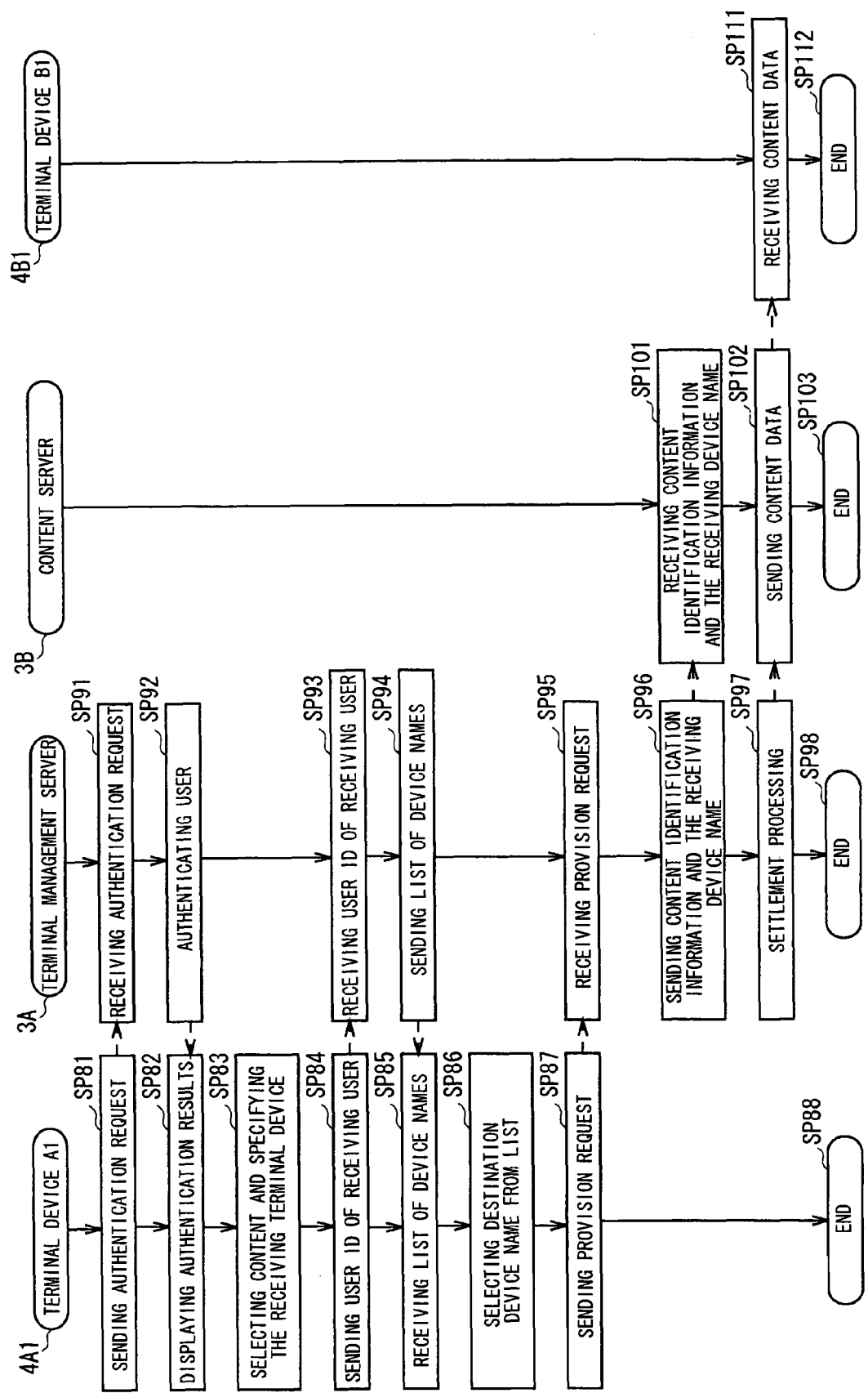
FIG. 12 is the sequence chart that shows the content present processing of the present invention.

As FIG. 12 shows, at the step SP81, the CPU 11 of the terminal device 4A1 sends to the terminal management server 3A the user ID and password entered by the user A as the authentication request, and the processing proceeds to the next step SP82.

Then, the control block 60 of the terminal management server 3A receives the authentication request at the step SP91, and the processing proceeds to the next step SP92.

At the step SP92, the control block 60 of the terminal management server 3A compares the received authentication request with the information on the management table TBL, authenticates the user based on the user ID and password of the authentication request and sends the results to the terminal device 4A1 as the authentication results. Then, the processing proceeds to the next step SP93.

Then, at the step SP82, the CPU 11 of the terminal device 4A1 shows the received authentication results on the display 17 to notify the user of the authentication results, and the processing proceeds to the next step SP83.

At the step SP83, the CPU 11 selects the content to purchase based on the user operation and enters the user ID of the user whom it prefers to make receive the content (hereinafter referred to as the receiving user) as prearrangements for specifying the terminal device that receives the content. The processing proceeds to the next step SP84.

At the step SP84, the CPU 11 sends the user ID of the receiving user to the terminal management server 3A as the device name request information and the processing proceeds to the next step SP85.

Then, at the step SP93, the control block 60 of the terminal server 3A receives the device name request information from the terminal device 4A1 and the processing proceeds to the next step SP94.

At the step SP94, the control block 60 of the terminal management server 3A refers to the management table TBL and sends only the names of the devices which disclosure settings have "Yes" among the terminal devices 4 corresponding to the user ID included in the device name request information to the terminal device 4A1 as a list. The processing proceeds to the next step SP95.

At the step SP85, on the other hand, the CPU 11 of the terminal device 4A1 receives the list of the device names of the receiving user and the processing proceeds to the next step SP86.

At the step SP86, the CPU 11 displays the list of the terminal devices 4 of the receiving user on the display 17 as FIG. 10 (A) shows and selects the name of the device which it prefers to make receive the content data based on the user operation (hereinafter referred to as the destination) and the processing proceeds to the next step SP87.

At the step SP87, the CPU 11 sends the present request information consisting of the device name of the terminal device 4A1 (the supply source), the identification information of the selected content data (content identification information) and the device name of the destination to the terminal management server 3A, and at the next step SP88, it finishes the content present processing of the terminal device 4A1.

Then, at the step SP95, the control block 60 of the terminal management server 3A receives the present request information from the terminal device 4A1, and the processing proceeds to the next step SP96.

At the step SP96, the control block 60 of the terminal management server 3A sends the content identification information and the device name of the destination among the received present request information to the content server 3B and the processing proceeds to the next step SP97.

At the step SP101, the control block 70 of the content server 3B receives the content identification information and the device name of the destination from the terminal management server 3A and the processing proceeds to the next step SP102.

At the step SP97, the control block of the terminal management server 3A, on the other hand, processes the predetermined settlement based on the authenticated user ID and the content identification information and sends the results to the content server 3B, and then at the next step SP98 it finishes the content present processing of the terminal management server 3A.

At the step SP102, the control block 70 of the content server 3B reads the content data corresponding to the content identification information from the hard disk drive 73 based on the content identification information, the receiving device names and the results of the settlement processing, sends it to the terminal device 4B1—the destination of the content data—and then in the next step SP103, it finishes the content present processing of the content server 3B.

Then, the CPU 11 of the terminal device 4B1 receives the content data sent from the content server 3B at the step SP111, stores it in the hard disk drive 21 and then in the next step SP112, it finishes the content present processing.

(1-10) Operation and Effects

With the above-mentioned configuration, the service utilizing system 1 sets the device name specified by the user to the terminal device 4, specifies the accessibility of other users to the terminal device 4 as the disclosure settings and manages the device name and disclosure settings by associating them to a user ID.

Since the service utilizing system 1, therefore, allows the user to set a user friendly name to the terminal device 4, the user can easily identify multiple terminal devices 4 and can also identify uniquely all the terminal devices 4 by associating the user IDs with the device names with the terminal management server 3A.

As the service utilizing system 1 is designed to allow another user to browse the name of the terminal device 4 which disclosure settings are set to "Yes", it not only allows another user to easily identify individual terminal device 4 for getting a content present but also prevents him/her from knowing the existence of the terminal devices 4 which disclosure settings are set to "No". Thus, it makes it possible to unite the exchange of information with another user into the terminal device 4 which disclosure settings are set to "Yes".

In addition, as the service utilizing system 1 allows the user to delete the device name with the user operation, a new user can rename the terminal device 4 as he/she likes when it is transferred to him/her.

The service utilizing system 1 is designed to identify each terminal device 4 with a device name given by the terminal management server 3A in association with a user ID. Therefore, it is not necessary to manage or update the serial numbers, which means the substantial saving in time and manpower for the management of the terminal management server 3A.

The above-mentioned configuration makes it possible to assign a user-friendly device name to the terminal device 4 and to let the terminal management server 3A uniquely identify all terminal devices 4 by managing them in association with the user IDs. Thus, it makes it possible to reduce the time and manpower for the operation of the management server 3A and to realize the service utilizing system 1 that allows the users to easily identify each terminal device 4.

(2) Embodiment 2

Next, we are going to explain, as Embodiment 2, an actual example of the system that implemented the single sign-on function through the authentication using the device name in the above mentioned Embodiment 1.

Figure 13:
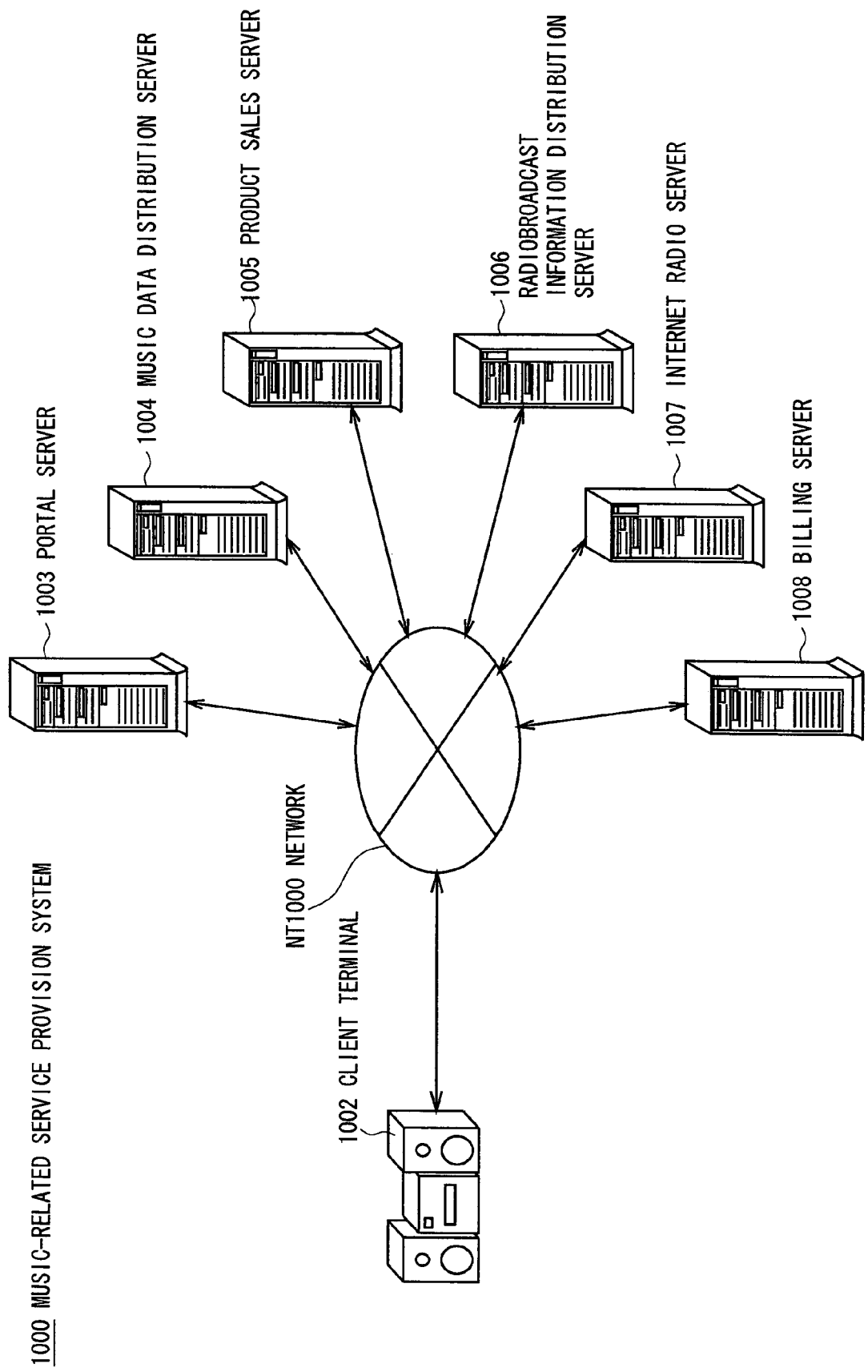
FIG. 13 is the simple illustration of the entire configuration of music-related service provision system in the Embodiment 2.

For information, the client terminal 1002 in FIG. 13 in Embodiment 2 corresponds to the terminal device 4 in FIG. 1 in Embodiment 1, the portal server 1003 in FIG. 13 does to the terminal management server 3A in FIG. 1, the music data distribution server 1004 in FIG. 13 does to the content server 3B in FIG. 1, the radiobroadcast information distribution server 1006 in FIG. 13 does to the related information provision server KS in FIG. 6 and the network NT 1000 in FIG. 13 does to the Internet 2 in FIG. 1.

(2-1) System Configuration

In FIG. 13, Group 1000, which shows the music related service provision system in Embodiment 2 as a whole, is comprised of the client terminal 1002 of the user who has an agreement with an operator of this music-related service provision system 1000, the portal server 1003 that manages the client terminal 1002 and the multiple servers from 1004 to 1008 that provide the client terminal 1002 with various services concerning music.

In this embodiment, the music data distribution server 1004 provides the client terminal 1002 with the music data distribution service, which delivers the music data as content data in such formats as ATRAC3 (Adaptive Transform Acoustic Coding3), ACC (Advanced Audio Coding), WMA (Windows Media Audio), RealAUDIO G2 Music Codec and MP3 (MPEG Audio Layer-3).

The product sales server 1005 delivers the product sales service that sells to users CDs (Compact Discs) and DVDs (Digital Versatile Discs) through the client terminal 1002.

The radiobroadcast information distribution server 1006 delivers the radiobroadcast information distribution service that distributes the radiobroadcast information such as radio programs and music of the radiobroadcast broadcast via radio stations to the client terminal 1002.

The Internet radio server 1007 delivers the Internet radiobroadcast service that broadcasts the radiobroadcast data in the form of the streaming distribution to the client terminal 1002 via the network NT1000 corresponding to the Internet.

The billing server 1008 is designed to execute the billing processing in order to charge the users for various expenses in compliance with the requests from the portal server 1003.

(2-2) Functional Circuit Block Configuration of Client Terminal

Figure 14:
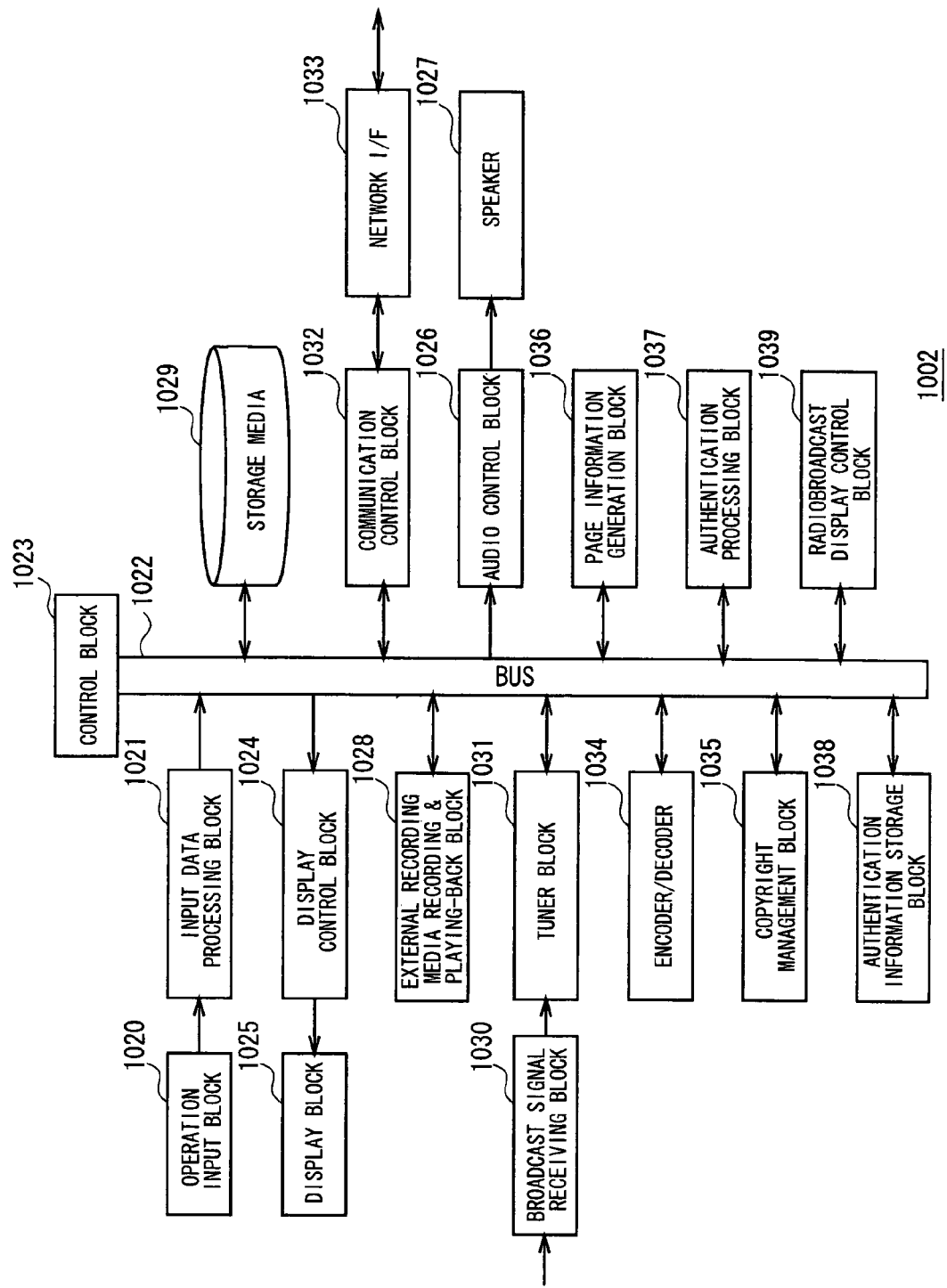
FIG. 14 is the block diagram that shows the hardware configuration based on the functional circuit blocks of the client terminal.

Next, we are going to explain the hardware configuration consisting of the functional circuit block of the client terminal 1002. As FIG. 14 shows, when the user operates the operation input block 1020 comprised of various operation buttons arranged on the cabinet or on the remote controller (not illustrated), the client terminal 1002 recognizes the input with the operation input block 1020 and sends the operation input signals entered by the user operation to the input data processing block 1021.

The input data processing block 1021 converts the operation input signals sent from the operation input block 1020 to special operation commands and sends them to the control block 1023 via the bus 1022.

The control block 1023 controls the movement of each circuit based on the operation commands and control signals given from the circuits connected via the bus 1022.

The display control block 1024 carries out the D/A conversion of the image data supplied via the bus 1022 and sends the converted analog image signals to the display block 1025.

The display block 1025, such a display device as an LCD for example, may be directly installed to the surface of the cabinet or may be a stand-alone device.

When the display block 1025 receives the results and various kinds of image data processed by the control block 1023 as analog image signals via the display control block 1024, it displays the images based on the received analog image signals.

The audio control block 1026 carries out the D/A conversion of the audio data supplied via the bus 1022 and sends the converted analog audio signals to the speaker 1027. The speaker 1027 outputs audio based on the analog audio signals supplied from the audio control block 1026.

The external recording media recording & playing-back block 1028 reads and plays back the content data recorded in CDs and the external recording media such as memory sticks (R) containing flash memory in the external package or it records the target content data in the external recording media.

When the external recording media recording & playing-back block 1028 reads the image data as the content data from an external recording media, it supplies the read image data to the display control block 1024 via the bus 1022.

Then, the display control block 1024 converts the image data read from the external recording media as the content data by the external recording media recording & playing-back block 1028 to the analog image signals and supplies them to the display block 1025.

When the external recording media recording & playing-back block 1028 reads the audio data as the content data from the external recording media, it supplies the read audio data to the audio control block 1026 via bus 1022.

Then, the audio control block 1026 converts the audio data read as the content data from the external recording media by the external recording media recording & playing-back block 1028 to the analog audio signals and supplies them to the speaker 1027.

The control block 1023 can send the content data read from the external recording media by the external recording media recording & playing-back block 1028 to the storage media 1029 in the client terminal 1002 via the bus 1022 and store the content data in the storage media 1029 (storing the content data in the storage media 1029 is hereinafter referred to as "ripping" also).

When the control block 1023 reads the image data or the video data as the content data from the storage media 1029, it provides the read image data to the display control block 1024 via the bus 1022.

When the control block 1023 reads the audio data as the content data from the storage media 1029, it supplies the read audio data to the audio control block 1026 via the bus 1022.

In addition to the above, the control block 1023 can record music data to the external recording media through the external recording media recording & playing-back block 1028 by reading the music data from the storage media 1029 and by transferring it to the external recording media recording & playing-back block 1028.

The broadcast signal receiving block 1030 receives the radiobroadcast waves sent from each radio station and supplies them to the tuner block 1031.

The tuner block 1031 extracts, under the control of the control block 1023, the radiobroadcast signals in the broadcasting frequency corresponding to the radio station specified through the operation input block 1020, for example, from the radiobroadcast waves received via the broadcast signal receiving block 1030, carries out the predetermined receiving processing and sends out the processed audio data to the audio control block 1026 via the bus 1022.

The audio control block 1026 converts the audio data given from the tuner block 1031 to the analog audio signals and sends them to the speaker 1027, by which it outputs from the speaker 1027 the audio of the radio program broadcast from the radio station and, thus, provides the user with the audio of the radio program.

The control block 1023 can also store the audio of the radio program by sending and storing the audio data obtained through the tuner block 1031 to the storage media 1029.

The control block 1023 can access the portal server 1003 and other servers from 1004 to 1007 on the network NT1000 through the connection with the network NT1000 via the communication control block 1032 and the network interface 1033 in sequence, through which it sends and receives various kinds of information and data with the portal server 1003 and other servers from 1004 to 1007.

The encoder/decoder block 1034 decodes the compressed content data received from the network NT1000 via the network interface 1033 and the communication control block 1032 in sequence or the compressed content data read from the storage media 1029 and the external recording media, and sends it to the display control block 1024 and the audio control block 1026.

The encoder/decoder block 1034 compresses the uncompressed content data read from the external recording media and the audio data supplied from the tuner block 1031, and sends the compressed content data to the storage media 1029.

Thus, the content data compressed by the encoder/decoder block 1034 is stored in the storage media 1029 under the control of the control block 1023.

The copyright management block 1035 generates the copyright management information corresponding to the content data downloaded from the network NT1000 via the network interface 1033 and the communication control block 1032 in sequence and the copyright management information corresponding to the content data read from the external recording media by the external recording media recording & playing-back block 1028.

The copyright management information generated by the copyright management block 1035 is registered to the storage media 1029 by associating it with the content data under the control of the control block 1023.

The copyright management block 1035 protects the copyright of the content data by properly updating the content of the copyright management information of the content data when it checks out the content data associated with the copyright management information between the storage media 1029 and a specified external recording media and when it checks in the content data associated with the copyright management information between the specified external recording media and the storage media 1029.

The page information generation block 1036 interprets the page information of the XML (extensible Markup Language) or HTML (Hyper Text Markup Language) files received from the network NT1000 via the network interface 1033 and the communication control block 1032 in sequence, generates the image data to display on the display block 1025 and sends the generated image data to the display control block 1024.

The authentication processing block 1037 carries out the authentication processing by sending, through the communication control block 1032 and the network interface 1033 in sequence, the authentication information to the portal server 1003 and other servers from 1004 to 1007 on the network NT1000 connected through the network interface 1033.

The authentication information storage block 1038 stores the authentication information necessary for the authentication processing block 1037 to access the portal server 1003 and other servers from 1004 to 1007.

The radiobroadcast display control block 1039 sends, via the communication control block 1032 and the network interface 1033 in sequence, the request signals to request the radiobroadcast information of the radiobroadcast currently received by the user to the radiobroadcast information distribution server 1006 corresponding to the radio station that is broadcasting the receiving radiobroadcast.

As a result, the radiobroadcast display control block 1039 not only receives the radiobroadcast information received from the radiobroadcast information distribution server 1006 on the network NT1000 via the network interface 1033 and the communication control block 1032 but also sends the received radiobroadcast information to the display control block 1024 to make the display block 1025 display the program name of the currently receiving radio program and the radiobroadcast information such as the title and artist name of the currently receiving music (which corresponds to the related information in the above-mentioned Embodiment 1).

(2-3) Configuration of Portal Server

Figure 15:
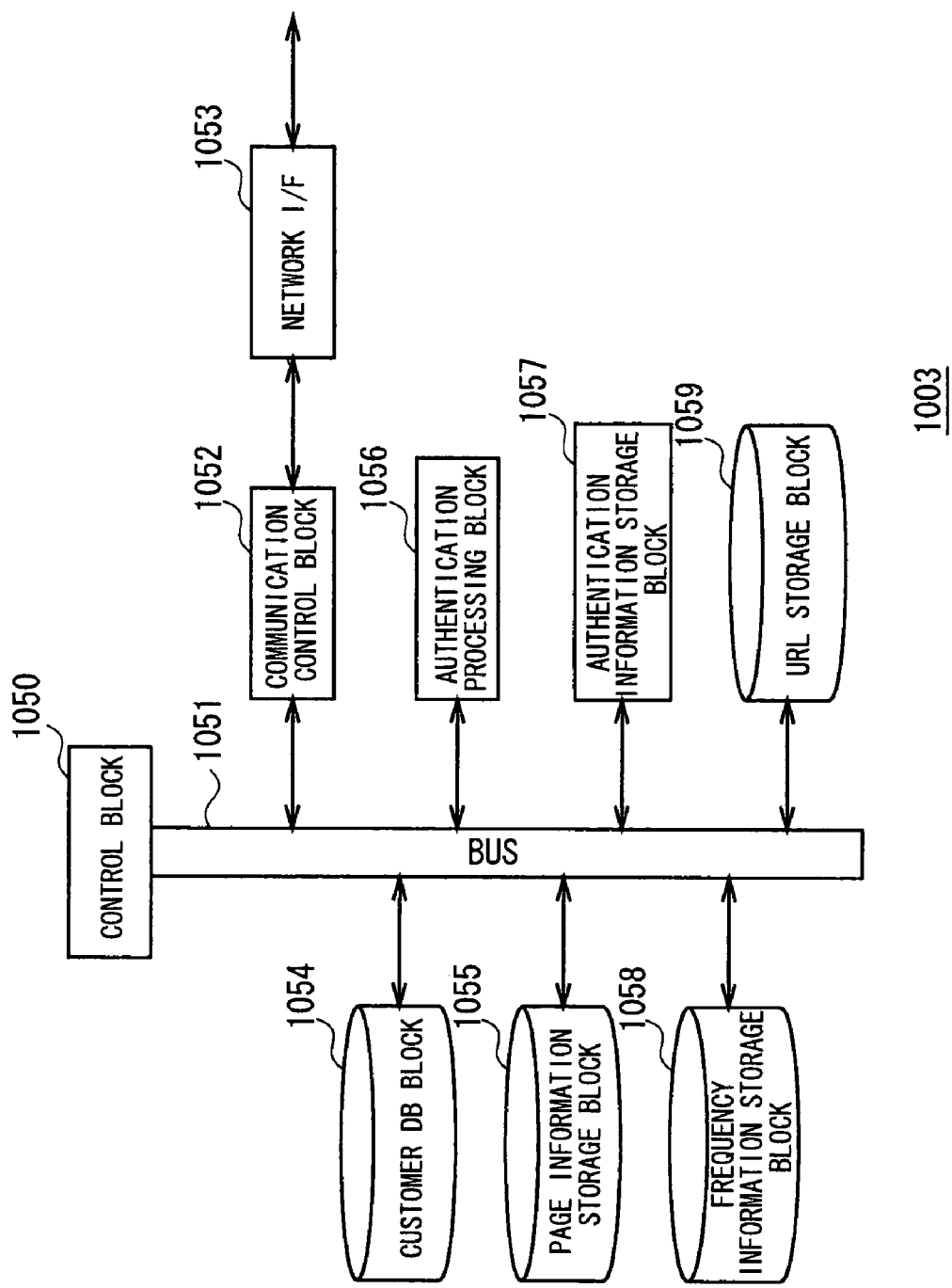
FIG. 15 is the block diagram that shows the hardware configuration based on the functional circuit blocks of the portal server.

Next, we are going to explain the hardware configuration consisting of the functional circuit block of the portal server 1003 using FIG. 15. The control block 1050 in the portal server 1003 controls the operation of each circuit connected through the bus 1051.

The communication control block 1052 sends to and receives from the client terminal 1002 and other servers from 1004 to 1008 various kinds of information through the network interface 1053 under the control of the control block 1050.

To the customer database block 1054, the user IDs (identification) information of the users who have made the agreement with the operators of the music related-service provision system 1000 are registered in association with their password information as the customer information.

The page information storage block 1055 stores the page information that is managed by the operator of the music-related service provision system 1000.

This page information is described in the XML language, for example, and includes the URL (Uniform Resource Locator) information for accessing the music data distribution server 1004, the product sales server 1005, the radiobroadcast information distribution server 1006 and the Internet radio server 1007.

When the authentication processing block 1056 receives the user ID and password information sent from the client terminal 1002 through the network interface 1053 and the communication control block 1052 in sequence, it checks, as the user authentication processing, whether the received user ID and password information is registered to the customer database block 1054 as the customer information.

When the authentication processing block 1056 completes the user authentication processing, it issues the portal authentication results (after-mentioned authentication session ID) showing the results of the user authentication processing and temporarily stores the issued portal authentication results in the authentication information storage block 1057.

When the results of the user authentication processing by the authentication processing block 1056 show that the user is the registered user, the control block 1050 sends the page information of the subscriber page stored in the page information storage block 1055 to the client terminal 1002 together with the portal authentication results via the communication control block 1052 and the network interface 1053 in sequence.

If the user was not authenticated as a registered user as a result of the user authentication processing by the authentication processing block 1056, the control block 1050 may be configured to send the authentication error information, together with the authentication error notice page information showing the error of the authentication stored in the page information storage block 1055, to the client terminal 1002 via the communication control block 1052 and the network interface 1053 in sequence.

When the authentication processing block 1056 receives, as a result of the execution of the authentication processing for the user from the music data distribution server 1004, the product sales server 1005 and the radiobroadcast information distribution server 1006, the portal authentication results (after-mentioned authentication ticket) obtained/sent from the client terminal 1002 of the user via the network interface 1053 and the communication control block 1052 in sequence, it compares the received portal authentication results with the portal authentication results of the user temporarily stored in the authentication information storage block 1057.

Thus, the authentication processing block 1056 verifies whether the portal authentication results comply with the registered portal authentication information as the authentication processing of what was received from the music data distribution server 1004, the product sales server 1005 and the radiobroadcast information distribution server 1006 and returns the authentication results showing the results of verification to the music data distribution server 1004, the product sales server 1005 and the radiobroadcast information distribution server 1006 via the communication control block 1052 and the network interface 1053 in sequence.

The frequency information storage block 1058 stores the area codes such as the identifiable Zip codes of areas, the frequency information showing the broadcasting frequency of the receivable radiobroadcast in the Zip code areas, the names of the radio stations engaged in the radiobroadcast (hereinafter referred to as the radio station names) and their call signs—the unique identification information for each radio station by associating them with each other.

The URL storage block 1059 stores the call signs for each radio station for radiobroadcast and the URL information that allows obtaining the name of the radio program of the currently broadcasting program provided by the radio station corresponding to the call sign and the radiobroadcast information consisting of the title of the music currently broadcast in the radio program (hereinafter referred to as the now on-air information) by associating them with each other.

(2-4) Functional Circuit Block Configuration of Music Data Distribution Server

Figure 16:
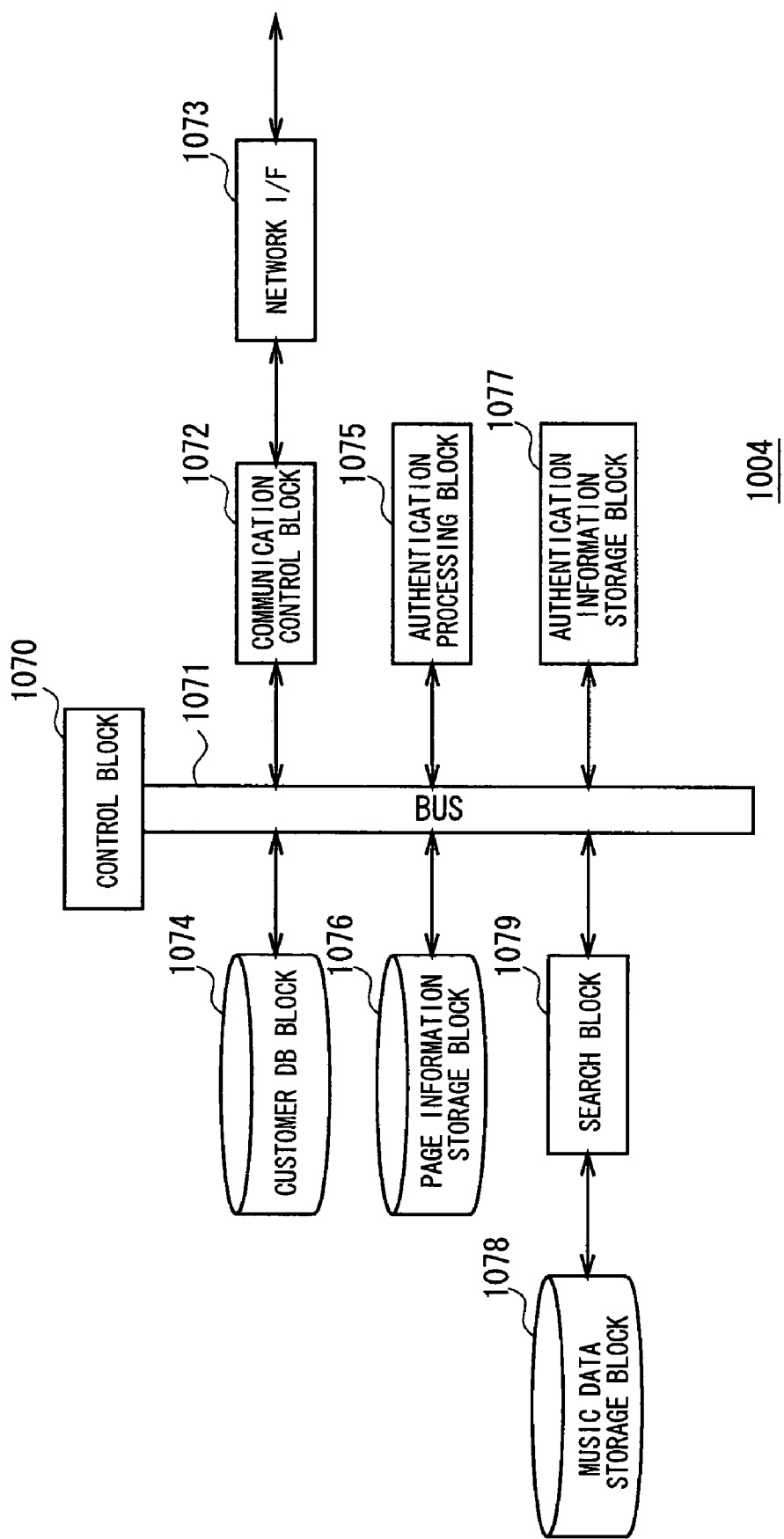
FIG. 16 is the block diagram that shows the hardware configuration based on the functional circuit blocks of the music data distribution server.

Next, we are going to explain the hardware configuration of the functional circuit block of the music data distribution server 1004 using FIG. 16. The control block 1070 in the music data distribution server 1004 controls the operation of each circuit connected via the bus 1071.

The communication control block 1072 sends to and receives from the client terminal 1002 and the portal server 1003 various kinds of information and various types of data such as content data via the network interface 1073 under the control of the control block 1070.

To the customer database block 1074, the user IDs and passwords of the users who have made the agreement with the operators of the music data distribution server 1004 are registered by associating them with each other as the customer information. When the authentication processing block 1075 has the function of authenticating the user based on the portal authentication results issued by the portal server 1003 and sent from the client server 1002, however, the customer database block 1074 may not be built.

The page information storage block 1076 stores the page information of the music data distribution pages introducing the downloadable music data managed by the music data distribution server 1004.

For information, the page information of the music data distribution page is described in the XML language or the like, allowing the user of the client terminal 1002 to select the music data he/she wants to download.

When the control block 1070 receives the page information acquisition request signals that request the page information of the music data distribution page sent from the client terminal 1002 via the network interface 1073 and the communication control block 1072 in sequence, it sends the page information of the music data distribution page stored in the page information storage block 1076 to the client terminal 1002 in compliance with the received page information acquisition request signal via the communication control block 1072 and the network interface 1073 in sequence.

When the authentication processing block 1075 receives, via the network interface 1073 and the communication control block 1072 in sequence, the user ID and password information of the user who uses the client terminal 1002 sent from the client terminal 1002, it verifies, as the user authentication processing, whether the received user ID and password information is registered to the customer database block 1074 as the customer information.

As a user authentication method different from the user authentication processing that uses the user ID and password information, the authentication processing block 1075 receives the portal authentication results (after-mentioned authentication ticket) issued by the portal server 1003 and sent from the client terminal 1002 via the network interface 1073 and the communication control block 1072 in sequence, and it sends the received portal authentication results to the portal server 1003 via the communication control block 1072 and the network interface 1073 in sequence.

The authentication processing block 1075 receives, based on the transmission of the portal authentication results to the portal server 1003, the verification results sent from the portal server 1003 after the execution of the authentication processing (namely, the above verification processing) of the portal authentication results via the network interface 1073 and the communication control block 1072 in sequence, and it checks whether the user is a registered user who has made the agreement with the operator of the music-related service provision system 1000 based on the received verification results.

Thus, when the authentication processing block 1075 completes the user authentication processing, it issues the server authentication results (after-mentioned service session ID) showing the results of the user authentication processing.

When the user is authenticated as the registered user as a result of the authentication processing by the authentication processing block 1075, the control block 1070 sends the page information of the music data distribution page stored in the page information storage block 1076 for the subscriber to the client terminal 1002 together with the server authentication results via the communication control block 1072 and the network interface 1073 in sequence.

If the user is not authenticated as a registered user as a result of the user authentication processing by the authentication processing block 1075, the control block 1070 sends the authentication error to the client terminal 1002 together with the authentication error notice page information showing the authentication error stored in the page information storage block 1076 via the communication control block 1072 and the network interface 1073 in sequence.

The authentication information storage block 1077 temporarily stores the server authentication results issued by the authentication processing block 1075 as well as various kinds of authentication information necessary for the authentication processing block 1075 to authenticate the user who uses the client terminal 1002.

The music data storage block 1078 stores multiple kinds of music data compressed in the afore-mentioned ATRAC3 or MP3 format by associating them with the search keys such as the individual content IDs.

The search block 1079 stores the search key for searching the music data the user wants to download, which is sent from the client terminal 1002 as a result of the transmission of the page information of the music data distribution page to the client terminal 1002. When it receives the download request signal requesting the download of the music data that the user wants to download via the network interface 1073 and the communication control block 1072 in sequence, it retrieves the search key from the received download request signal.

Based on the search key, the search block 1079 searches for the music data, which satisfies the search conditions shown by the search key and the user wants to download, from multiple kinds of music data in the music data storage block 1078.

Then, the control block 1070 sends the searched and download-desired music data to the client terminal 1002 via the communication control block 1072 and the network interface 1073 in sequence.

The control block 1070 sends to the billing server 1008 the billing information for the billing processing for the user who downloaded the music data to the client terminal 1002 via the communication control block 1072 and the network interface 1073 in sequence to instruct the billing server 1008 to charge the user for the downloaded music data.

(2-5) Functional Circuit Block Configuration of Product Sales Server

Figure 17:
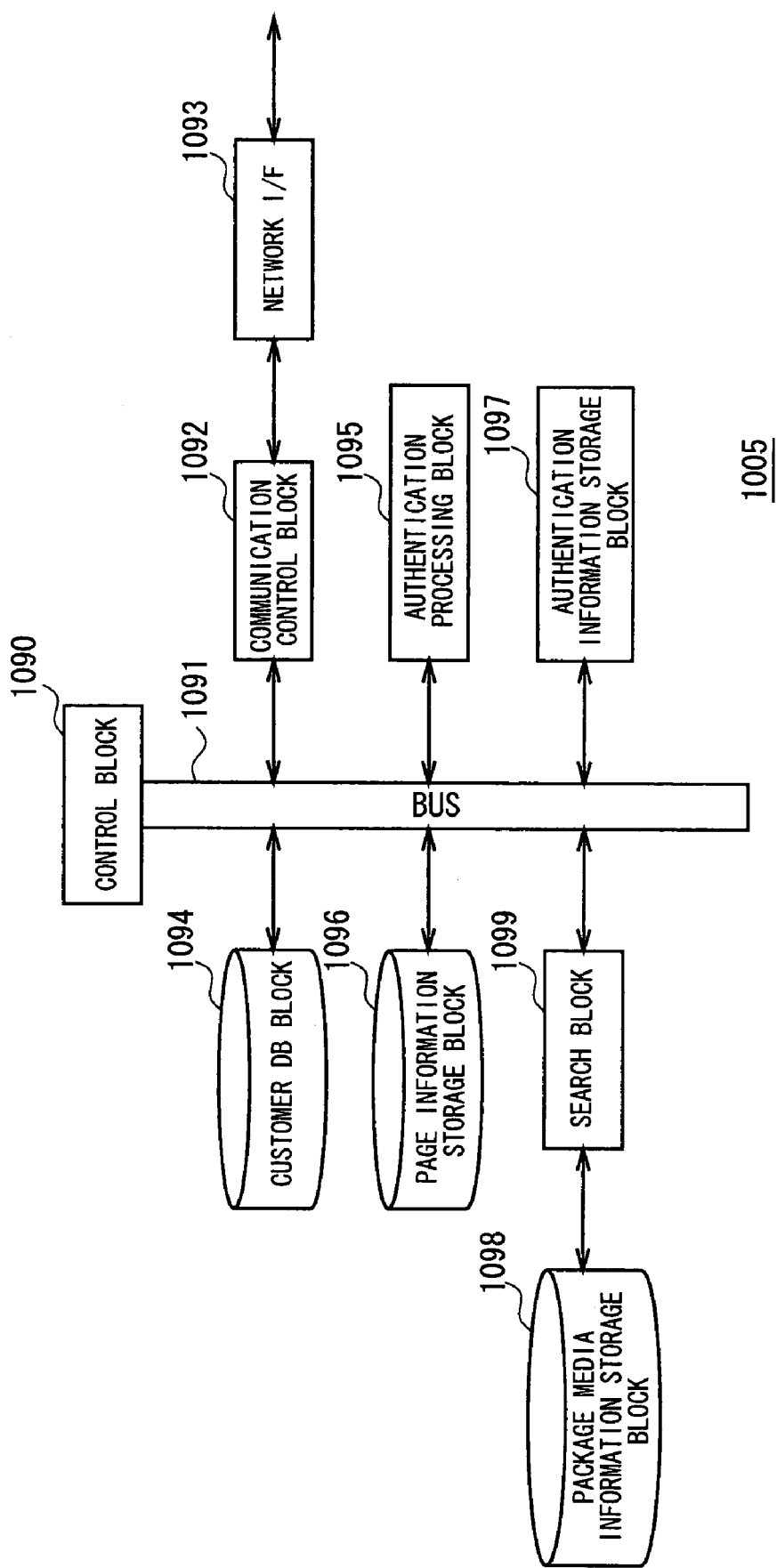
FIG. 17 is the block diagram that shows the hardware configuration based on the functional circuit blocks of the product sales server.

Next, we are going to explain the hardware configuration of the functional circuit block of the product sales server 1005 using FIG. 17. The control block 1090 in the product sales server 1005 controls the operation of each circuit connected via the bus 1091.

The communication control block 1092 sends to and receives from the client terminal 1002 and the portal server 1003 various kinds of information under the control of the control block 1090 via the network interface 1093.

To the customer database block 1094, the user ID and password information of the users who have made agreement with the operators of the product sales servers 1005 are registered by associating them with each other as the customer information. When the authentication processing block 1095 has the function of authenticating the user based on the portal authentication results issued by the portal server 1003 and sent from the client terminal 1002, however, the customer database block 1094 may not be built.

The page information storage block 1096 stores the page information of the package media sales pages introducing the package media such as CDs and DVDs for sale that are to be managed by the product sales server 1005.

For information, the page information of the package media sales pages is described in the XML language, which allows the user of the client terminal 1002 to select package media such as CDs or DVDs that the user wants to purchase.

When the control block 1090 receives the page information acquisition request signal requesting the page information of the package media sales pages sent from the client terminal 1002 via the network interface 1093 and the communication control block 1092 in sequence, it sends, based on the received page information acquisition request signal, the page information of the package media sales pages stored in the page information storage block 1095 to the client terminal 1002 via the communication control block 1092 and the network interface 1093 in sequence.

When the authentication processing block 1095 receives the user ID and password information of the user who uses the client terminal 1002, which is sent from the client terminal 1002, via the network interface 1093 and the communication control block 1092 in sequence, it verifies, as the user authentication processing, whether the received user ID and password information is registered to the customer database block 1094 as the customer information.

As a user authentication method different from what uses the user ID and password information, the authentication processing block 1095 receives the portal authentication results issued by the portal server 1003 and sent from the client terminal 1002 (after-mentioned authentication ticket) via the network interface 1093 and the communication control block 1092 in sequence, and it sends the received portal authentication results to the portal server 1003 via communication control block 1092 and the network interface 1093 in sequence.

Then, the authentication processing block 1095 receives, based on the transmission of the portal authentication results to the portal server 1003, the verification results sent as a result of the execution of the authentication processing (namely the above-mentioned verification processing) of the portal authentication results from the portal server 1003 via the network interface 1093 and the communication control block 1092 in sequence, and it verifies whether the user is the registered user who has made the agreement with the operator of the music-related service provision system 1000 based on the received verification results.

Thus, when the authentication processing block 1095 finishes the user authentication processing, it issues the server authentication results (after-mentioned service session ID) showing the results of the user authentication processing.

When the user is authenticated as the registered user as a result of the user authentication processing by the authentication processing block 1095, the control block 1090 sends the page information of the package media sales pages stored in the page information storage block 1096 for the subscriber to the client terminal 1002 together with the server authentication results via the communication control block 1092 and the network interface 1093 in sequence.

If the user is not authenticated as a registered user as a result of the user authentication processing by the authentication processing block 1095, the control block 1090 sends the authentication error to the client terminal 1002 together with the authentication error notice page information showing the error of authentication stored in the page information storage block 1096 via the communication control block 1092 and the network interface 1093 in sequence.

The authentication information storage block 1097 stores temporarily the server authentication results issued by the authentication processing block 1095 as well as various kinds of authentication information necessary for the authentication processing block 1095 to authenticate the user who uses the client terminal 1002.

The package media information storage block 1098 stores the information of multiple package media such as CDs and DVDs for sale (hereinafter referred to as the package media information) by associating it with the search keys including each package media ID.

When the search block 1099 receives, as a result of the transmission of the page information of the package media sales pages to the client terminal 1002, the media information request signal that requests the package media information of the package media such as a specific CD and DVD sent from the client terminal 1002 via the network interface 1093 and the communication control block 1092 in sequence, it extracts the search key for searching the specific package media from the received media information requests signal.

Then, based on the search key, the search block 1099 searches for the package media information of the specific piece of package media that complies with the search conditions shown by the search key from the multiple pieces of package media information in the package media information storage block 1098.

Thus, the control block 1090 sends the searched package media information to the client terminal 1002 via the communication control block 1092 and the network interface 1093 in sequence to show the package media information of the specific piece of package media to the user.

As a result, when the control block 1090 receives the purchase request signal requesting the purchase of the above-mentioned specific piece of package media sent from the client terminal 1002 via the network interface 1093 and the communication control block 1092 in sequence, it carries out the purchase processing such as the delivery of the specific piece of package media to the user who uses the client terminal 1002.

The control block 1090 also sends the billing information for the billing processes to the user who purchased the specific piece of package media to the billing server 1008 via the communication control block 1092 and the network interface 1093 in sequence to instruct the billing server 1008 to charge the user for the purchase of the specific piece of package media.

When the billing server 1008 completes the billing processes to the user, the control block 1090 sends the purchase completion page information that shows the completion of the purchase processing of the package media to the client terminal 1002 via the communication control block 1092 and the network interface 1093 in sequence.

Figure 18:
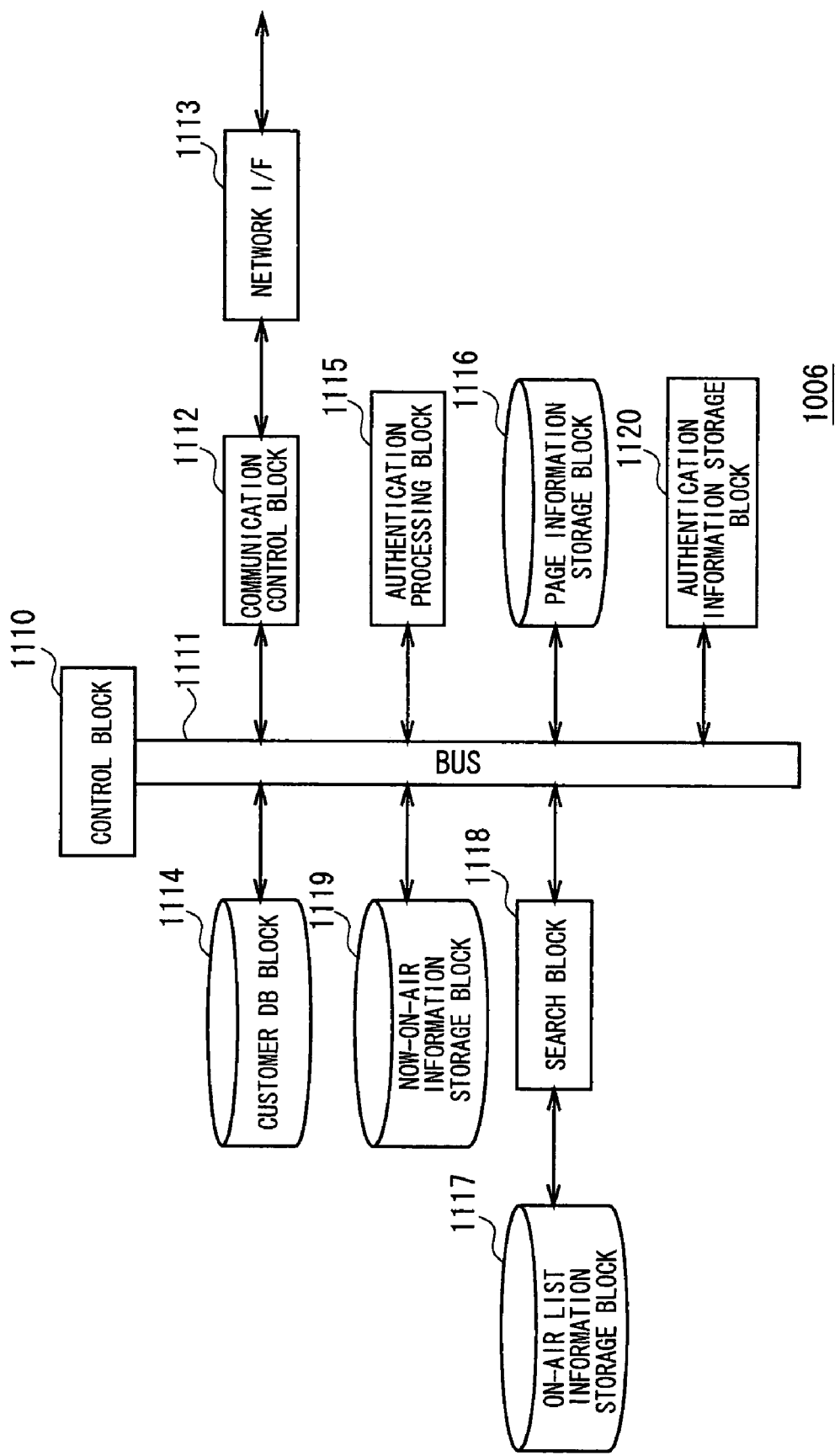
FIG. 18 is the block diagram that shows the hardware configuration based on the functional circuit blocks of the radiobroadcast information distribution server.

(2-6) Functional Circuit Block Configuration of Radiobroadcast Information Distribution Server Next, we are going to explain the hardware configuration of the functional circuit block of the radiobroadcast information distribution server 1006 using FIG. 18. The control block 1110 in the radiobroadcast information distribution server 1006 controls the operation of each circuit connected through the bus 1111.

The communication control block 1112 sends to and receives from the client terminal 1002 and the portal server 1003 various kinds of information under the control of the control block 1110 via the network interface 1113.

To the customer database block 1114, the user ID and password information of the users who have made agreement with the operators of the radiobroadcast information distribution servers 1006 is registered as the customer information by associating them with each other. When the authentication processing block 1115 has the function of authenticating the user based on the portal authentication results issued by the portal server 1003 and sent from the client terminal 1002, however, the customer database block 1114 may not be built.

The page information storage block 1116 stores the page information of the on-air list information distribution pages to be used for obtaining the radiobroadcast information (hereinafter specially referred to as the on-air list information) about the radio programs already broadcast by the radio stations supporting the radiobroadcast information distribution server 1006 that is to be managed by the radiobroadcast information distribution server 1006.

For information, the page information of the on-air list information distribution pages is described in the XML language, including the input boxes that allow the user of the client terminal 1002 to input the broadcast date/time information and the program names as the search keys for the on-air list information they want to obtain.

The on-air list information storage block 1117 stores the program names and the starting/ending times of the radio programs already broadcast by the radio stations supporting the radiobroadcast information distribution server 1006 as well as the on-air list information generated by listing the titles, the artist names and the starting times of the music broadcast in the radio programs.

When the control block 1110 receives the page information acquisition request signal requesting the page information of the on-air list information distribution pages sent from the client terminal 1002 via the network interface 1113 and the communication control block 1112 in sequence, it sends, based on the received page information acquisition request signal, the page information of the on-air list information distribution pages stored in the page information storage block 1116 to the client terminal 1002 via the communication control block 1112 and the network interface 1113 in sequence.

As a result, as the on-air list information request signal that requests the download of the on-air list information storing the search key for the on-air list information search, which the user wanted to obtain and which was entered on the page information of the on-air list information distribution pages, is sent from the client terminal 1002, the search block 1118 extracts the search key from the on-air list information request signal when it receives it via the network interface 1113 and the communication control block 1112 in sequence.

Then, based on such a search key, the search block 1118 searches for the given range that satisfies the search conditions shown by the search key in the entire on-air list information in the on-air list information storage block 1117 as the on-air list information that the user wants to obtain.

Thus, the control block 1110 sends the searched, acquisition-desired on-air list information to the client terminal 1002 via the communication control block 1112 and the network interface 1113 in sequence.

The now-on-air information storage block 1119 stores the now-on-air information including the program name, the starting and ending times of the radio program currently broadcast by the radio station supporting the radiobroadcast information distribution server 1006, and the title, the artist name and the starting time of the music broadcast currently broadcast in the radio program.

When the authentication processing block 1115 receives the user ID and password information of the user who uses the client terminal 1002, which is sent together with the now-on-air information request signal requesting the acquisition of the now-on-air information from the client terminal 1002, via the network interface 1113 and the communication control block 1112 in sequence, it verifies, as the authentication processing, whether the received user ID and password information is registered to the customer database block 1114 as the customer information.

As the user authentication method different from what uses the user ID and password information, the authentication processing block 1115 receives, the portal authentication results issued by the portal server 1003 and sent from the client terminal 1002 (after-mentioned authentication ticket) via the network interface 1113 and the communication control block 1112 in sequence and it sends the received portal authentication results to the portal server 1003 via the communication control block 1112 and the network interface 1113 in sequence.

Then, the authentication block 1115 receives, based on the transmission of the portal authentication results to the portal server 1003, the verification results sent from the portal server 1003 as a result of the execution of the authentication processing (namely the above-mentioned verification processes) of the portal authentication results via the network interface 1113 and the communication control block 1112 in sequence, and it verifies whether the user is the registered user who has made the agreement with the operator of the music-related service provision system 1000 based on the received verification results.

Thus, when the authentication processing block 1115 finishes the user authentication processing, it issues the server authentication results (after-mentioned service session ID) showing the results of the user authentication processing.

When the user is authenticated as the registered user as a result of the user authentication processing by the authentication processing block 1115, the control block 1110 sends the now-on-air information stored in the now-on-air information storage block 1119 to the client terminal 1002 together with the server authentication results via the communication control block 1112 and the network interface 1113 in sequence.

If the user is not authenticated as a registered user as a result of the user authentication processing by the authentication processing block 1115, the control block 1110 sends the authentication error to the client terminal 1002 together with the authentication error notice page information showing the error of authentication stored in the page information storage block 1116 via the communication control block 1112 and the network interface 1113 in sequence.

Thus, when the user requests for the acquisition of the now-on-air information, the control block 1110 verifies the authenticity of the user before distributing the now-on-air information. If it fails to verify the user's authenticity, it prevents the user from receiving the radiobroadcast information distribution service such as the now-on-air information distribution service provided by the radiobroadcast information distribution server 1006.

The authentication information storage block 1120 stores temporarily the server authentication results issued by the authentication processing block 1115 as well as various kinds of authentication information necessary for the authentication processing block 1115 to authenticate the user who uses the client terminal 1002.

(2-7) Processing Overviews of Servers

Next, we are going to explain briefly, using the sequence chart shown in FIGS. from 19 to 24, the processing to be carried out between the client terminal 1002 and the portal server 1003, the processing between the client terminal 1002 and other music data distribution servers 1004, the product sales server 1005 and the radiobroadcast information distribution server 1006.

(2-7-1) User Authentication Processing between Client Terminal 1002 and Portal Server 1003

Figure 19:
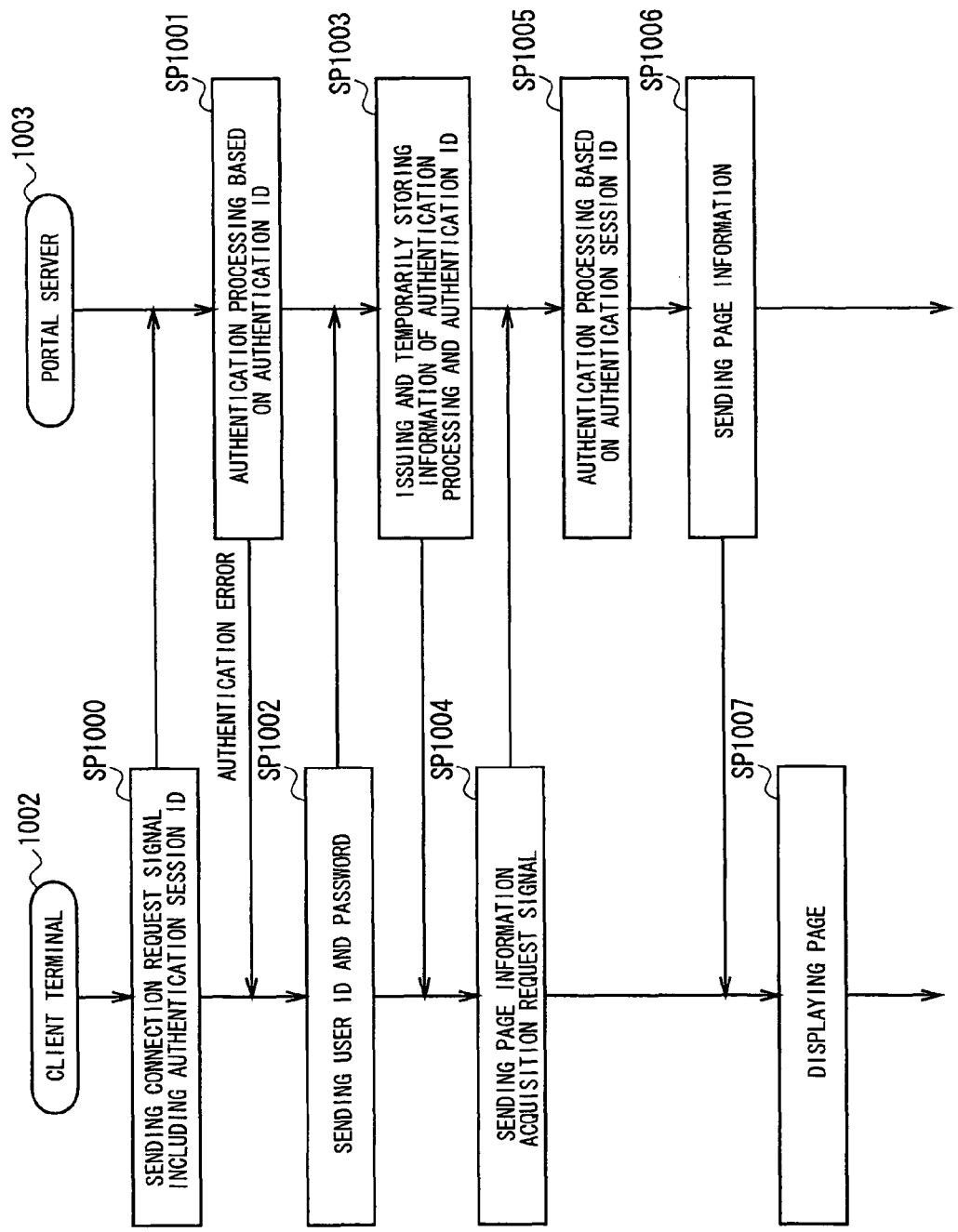
FIG. 19 is the sequence chart that shows the user authentication processing procedure between the client terminal and the portal server.

First of all, a description will be made on the user authentication processing to be carried out between the client terminal 1002 and the portal server 1003 using FIG. 19.

On the client terminal 1002 of the user who has an agreement with an operator of the music-related service provision system 1000, the control block 1023 starts the authentication request processing when the client terminal 1002 is turned on or the user presses a specific button on the operation input block 1020 and the input signal recognized by the operation input block 1020 is converted to a operation command in the input data processing block 1021.

When the control block 1023 starts the authentication request processing, it generates the connection request signal storing the authentication session ID temporarily stored in advance for the authentication information storage block 1038 and sends the generated connection request signal to the portal server 1003 via the communication control block 1032 and the network interface 1033 in sequence.

For information, the authentication session ID is the identification issued by the portal server 1003 for the purpose of identifying the status of the connection of communications (that is, a session) whenever communications are established between the client terminal 1002 and the portal server 1003 for the execution of various kinds of processing such as user authentication.

To such an authentication session ID, a given term of validity (e.g. about 1 minute) is set, based on the time of issuance by the portal server 1003, for its use for user authentication.

If the client terminal 1002 that obtained the authentication session ID from the portal server 1003 cannot provide the portal server 1003 with the authentication ID within the term of validity, the portal server 1003 judges that the communication specified by the authentication session ID was disconnected.

Thus, the portal server 1003 protects the authentication ID issued in the past from being abused by the user who has no agreement with an operator of the music-related service provision system 1 for the user authentication processing.

The authentication session ID temporarily stored in the authentication information storage block 1038 is what was issued by the portal server 1003 when communications were carried out between the client terminal 1002 and the portal server 1003 in order to carry out the user authentication processing in the past.

When the connection request signal is sent from the client terminal 1002 at the step SP1000, the control block 1050 of the portal server 1003 receives the connection request signal at the step SP1001 via the network interface 1053 and the communication control block 1052 in sequence, and it sends the authentication session ID stored in the received connection request signal to the authentication processing block 1056.

Then, the authentication processing block 1056 executes the user authentication processing under the control of the control block 1050 based on the authentication session ID received from the client terminal 1002 as the connection request signal.

As a result, if the authentication processing block 1056 could not authenticate that the user of the client terminal 1002 was a registered user due to the expiration of the validity of the authentication session ID received from the client terminal 1002, it sends the authentication error showing that the authentication failed to the client terminal 1002 via the communication control block 1052 and the network interface 1053 in sequence.

When the control block 1023 of the client terminal 1002 receives, at the step SP1002, the authentication error sent from the portal server 1003 via the network interface 1033 and the communication control block 1032 in sequence, it reads the user ID, the password and the device name stored in the authentication information storage block 1038, and sends the read user ID, password and device name to the portal server 1003 via the communication control block 1032 and the network interface 1033 in sequence.

At the step SP1003, the control block 1050 of the portal server 1003 receives the user ID, the password and the device name sent from the client terminal 1002 via the network interface 1053 and the communication control block 1052 in sequence, and it sends them to the authentication processing block 1056.

Under the control of the control block 1050, the authentication processing block 1056 checks whether the received user ID, password and device name are included in the customer information registered to the customer database block 1054 as the user authentication processing.

As a result, when the authentication processing block 1056 authenticates that the user of the client terminal 1002 is a registered user, it issues the authentication session ID, under the control of the control block 1050, for the current communication connection between the client terminal 1002 and the portal server 1003 as the portal authentication results, and it temporarily stores the issued authentication session ID in the authentication information storage block 1057.

Then, the control block 1050 sends the authentication session ID issued by the authentication processing block 1056 for the client terminal 1002 to the client terminal 1002 via the communication control block 1052 and the network interface 1053 in sequence.

At the step SP1004, the control block 1023 of the client terminal 1002 receives the authentication session ID sent from the portal server 1003 via the network interface 1033 and the communication control block 1032 in sequence, and it sends the received authentication session ID to the authentication processing block 1037.

The authentication processing block 1037 temporarily stores the received authentication session ID in the authentication information storage block 1038 under the control of the control block 1023.

Then, the control block 1023 sends the page information acquisition request signal for requesting the portal server 1003 for page information to the portal server 1003 together with the authentication session ID received from the portal server 1003 and temporarily stored in the authentication information storage block 1038 via the communication control block 1032 and the network interface 1033 in sequence.

At the step SP1005, the control block 1050 of the portal server 1003 receives the page information acquisition request signal and the authentication session ID sent from the client terminal 1002 via the network interface 1053 and the communication control block 1052 in sequence, and it sends the received authentication session ID to the authentication processing block 1056.

Under the control of the control block 1050, the authentication processing block 1056 carries out the user authentication processing to compare the received authentication session ID with what was issued to the client terminal 1002 and temporarily stored to the authentication information storage block 1057 in the above step SP1003.

As a result, when the authentication processing block 1056 authenticates that the user of the client terminal 1002 is a registered user at the step SP1006, it judges that the page information acquisition request from the client terminal 1002 is a legitimate request and extends the term of validity of the authentication session ID issued to the client terminal 1002.

Then, the control block 1050 reads the page information requested by the user from the page information storage block 1055 and sends the read page information to the client terminal 1002 together with the authentication session ID which term of validity was extended by the authentication processing block 1056 via the communication control block 1052 and the network interface 1053 in sequence.

At the step SP1007, the control block 1023 of the client terminal 1002 receives the page information sent from the portal server 1003 and the validity-extended authentication session ID via the network interface 1033 and the communication control block 1032 in sequence, and it not only sends the received page information to the page information generation block 1036 but also sends the validity-extended authentication session ID to the authentication processing block 1037.

The page information generation block 1036 generates, based on the page information supplied by the control block 1023, the image data of the page including the links to the music data distribution server 1004, the product sales server 1005 and the radiobroadcast information distribution server 1006, and it sends the generated image data to the display control block 1024.

Then, the display control block 1024 carries out the D/A conversion of the image data supplied from the page information generation block 1036 and sends the converted analog image signal to the display block 1025 to let the display block 1025 display the page of the portal server 1003 as the image of the analog image signal.

The authentication processing block 1037 stores temporarily, under the control of the control block 1023, the validity-extended authentication session ID received from the portal server 1003 by overwriting it on top of the original authentication session ID in the authentication information storage block 1038 to update the authentication session ID temporarily stored in the above-mentioned step SP1004 to what with a longer term of validity.

(2-7-2) User Authentication Processing between Client Terminal 1002 and Servers from 1004 to 1006

Next, we are going to explain the user authentication processing to be carried out between the client terminal 1002 and the music data distribution server 1004, the product sales server 1005 and the radiobroadcast information distribution server 1006.

There are two types of authentication processing between those devices. One type of user authentication processing is carried out, as mentioned in the above FIG. 19, by the client terminal 1002 by obtaining the page information from the portal server 1003 and then by accessing the music data distribution server 1004, the product sales server 1005 and the radiobroadcast information distribution server 1006 through the link embedded in the page information (hereinafter referred to as the indirect access authentication processing).

Another type is carried out by the client terminal 1002 by accessing directly, without obtaining the page information of the portal server 1003, the music data distribution server 1004, the product sales server 1005 and the radiobroadcast information distribution server 1006 based on URLs registered as book marks in advance (hereinafter referred to as the direct access authentication processing).

The indirect access authentication processing can be carried out in the same procedure irrespective of the combination between the client terminal 1002 and other 3 servers—the music data distribution server 1004, the product sales server 1005 and the radiobroadcast information distribution server 1006.

The direct access authentication processing can also be carried out in the same procedure irrespective of the combination between the client terminal 1002 and other 3 servers— the music data distribution server 1004, the product sales server 1005 or the radiobroadcast information distribution server 1006.

The only difference between the indirect access authentication processing and the direct access authentication processing is how to obtain the URL information that is used for the client terminal 1002 to access the music data distribution server 1004, the product sales server 1005 and the radiobroadcast information distribution server 1006. Once the URL information is obtained, both the indirect and the direct access authentication processing can be carried out in the same procedure.

In the following descriptions, therefore, the music data distribution server 1004 is picked up as a typical access destination server of the client terminal 1002 for simpler explanation, and we will explain the indirect access authentication processing and the direct access authentication processing by summarizing them as one type of user authentication processing.

First of all, at the step SP1010, the control block 1023 of the client terminal 1002 sends, in compliance with the URL information embedded in the page information as a link or the URL information already registered as a book mark, the service session ID read from the authentication information storage block 1038 to the music data distribution server 1004 together with the page information acquisition request signal requesting to obtain the page information of the music data distribution page (in the case of the product sales server 1005 and the radiobroadcast information distribution server 1006, it is the page information of the package media sales page and that of the on-air list information distribution page respectively) via the communication control block 1032 and the network interface 1033 in sequence.

For information, the service session ID is the identification information issued by the music data distribution server 1004, the product sales server 1005 and the radiobroadcast information distribution server 1006 accessed by the client terminal 1002 to identify the communication connection status of each server whenever the client terminal 1002 communicates with the music data distribution server 1004, the product sales server 1005 and the radiobroadcast information distribution server 1006 for the execution of various kinds of processing such as user authentication processing.

To such a service session ID, a given term of validity (e.g. about 1 minute) is set, based on the time of issuance by the music data distribution server 1004, the product sales server 1005 and the radiobroadcast information distribution server 1006, as is the case with the above-mentioned authentication session ID when it is used for user authentication.

If the client terminal 1002 that obtained the service session ID from each of the servers from 1004 to 1006 cannot provide the music data distribution server 1004, the product sales server 1005 and the radiobroadcast information distribution server 1006 with the service session ID within the term of validity, the music data distribution server 1004, the product sales server 1005 and the radiobroadcast information distribution server 1006, which issued the service session ID, judges that the communication specified by the service session ID has been disconnected.

Thus, the music data distribution server 1004, the product sales server 1005 and the radiobroadcast information distribution server 1006 protect the service session ID issued in the past from being abused by the user who has no agreement with an operator of the music-related service provision system 1 for the user authentication processing.

The service session ID temporarily stored in the authentication information storage block 1038 is what was issued by the music data distribution server 1004, the product sales server 1005 and the radiobroadcast information distribution server 1006 when communications were carried out between the client terminal 1002 and the music data distribution server 1004, the product sales server 1005 and the radiobroadcast information distribution server 1006 in order to carry out the user authentication processing in the past.

At the step SP1011, the control block 1070 of the music data distribution server 1004 receives the page information acquisition request signal and the service session ID sent from the client terminal 1002 via the network interface 1073 and the communication control block 1072 in sequence and it sends the received service session ID to the authentication processing block 1075.

Under the control of the control block 1070, the authentication processing block 1075 compares the received service session ID with what was already stored temporarily in the authentication information storage block 1077 to carry out the user authentication processing.

As a result, if the authentication processing block 1075 cannot authenticate that the user of the client terminal 1002 is a registered user because the term of the validity of the service session ID received from the client terminal 1002 has already expired, it judges that the acquisition request of the page information of the music data distribution page from the client terminal 1002 is not a legitimate request.

In this case, the control block 1070 sends the authentication error that shows the failure of the authentication and the shop code that identifies the music data distribution server 1004 to the client terminal 1002 via the communication control block 1072 and the network interface 1073 in sequence.

At the step SP1012, the control block 1023 of the client terminal 1002 receives the authentication error and the shop code sent from the music data distribution server 1004 via the network interface 1033 and the communication control block 1032 in sequence, recognizes that the user was not authenticated as a registered user by the music data distribution server 1040 from the received authentication error and stores temporarily the shop code received from the music data distribution server 1040 in the authentication information storage block 1038.

Then, the control block 1023 generates the authentication ticket issuance request signal which requests the portal server 1003 for the issuance of the authentication ticket to access the music data distribution server 1004 and sends the generated authentication ticket issuance request signal to the portal server 1003 together with the shop code of the music data distribution server 1004 and the authentication session ID already received from the portal server 1003 and temporarily stored in the authentication information storage block 1038 via the communication control block 1032 and the network interface 1033 in sequence.

At the step SP1013, the control block 1050 of the portal server 1003 receives the authentication ticket issuance request signal, the shop code and the authentication session ID sent from the client terminal 1002 via the network interface 1053 and the communication control block 1052 in sequence, and it sends them to the authentication processing block 1056.

The authentication processing block 1056 compares, under the control of the control block 1050, the received authentication session ID with what was already stored temporarily in the authentication information storage block 1057 to execute the user authentication processing.

As a result, if the authentication processing block 1056 cannot authenticate that the user of the client terminal 1002 is a registered user because the term of the validity of the authentication session ID received from the client terminal 1002 has already expired, it judges that the issuance request of the authentication ticket from the client terminal 1002 is not a legitimate request.

In this case, the control block 1050 sends the authentication error that shows the failure of the authentication to the client terminal 1002 via the communication control block 1052 and the network interface 1053 in sequence.

When the authentication processing block 1056 authenticates that the user of the client terminal 1002 is a registered user because the term of the validity of the authentication session ID received from the client terminal 1002 has not expired, it judges that the issuance request of the authentication ticket from the client terminal 1002 is a legitimate request. In this case, the control block 1050 advances the processing to the after-mentioned step SP1018.

At the step SP1014, when the control block 1023 of the client terminal 1002 receives the authentication error sent from the portal server 1003 via the network interface 1033 and the communication control block 1032 in sequence, it reads the user ID, the password and the device name stored in the authentication information storage block 1038 and sends the read user ID, password and device name to the portal server 1003 via the network interface 1033 and the communication control block 1032.

At the step SP1015, the control block 1050 of the portal server 1003 receives the user ID, the password and the device name sent from the client terminal 1002 via the network interface 1053 and the communication control block 1052 in sequence and it sends them to the authentication processing block 1056.

Under the control of the control block 1050, the authentication processing block 1056 checks whether the received user ID, password and device name are included in the customer information registered to the customer database block 1054 to execute the user authentication processing.

As a result, when the authentication processing block 1056 authenticates that the user of the client terminal 1002 is a registered user, it issues, under the control of the control block 1050, the authentication session ID for the current communication connection status between the client terminal 1002 and the portal server 1003 as a result of the portal authentication, and stores temporarily the issued authentication session ID in the authentication information storage block 1057.

The control block 1050 sends the authentication session ID issued to the client terminal 1002 by the authentication processing block 1056 to the client terminal 1002 via the communication control block 1052 and the network interface 1053 in sequence.

At the step SP1016, the control block 1023 of the client terminal 1002 receives the authentication session ID sent from the portal server 1003 via the network interface 1033 and the communication control block 1032 in sequence, and stores temporarily the received authentication session ID in the authentication information storage block 1038 using the authentication processing block 1037.

Then, the control block 1023 again generates the authentication ticket issuance request signal to request the portal server 1003 for the issuance of the authentication ticket and sends the generated authentication ticket issuance request signal to the portal server 1003 together with the shop code already stored temporarily in the authentication information storage block 1038 and the authentication session ID temporarily stored at this time via the communication control block 1032 and the network interface 1033 in sequence.

In this embodiment, the client terminal 1002 stores temporarily the shop code for the authentication information block 1038. In addition to it, the shop code can be sent to the portal server 1003 at the step SP1016 through the successive exchange of the shop codes at the time of the execution of the processing at the steps from SP1012 to 1016 between the client terminal 1002 and the portal server 1003 without storing them temporarily in the authentication information storage block 1038.

At the step SP1017, the control block 1050 of the portal server 1003 receives the authentication ticket issuance request signal, the shop code and the authentication session ID sent from the client terminal 1002 via the network interface 1053 and the communication control block 1052 in sequence, and it sends them to the authentication processing block 1056.

The authentication processing block 1056 compares, under the control of the control block 1050, the received authentication session ID with what is temporarily stored in the authentication information storage block 1057 to execute the user authentication processing.

As a result, if the authentication processing block 1056 authenticates that the user of the client terminal 1002 is a registered user because the term of the validity of the authentication session ID received from the client terminal 1002 has not expired, it judges that the issuance request of the authentication ticket from the client terminal 1002 is a legitimate request.

In the subsequent step SP1018, the authentication processing block 1056 issues, under the control of the control block 1050, the authentication ticket that permits access to the music data distribution server 1004 indicated by the shop code as the portal authentication results, based on the shop code and the authentication ticket issuance request signal received from the client terminal 1002 in the above-mentioned step SP1017.

At this stage, the authentication processing block 1056 stores temporarily, under the control of the control block 1050, the issued authentication ticket in the authentication information storage block 1057 and extends the term of validity of the authentication session ID issued to the client terminal 1002.

Then, the control block 1050 sends the authentication ticket issued by the authentication processing block 1056 to the client terminal 1002 together with the authentication session ID which term of validity has been extended by the authentication processing block 1056 via the communication control block 1052 and the network interface 1053 in sequence.

At the step SP1019, the control block 1023 of the client terminal 1002 receives the authentication ticket sent from the portal server 1003 and the validity-extended authentication session ID via the network interface 1033 and the communication control block 1032 in sequence, and it sends the received authentication session ID to the authentication processing block 1037.

Then, the control block 1023 sends the authentication ticket received from the portal server 1003 to the music data distribution server 1004 together with the authentication request signal via the communication control block 1032 and the network interface 1033 in sequence.

The authentication processing block 1037 stores temporarily, under the control of the control block 1023, the validity-extended authentication session ID received from the portal server 1003 by overwriting it on top of the original authentication session ID in the authentication information storage block 1038 to update the authentication session ID temporarily stored in the above-mentioned step SP1016 to what with a longer term of validity.

In the step SP1020, the control block 1070 of the music data distribution server 1004 receives the authentication request signal and the authentication ticket sent from the client terminal 1002 via the network interface 1073 and the communication control block 1072 in sequence.

Then, the control block 1070 sends the authentication ticket received from the client terminal 1002 to the portal server 1003 together with the authentication ticket verification request signal that requests to verify the authentication ticket via the network interface 1073 and the communication control block 1072 in sequence.

At the step SP1021, the control block 1050 of the portal server 1003 receives the authentication ticket verification request signal and the authentication ticket sent from the music data distribution server 1004 via the network interface 1053 and the communication control block 1052 in sequence, and it sends the received authentication ticket verification request signal and the authentication ticket to the authentication processing block 1056.

The authentication processing block 1056 compares, under the control of the control block 1050 and in compliance with the authentication ticket verification request signal, the received authentication ticket with what is temporarily stored in the authentication information storage block 1057 to verify the authentication ticket received from the music data distribution server 1004.

As a result, if the authentication processing block 1056 authenticates that the authentication ticket received from the music data distribution server 1004 is a normal authentication ticket, the control block 1050 sends the verification results showing its authenticity to the music data distribution server 1004 via the communication control block 1052 and the network interface 1053 in sequence.

At the step SP1022, the control block 1070 of the music data distribution server 1004 receives the verification results sent from the portal server 1003 via the network interface 1073 and the communication control block 1072 in sequence, and sends received verification results to the authentication processing block 1075.

Under the control of the control block 1070, the authentication processing block 1075 issues, based on the verification results, the service session ID for the current communication connection status between the client terminal 1002 and the music data distribution server 1004 as the server authentication results, and it stores temporarily the issued service session ID in the authentication information storage block 1077.

The control block 1070 sends the service session ID issued for the client terminal 1002 by the authentication processing block 1075 to the client terminal 1002 via the communication control block 1072 and the network interface 1073 in sequence.

At the step SP1023, the control block 1023 of the client terminal 1002 receives the service session ID sent from the music data distribution server 1004 via the network interface 1033 and the communication control block 1032 in sequence, and it stores temporarily the received service session ID in the authentication information storage block 1038 using the authentication processing block 1037.

Then, the control block 1023 sends the page information acquisition request signal requesting the page information of the music data distribution page to the music data distribution server 1004 together with the service session ID temporarily stored in the authentication information storage block 1038 via the communication control block 1032 and the network interface 1033 in sequence.

At the step SP1024, the control block 1070 of the music data distribution server 1004 receives the page information acquisition request signal and the service session ID sent from the client terminal 1002 via the network interface 1073 and the communication control block 1072 in sequence, and it sends the received service session ID to the authentication processing block 1075.

Under the control of the control block 1070, the authentication processing block 1075 compares the received service session ID with what was already issued to the client terminal 1002 and stored temporarily in the authentication information storage block 1077 at the above-mentioned step SP1022 to carry out the user authentication processing.

As a result, if the authentication processing block 1075 authenticates that the user of the client terminal 1002 is a registered user because the term of the validity of the service session ID received from the client terminal 1002 has not expired, it judges that the acquisition request of the page information of the music data distribution page from the client terminal 1002 is a legitimate request.

In this case, the control block 1070 proceeds to the operation in the next step SP1025 where it reads page information of the music data distribution page requested by the user from the page information storage block 1076, and it extends the term of validity of the service session ID issued to the client terminal 1002.

Then, the control block 1070 sends the page information of the music data distribution page read from the page information storage block 1076 to the client terminal 1002 together with the service session ID which term of validity was extended by the authentication processing block 1075 via the communication control block 1072 and the network interface 1073 in sequence.

At the step SP1026, the control block 1023 of the client terminal 1002 receives the page information of the music data distribution page and the validity-extended service session ID sent from the music data distribution server 1004 via the network interface 1033 and the communication control block 1032 in sequence, and it sends not only the received page information of the music data distribution page to the page information generation block 1036 but also the received service session ID to the authentication processing block 1037.

The authentication processing block 1037 stores temporarily, under the control of the control block 1023, the received validity-extended service session ID by overwriting it on top of the original service session ID in the authentication information storage block 1038 to update the service session ID temporarily stored in the above-mentioned step SP1023 to what with a longer term of validity.

The page information generation block 1036 generates the image data based on the page information of the music data distribution page and sends the generated image data to the display control block 1024.

The display control block 1024 carries out the D/A conversion of the image data supplied from the page information generation block 1036 and sends the converted analog image signal to the display block 1025 to let the display block 1025 display the music data distribution page as the image based on the analog signal.

(2-7-3) Music-Related Service Provision Processing

Figure 20:
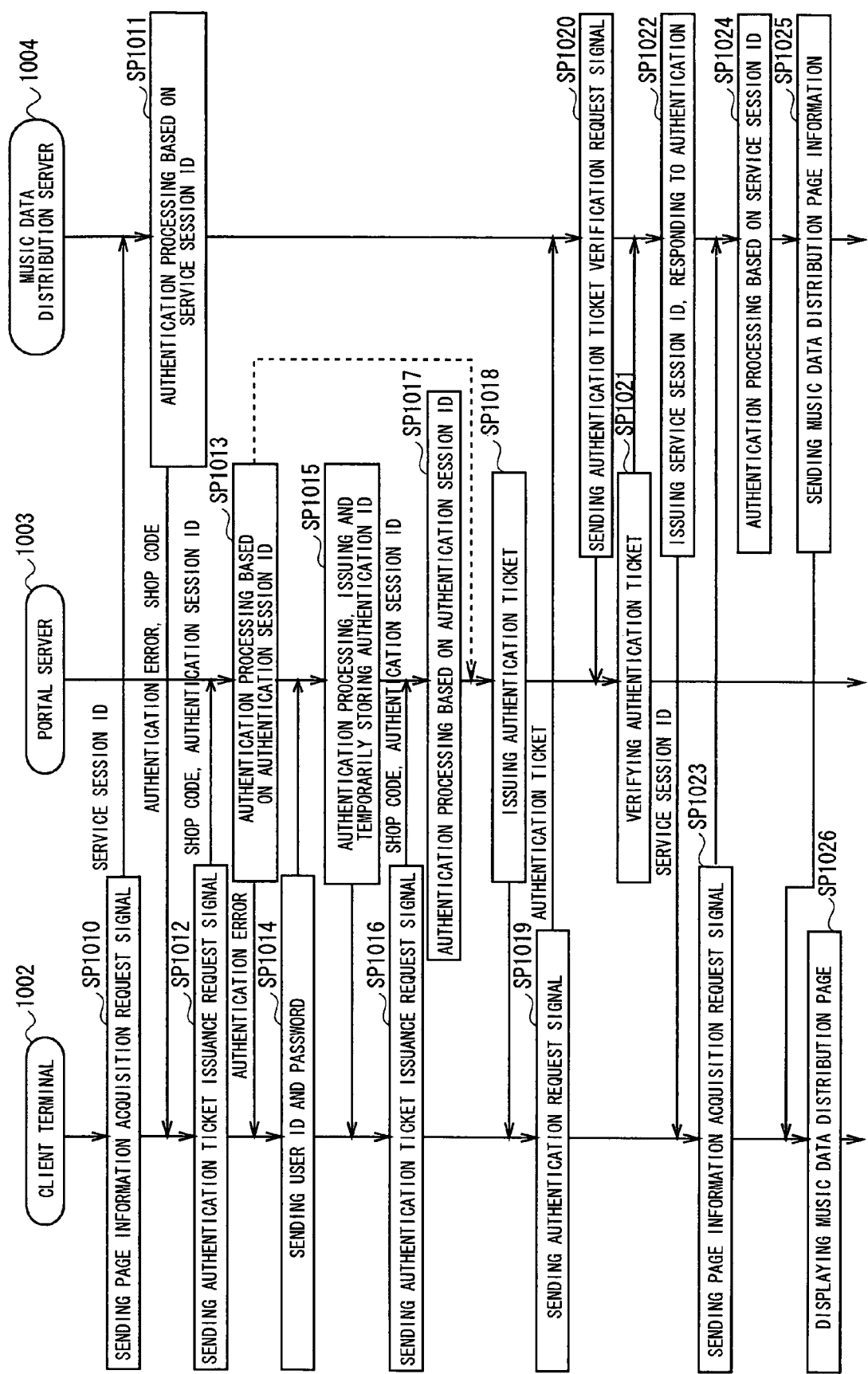
FIG. 20 is the sequence chart that shows the user authentication processing procedure between the client terminal and the music data distribution server.

Next, we are going to explain, using FIGS. from 21 to 24, the music-related service provision processing when the user receives the music data distribution service, the product sales service and the radiobroadcast information distribution service using the page information of the music data distribution page, the package media sales page and the on-air list information distribution page that the client terminal 1002 obtained from the music data distribution server 1004, the product sales server 1005 and the radiobroadcast information distribution server 1006 in the user authentication processing procedure after the completion of the user authentication processing procedure executed between the client terminal 1002 and 3 servers—the music data distribution server 1004, the product sales server 1005 and the radiobroadcast information distribution server 1006—mentioned in FIG. 20.

(2-7-3-1) Music Data Distribution Service Provision Processing Procedure

Figure 21:
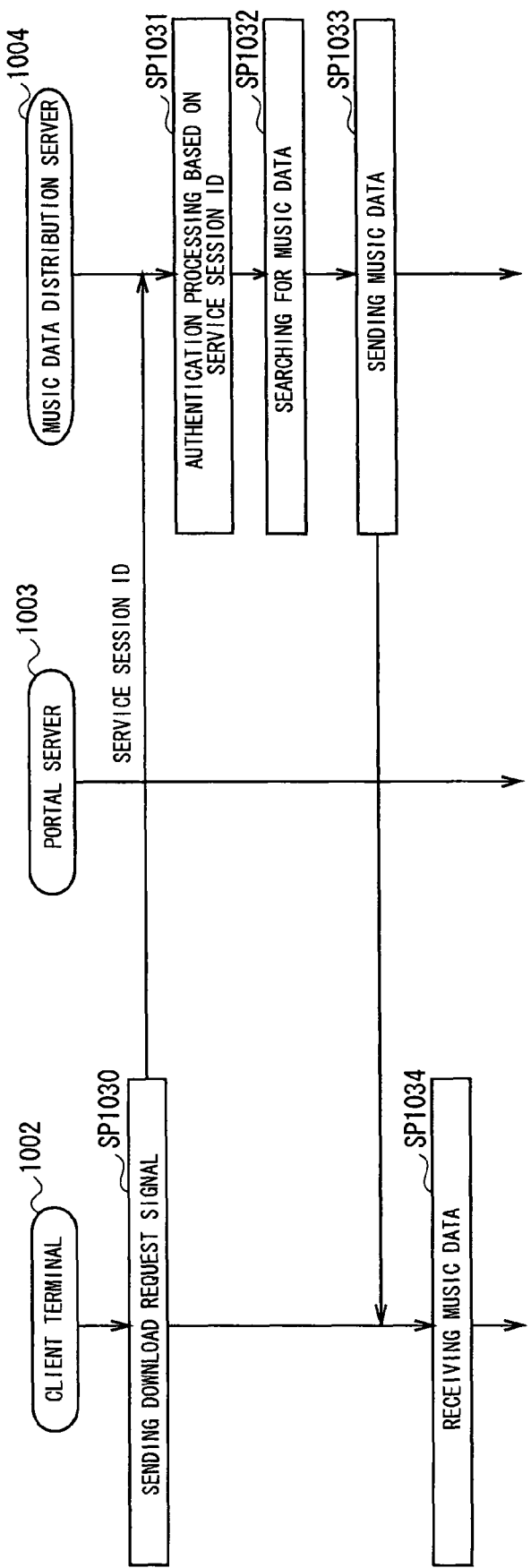
FIG. 21 is the sequence chart that shows the processing procedure of music data distribution service provision.

First of all, we are going to explain, using FIG. 21, the music data distribution service provision processing procedure when the client terminal 1002 receives the music data distribution service from the music data distribution server 1004.

At the step SP1030, when the control command that selects part of music data distribution page, which is displayed on the display block 1025 as an image, is entered from the input data processing block 1021, the control block 1023 of the client terminal 1002 generates the download request signal that requests the download of the download-desired music data based on the inputted control command.

Then, the control block 1023 sends the download request signal to the music data distribution server 1004 together with the service session ID that was issued by the music data distribution server 1004 and temporarily stored in the authentication information storage block 1038 via the communication control block 1032 and the network interface 1033 in sequence.

In the step SP1031, the control block 1070 of the music data distribution server 1004 receives the download request signal and the service session ID sent from the client terminal 1002 via the network interface 1073 and the communication control block 1072 in sequence, and it sends the received service session ID to the authentication processing block 1075.

The authentication processing block 1075 compares, under the control of the control block 1070, the received service session ID with what was already stored temporarily in the authentication information storage block 1077 to execute the user authentication processing.

As a result, when the authentication processing block 1075 authenticates that the user who requested the download of the music data using the client terminal 1002 is a registered user, the control block 1070 advances its operation to the next step SP1032.

At the step SP1032, the search block 1079 searches for the music data, which the user wants to download and which complies with the search conditions shown by the search key, from multiple pieces of music data in the music data storage block 1078 based on the search key stored in the download request signal.

Then, when the search block 1079 searched for the music data successfully, the control block 1070 extends the term of validity of the service session ID issued to the client terminal 1002 by the authentication processing block 1075 and advances its operation to the next step SP1033.

At the step SP1033, the control block 1070 reads the music data, which the user wants to download and which was searched for by the search block 1079, from the music data storage block 1078, and it sends the read download-desired music data to the client terminal 1002 together with the service session ID which term of validity was extended by the authentication processing block 1075 via the communication control block 1072 and the network interface 1073 in sequence.

At the step SP1034, the control block 1023 of the client terminal 1002 receives the download-desired music data and the validity-extended service session ID sent from the music data distribution server 1004 via the network interface 1033 and the communication control block 1032 in sequence, stores the received music data in the storage media 1029 and sends the received service session ID to the authentication processing block 1037.

The authentication processing block 1037 stores temporarily, under the control of the control block 1023, the received validity-extended service session ID by overwriting it on top of the original service session ID in the authentication information storage block 1038 to update the contents of the service session ID already stored temporarily in the authentication information storage block 1038.

Thus, the client terminal 1002 can download the music data that the user wants to obtain, using the music data distribution service provided by the music data distribution server 1004.

(2-7-3-2) Product Sales Service Provision Processing Procedure

Figure 22:
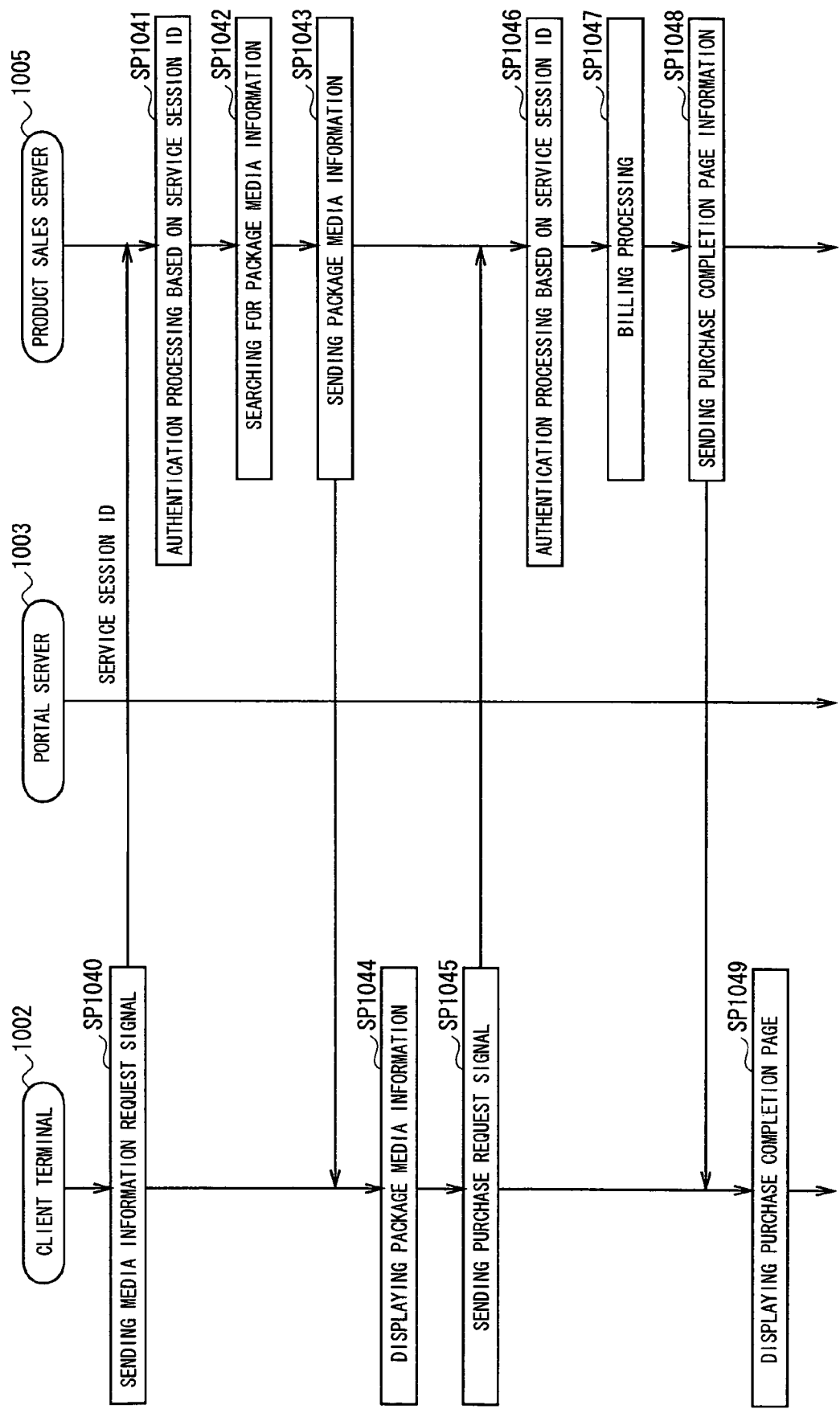
FIG. 22 is the sequence chart that shows the processing procedure of product sales service provision.

Next, we are going to explain, using FIG. 22, the product sales service provision processing procedure that the product sales server 1005 provides to the client terminal 1002.

At the step SP1040, when the control command that selects part of the package media sales page displayed on the display block 1025 as an image is inputted from the input data processing block 21, the control block 1023 of the client terminal 1002 generates the media information request signal that requests the package media information of a specific piece of package media corresponding to the inputted control command.

Then, the control block 1023 sends the media information request signal to the product sales server 1005 together with the service session ID that was already issued by the product server 1005 and is temporarily stored in the authentication information storage block 1038 via the communication control block 1032 and the network interface 1033 in sequence.

At the step SP1041, the control block 1090 of the product sales server 1005 receives the media information request signal and the service session ID sent from the client terminal 1002 via the network interface 1093 and the communication control block 1092 in sequence, and it sends the received service session ID to the authentication processing block 1095.

The authentication processing block 1095 compares, under the control of the control block 1090, the received service session ID with what was already stored temporarily in the authentication information storage block 1097 to execute the user authentication processing.

As a result, if the authentication processing block 1095 authenticates that the user who requested the package media information of the package media using the client terminal 1002 is a registered user, the control block 1090 advances the processing to the next step SP1042.

At the step SP1042, the search block 1099 searches for, based on the search key stored in the media information request signal, the package media information of the specific piece of package media that satisfies the search conditions shown by the search key from the multiple pieces of package media information in the package media information storage block 1098.

Then, when the search block 1099 searched for the package media information, the control block 1090 extends the term of validity of the service session ID issued to the client terminal 1002 by the authentication processing block 1095 and advances the processing to the next step SP1043.

At the step SP1043, the control block 1090 read, from the package media information storage block 1098, the package media information searched by the search block 1099 and sends the read package media information to the client terminal 1002 together with the service session ID which term of validity was extended by the authentication processing block 1095 via the communication control block 1092 and the network interface 1093 in sequence.

At the step SP1044, the control block 1023 of the client terminal 1002 receives the package media information and the validity-extended serviced session ID sent from the product sales server 1005 via the network interface 1033 and the communication control block 1032 in sequence, and it sends the received package media information to the page information generation block 1036, and the received service session ID to the authentication processing block 1037 respectively.

The authentication processing block 1037 stores temporarily, under the control of the control block 1023, the received and validity-extended service session ID by overwriting it on top of the original service session ID in the authentication information storage block 1038 to update the contents of the service session ID already stored temporarily in the authentication information storage block 1038.

The page information generation block 1036 generates the image data based on the package media information supplied by the control block 1023, converts the generated image data to the analog image signal with the display control block 1024 and sends it to the display control block 1025.

Thus, the control block 1023 makes the display block 1025 display the package media information as the image based on the analog image signal and advances the processing to the step SP1045.

At the step SP1045, when the control command that requests the purchase of the package media corresponding to the package media information displayed on the display block 1025 as an image is inputted from the input data processing block 1021, the control block 1023 generates the purchase request signal requesting the purchase of the package media in compliance with the inputted control command.

Then, the control block 1023 sends the purchase request signal to the product sales server 1005 together with the service session ID already received from the product sales server 1005 and temporarily stored in the authentication information storage block 1038 (namely, validity-extended service session ID) via the communication control block 1032 and the network interface 1033 in sequence.

At the step SP1046, the control block 1090 of the product sales server 1005 receives the purchase request signal and the service session ID sent from the client terminal 1002 via the network interface 1093 and the communication control block 1092 in sequence, and it sends the received service session ID to the authentication processing block 1095.

Under the control of the control block 1090, the authentication processing block 1095 compares the received service session ID with what was already stored temporarily in the authentication information storage block 1097 to carry out the user authentication processing.

As a result, if the authentication processing block 1095 authenticates that the user who requested the purchase of the package media using the client terminal 1002 is a registered user, the control block 1090 advances the processing to the next step SP1047.

At the step SP1047, the control block 1090 carries out the purchase processing to deliver the purchase-requested package media to the user of the client terminal 1002, sends the billing information for the billing processing to the user who purchased the package media to the billing server 1008 via the communication control block 1092 and the network interface 1093 in sequence, and it makes the billing server 1008 execute the billing processing for the purchase of the package media by the user.

The control block 1090 extends the term of validity of the service session ID issued to the client terminal 1002 by the authentication processing block 1095.

At the step SP1048, the control block 1090 sends, after the completion of the billing processing, the purchase completion page information that shows the completion of the purchase processing of the package media to the client terminal 1002 together with the service session ID which term of validity was extended by the authentication processing block 1095 via the communication control block 1092 and the network interface 1093 in sequence.

At the step SP1049, the control block 1023 of the client terminal 1002 receives the purchase completion page information sent from the product sales server 1005 and the validity-extended service session ID via the network interface 1033 and the communication control block 1032 in sequence, sends the received purchase completion page information to the page information generation block 1036 and transmits the service session ID received from the product sales server 1005 to the authentication processing block 1037.

The authentication processing block 1037 stores temporarily, under the control of the control block 1023, the received and validity-extended service session ID by overwriting it on top of the original service session ID in the authentication information storage block 1038 to update the contents of the service session ID already stored temporarily in the authentication information storage block 1038.

The page information generation block 1036 generates the image data based on the purchase completion page information supplied by the control block 1023, converts the generated image data to the analog image signal with the display control block 1024 and sends it to the display block 1025.

Then, the control block 1023 makes the display block 1025 display the purchase completion page as the image based on the analog image signal.

Thus, the client terminal 1002 allows the user to purchase the desired package media using the product sales service provided by the product sales server 1005.

Figure 23:
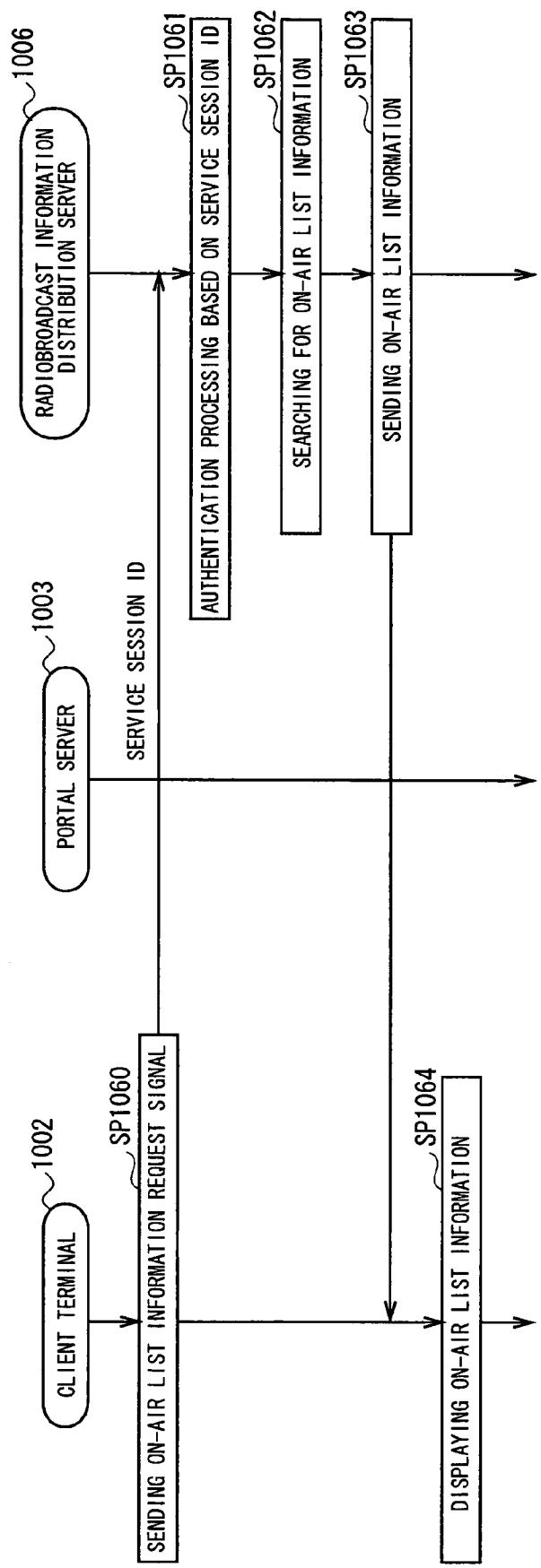
FIG. 23 is the sequence chart that shows the processing procedure (1) of radiobroadcast information (on-air list information) distribution service provision.
Figure 24:
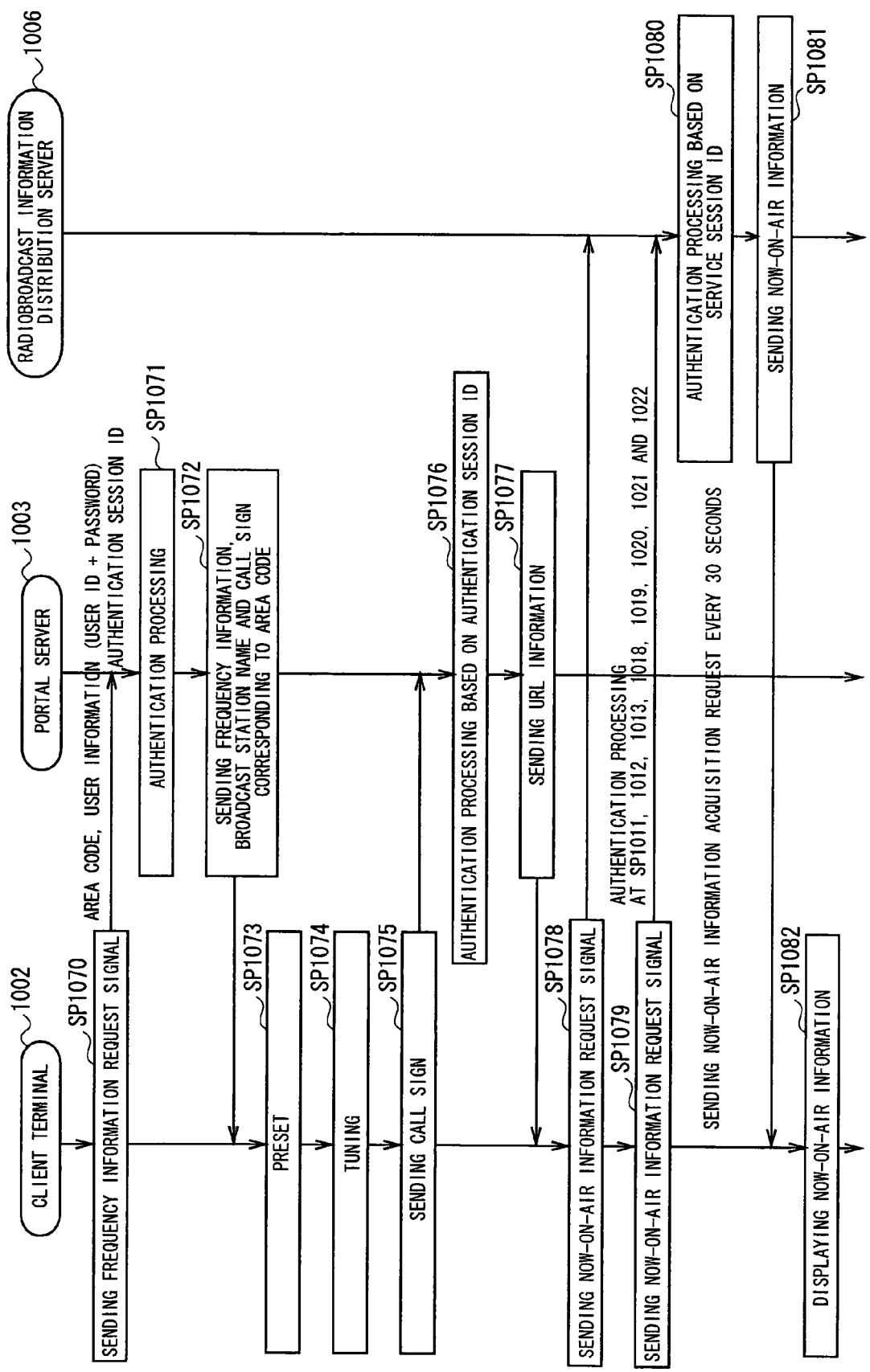
FIG. 24 is the sequence chart that shows the processing procedure (2) of radiobroadcast information (now-on-air information) distribution service provision.

(2-7-3-3) On-Air List Information Distribution Service Provision Processing Procedure Next, using FIG. 23, we are going to explain the radiobroadcast information distribution service provision processing procedure when the client terminal 1002 receives the on-air list information distribution service in particular from the radiobroadcast information distribution server 1006 as the radiobroadcast information distribution service.

At the step SP1060, when the search key for the desired on-air list information search is entered in the input box on the on-air list information distribution page displayed as an image by the display block 1025 and the control command corresponding to the character string showing the entered search key is entered from the input data processing block 1021, the control block 1023 of the client terminal 1002 generates, based on the entered control command, the on-air list information request signal requesting the download of the desired on-air list information.

Then, the control block 1023 sends the on-air list information request signal to the radiobroadcast information distribution server 1006 together with the service session ID already issued by the radiobroadcast information distribution server 1006 and temporarily stored in the authentication information storage block 1038 via the communication control block 1032 and the network interface 1033 in sequence.

At the step SP1061, the control block 1110 of the radiobroadcast information distribution server 1006 receives the on-air list information request signal and the service session ID sent from the client terminal 1002 via the network interface 1113 and the communication control block 1112 in sequence, and it sends the received service session ID to the authentication processing block 1115.

The authentication processing block 1115 compares, under the control of the control block 1110, the received service session ID with what was already stored, temporarily in the authentication information storage block 1120 to carry out the user authentication processing.

As a result, when the authentication processing block 1115 authenticates that the user who uses the client terminal 1002 and requested the on-air list information is a registered user, the control block 1110 advances the processing to the next step SP1062.

At the step SP1062, the search block 1118 searches for, based on the search key stored in the on-air list information request signal, a given range of on-air information satisfying the search conditions of the search key as the desired on-air list information in the entire on-air list information in the on-air list information storage block 1117.

Then, when the search block 1118 searched for the on-air list information, the control block 1110 extends the term of validity of the service session ID issued to the client terminal 1002 by the authentication processing block 1115 and advances its operation to the next step SP1063.

At the step SP1063, the control block 1110 reads the on-air list information searched for by the search block 1118 from the on-air list information storage block 1117, and it sends the read on-air list information to the client terminal 1002 together with the service session ID which term of validity was extended by the authentication processing block 1115 via the communication control block 1112 and the network interface 1113 in sequence.

At the step SP1064, the control block 1023 of the client terminal 1002 receives the on-air list information sent from the radiobroadcast information distribution server 1006 and the validity-extended service session ID via the network interface 1033 and the communication control block 1032 in sequence, sends the received on-air list information to the page information generation block 1036 and transmits the service session ID received from the radiobroadcast information distribution server 1006 to the authentication processing block 1037.

The authentication processing block 1037 stores temporarily, under the control of the control block 1023, the received and validity-extended service session ID by overwriting it on top of the original service session ID in the authentication information storage block 1038 to update the contents of the service session ID already stored temporarily in the authentication information storage block 1038.

The page information generation block 1036 generates the image data based on the on-air list information supplied from the control block 1023, converts the generated image data to the analog image signal with the display control block 1024 and sends it to the display block 1025 to make the display block 1025 show the on-air list information as an image based the analog image signal.

Thus, the client terminal 1002 allows the user to obtain the desired on-air information using the radiobroadcast information distribution service provided by the radiobroadcast information distribution server 1006.

(2-7-3-4) Now-on-Air Information Distribution Service Provision Processing Procedure Next, we are gong to explain the radiobroadcast information distribution service provision processing procedure when the client terminal 1002 receives the on-air list information distribution service in particular from the radiobroadcast information distribution server 1006 as the radiobroadcast information distribution service.

However, the radiobroadcast information distribution server 1006 that provides the now-on-air information is prepared for each radio station (call sign).

The client terminal 1002 may not store the URL information of the radiobroadcast information distribution server 1006 supporting each radio station at the default state.

Therefore, we will explain the radiobroadcast information distribution service provision processing procedure by giving an example of the case that the portal server 1003 manages the URL information of each radiobroadcast information distribution server 1006 by call sign.

In the radiobroadcast information distribution service provision processing procedure, it is assumed that the authentication information storage block 1038 does not store temporarily the authentication session ID when the client terminal 1002 requests the portal server 1003 for the frequency information that shows the broadcasting frequency in order to automatically preset the broadcasting frequency for each radio station. The client terminal 1002, therefore, is to send the user ID, the password and the device name to the portal server 1003.

At the step SP1070, when the operation command requesting to automatically preset the broadcasting frequency of each radio station is entered from the input data processing block 1021, the control block 1023 of the client terminal 1002 sends the frequency information request signal requesting to obtain the frequency information of receivable broadcasting frequency of each radio station to the portal server 1003 together with the area code entered by the user, the user ID, the password and the device name stored in the authentication information storage block 1038 via the communication control block 1032 and the network interface 1033 in sequence.

At the step SP1071, the control block 1050 of the portal server 1003 receives the frequency information request signal, the area code, the user ID, the password and the device name sent from the client terminal 1002 via the network interface 1053 and the communication control block 1052 in sequence, and it sends the user ID, the password and the device name to the authentication processing block 1056 from the received information.

Under the control of the control block 1050, the authentication processing block 1056 compares the received user ID, password and device name with the customer information registered to the customer database block 1054 to carry out the user authentication processing.

As a result, when the authentication processing block 1056 authenticates that the user of the client terminal 1002 is a registered user and judges that the acquisition request of the frequency information from the client terminal 1002 is a legitimate request, it issues, under the control of the control block 1050, the authentication session ID for the communication connection between the current client terminal 1002 and the portal server 1003, and it temporarily stores the issued authentication session ID in the authentication information storage block 1057.

Then, the control block 1050 advances the processing to the next step SP1072, where it searches for, lists and reads the frequency information corresponding to the area code, radio station name and call sign from the list of multiple kinds of frequency information, radio station names and call signs in the frequency information storage block 1058 based on the area code received from the client terminal 1002.

The control block 1050 sends the frequency information, radio station names and call signs that it listed and read from the frequency information storage block 1058 to the client terminal 1002 together with the authentication session ID issued by the authentication processing block 1056 to the client terminal 1002 at the above-mentioned step SP1071 via the communication control block 1052 and the network interface 1053 in sequence.

At the step SP1073, the control block 1023 of the client terminal 1002 receives the list of the frequency information, the radio station names and the call signs sent from the portal server 1003 via the network interface 1033 and the communication control block 1032 in sequence, sends the authentication session ID received from the portal server 1003 to the authentication processing block 1037 and transmits the list of the frequency information, the radio station names and the call signs to the display control block 1024.

The authentication processing block 1037 temporarily stores, under the control of the control block 1023, the received authentication session ID in the authentication information storage block 1038.

The display control block 1024 sends the list of the frequency information, the radio station names and the call signs provided by the control block 1023 to the display block 1025 so that the display block 1025 can display the list.

The control block 1023 stores, based on the selection command input from the input data processing block 1021 at this time the selected frequency information, radio station names and call signs in the storage media 1029 as presets and advances the processing to the next step SP1074.

At the step SP1074, the control block 1023 controls the tuner block 1031 in compliance with the tuning control command entered from the input data processing block 1021 so that it extracts the radiobroadcast signal of the radiobroadcast that is broadcast in the frequency corresponding to the tuning control command from the broadcast waves.

Thus, the tuner block 1031 extracts the radiobroadcast signal that is broadcast in the broadcasting frequency from the radiobroadcast waves received by the broadcast signal receiving block 30, carries out given receiving processing such as decoding and sends the audio data obtained from the processing to the audio control block 1026.

The audio control block 1026 converts the audio data given by the tuner block 1031 to the analog audio signal and sends it to the speaker 1027, which outputs the audio of the selected radio program.

At the step SP1075, the radiobroadcast display control block 1039 reads, under the control of the control block 1023, the stored call sign in accordance with the frequency information showing the broadcasting frequency corresponding to the above-mentioned tuning control command and sends the read call sign to the portal server 1003 together with the authentication session ID already stored temporarily in the authentication information storage block 1038 via the communication control block 1032 and the network interface 1033 in sequence.

At the step SP1076, the control block 1050 of the portal server 1003 receives the call sign and the authentication session ID sent from the client terminal 1002 via the network interface 1053 and the communication control block 1052 in sequence, and it sends the received authentication session ID to the authentication processing block 1056.

The authentication processing block 1056 compares, under the control of the control block 1050, the received authentication session ID with what was already stored temporarily in the authentication information storage block 1057 to execute the user authentication processing.

As a result, when the authentication processing block 1056 authenticates that the authentication ID received from the client terminal 1002 is still valid and that the user who used the client terminal 1002 to send the call sign is a registered user, the control block 1050 advances the processing to the next stage SP1077.

At the step SP1077, the control block 1050 searches for, based on the call sign received from the client terminal 1002, the URL information linked to the call sign from among multiple pieces of URL information in the URL storage block 1059.

The control block 1050 extends the term of validity of the authentication session ID issued for the client terminal 1002 with the authentication processing block 1056.

Then, the control block 1050 reads the searched URL information from the URL storage block 1059 and sends the read URL information to the client terminal 1002 together with the authentication session ID which validity was extended by the authentication processing block 1056 via the communication control block 1052 and the network interface 1053 in sequence.

At the step SP1078, the control block 1023 of the client terminal 1002 receives the URL information and the validity-extended authentication session ID sent from the portal server 1003 via the network interface 1033 and the communication control block 1032 in sequence, sends the received authentication session ID to the authentication processing block 1037 and transmits the URL information to the radiobroadcast display control block 1039.

Under the control of the control block 1023, the authentication processing block 1037 stores temporarily the received and validity-extended authentication session ID in the authentication information storage block 1038 by overwriting it on top of the original authentication session ID to update the contents of the authentication session ID already stored temporarily in the authentication information storage block 1038.

The radiobroadcast display control block 1039 temporarily stores, under the control of the control block 1023, the URL information given by the control block 1023 by associating it with the call sign stored in the storage media 1029.

The radiobroadcast display control block 1039 sends, under the control of the control block 1023, the now-on-air information request signal that requests the now-on-air information in accordance with the URL information temporarily stored in the storage media 1029 together with the service session ID already received from the radiobroadcast information distribution server 1006 and temporarily stored in the authentication information storage block 1038 via the communication control block 1032 and the network interface 1033 in sequence.

In the radiobroadcast information distribution service provision processing procedure, the processing that sends the now-on-air information request signal and the service session ID to the radiobroadcast information distribution server 1006 from the client terminal 1002 at the step SP1078 corresponds to the processing at the step SP1010 mentioned in FIG. 20.

Therefore, in the radiobroadcast information distribution service provision processing procedure, the user authentication processing similar to those at the steps from SP1011 to SP1013 and those from SP1018 to SP1022 explained in FIG. 20 are to be executed in sequence in the client terminal 1002, the radiobroadcast information distribution server 1006 and the portal server 1003 after the processing at the step SP1078. Then, the processing proceeds to the next step SP1079.

At the step SP1079, the radiobroadcast display control block 1039 of the client terminal 1002 sends, under the control of the control block 1023, the now-on-air information request signal to the radiobroadcast information distribution server 1006, in accordance with the URL information temporarily stored in the storage media 1029, together with the service session ID already received from the radiobroadcast information distribution server 1006 and temporarily stored in the authentication information storage block 1038 via the communication control block 1032 and the network interface 1033 in sequence.

At the step SP1080, the control block 1110 of the radiobroadcast information distribution server 1006 receives the now-on-air information request signal and the service session ID sent from the client terminal 1002 via the network interface 1113 and the communication control block 1112 in sequence, and it sends the received authentication session ID to the authentication processing block 1115.

The authentication processing block 1115 compares, under the control of the control block 1110, the received service session ID with what was already stored temporarily in the authentication information storage block 1120 to execute the user authentication processing.

As a result, if the authentication processing block 1115 authenticates that the user of the client terminal 1002 is a registered user, it judges that the acquisition request of the now-on-air information from the client terminal 1002 is a legitimate request.

Then, if the authentication processing block 1115 authenticates that the user of the client terminal 1002 is a registered user, the control block 1110 extends the term of validity of the service session ID issued by the authentication processing block 1115 to the client terminal 1002, and it advances the processing to the next step SP1081.

At the step SP1081, the control block 1110 reads the now-on-air information from the now-on-air information storage block 1119 and sends the read now-on-air information to the client terminal 1002 together with the service session ID which term of validity was extended by the authentication processing block 1115 via the communication control block 1112 and the network interface 1113 in sequence.

At the step SP1082, the control block 1023 of the client terminal 1002 receives the now-on-air information and validity-extended service session ID from the radiobroadcast information distribution server 1006 via the network interface 1033 and the communication control block 1032 in sequence, sends the received service session ID to the authentication processing block 1037 and transmits the now-on-air information to the radiobroadcast display control block 1039.

The authentication processing block 1037 stores temporarily, under the control of the control block 1023, the received validity-extended service session ID by overwriting it on top of the original service session ID in the authentication information storage block 1038 to update the contents of the service session ID temporarily stored in the authentication information storage block 1038.

The radiobroadcast display control block 1039 sends the now-on-air information given by the control block 1023 to the display block 1025 via the display control block 1024 so that the display block 1025 can display the now-on-air information of the radio program of the currently receiving radiobroadcast.

In such radiobroadcast information distribution service provision processing procedure, the client terminal 1002 requests repeatedly and regularly the now-on-air information in the step SP1079 later, and the radiobroadcast information distribution server 1006 receives the acquisition request from the client terminal 1002 to carry out the processing at the steps SP1080 and SP1081 in sequence.

Thus, the client terminal 1002 can show the name of the radio program of the currently receiving radiobroadcast, the program broadcast starting time, the program broadcast ending time, the title of the music currently broadcast in the radio program, the artist name and the music broadcast starting time on the display block 1025 of the client terminal 1002 as the now-on-air information by updating them momently.

The above configuration would make it possible to achieve the same effects as those of the above-mentioned Embodiment 1 in the content sales system in Embodiment 2.

The HTTP message program 36 and the communicator program 37 among the program modules of the terminal device 4 (FIG. 6) described in the above Embodiment 1 are the program modules that can realize the functions similar to the communication control block 1032 (FIG. 14) of the client terminal 1002 described in Embodiment 2.

The content playback module 38 (FIG. 6) is the program module that can achieve the functions similar to those of the encoder/decoder block 1034 (FIG. 14).

The copyright protection management module 39 (FIG. 6) is the program module that can achieve the functions similar to those of the copyright management block 1035 (FIG. 14).

The Internet radio channel selection playback module 43 (FIG. 6) is the program module that can achieve the functions similar to those of the control block 1023 and the audio control block 1026 (FIG. 14).

The music purchase & playback module 44 (FIG. 6) is the program module that can achieve the functions similar to those of the control block 1023 and the audio control block 1026 (FIG. 14).

The XML browser 50 (FIG. 6) is the program module that can achieve the functions similar to those of the input data processing block 1021 and page information generation block 1036 (FIG. 14).

The hard disk content controller 42, the database access module 40 and the content data access module 41 (FIG. 6) are the program modules that can achieve the functions similar to those of the control block 1023 (FIG. 14).

The authentication library 47A (FIG. 6) of the library 47 is the program module that can achieve the functions similar to those of the authentication processing block 1037 and the authentication information storage block 1038 (FIG. 14).

The clip library 47B (FIG. 6) of the library 47 is the program module that can achieve the functions similar to those of the control block 1023 (FIG. 14).

The related information display module 45 (FIG. 6) is the program module that can achieve the functions similar to those of the radiobroadcast display control block 1039 (FIG. 14).

The tuner channel selection playback/recording module 45 (FIG. 6) is the program module that can achieve the functions similar to those of the control block 1023, the audio control block 1026 and the tuner block 1031 (FIG. 4).

The audio user interface 51 (FIG. 6) is the program module that can achieve the functions similar to those of the input data processing block 1021, the control block 1023 and the display control block 1024 (FIG. 14).

The CD playback module 48 (FIG. 6) is the program module that can achieve the functions similar to those of the audio control block 1026, the external recording media recording & playing-back block 1028 (FIG. 14).

The HDD playback module 49 (FIG. 6) is the program module that can achieve the functions similar to those of the control block 1023 and the audio control block 1026 (FIG. 14).

Namely, even in the terminal device 42 of the hardware circuit block configuration in the above-mentioned Embodiment 1, the CPU 11 can carry out the processing similar to that of the client terminal 1002 of the functional circuit block configuration in No. 2 embodiment using various kinds of program modules.

On the terminal management server 3A (FIG. 2) in the above-mentioned Embodiment 1, the control block 60 functions in the same way as the control block 1050, the communication control block 1052 and the authentication processing block 1056 of the portal server 1003 in compliance with various kinds of programs by selecting properly various programs to be stored in the ROM 61 and the hard disk drive 63 in compliance with the functions of the portal server 1003 (FIG. 15) in the above-mentioned Embodiment 2. In addition, the ROM 61, the RAM 62 and the hard disk drive 63 can be used as is the case with the customer database block 1054, the page information storage block 1055, the authentication information storage block 1057, the frequency information storage block 1054 and the URL storage block 1059 of the portal server 1003.

On the content server 3B (FIG. 3) in the above-mentioned Embodiment 1, the control block 70 functions in the same way as the control block 1070, the communication control block 1072, the authentication processing block 1075 and the search block 1079 of the music data distribution server 1004 by properly selecting various programs to be stored in the ROM 71 and the hard disk drive 73 in compliance with the functions of the music data distribution server 1004 (FIG. 16) in the above-mentioned Embodiment 2. In addition, the ROM 71, the RAM 72 and the hard disk drive 73 can be used as is the case with the customer database block 1074, the page information storage block 1076, the music data storage block 1078 and the authentication information storage block 1077 of the music data distribution server 1004.

(3) Other Embodiments

In the above-mentioned types of embodiment, we described the case in which content data is to be sent in a unilateral way to a destination terminal device 4 when the content data is to be given to another user as a present. The present invention, however, is not limited to the above-mentioned operation, but it may send the information of the content present to another user and let him/her operate the machine to receive the content data. In this case, another user selects a desirable terminal device 4 through which he/she can receive the content data before receiving the content data.

In the above-mentioned embodiment, we explained the case in which the terminal devices 4 are to be uniquely specified with the user ID by allowing the overlaps of the device names among multiple users but associating the device names with unique user IDs. The present invention, however, is not limited to the above-mentioned operation, but it may not permit the overlap of the device names among multiple users. In this case, the service utilizing system 1 allows the user to specify uniquely a particular terminal device 4 by specifying simply a device name instead of a user ID.

In the above-mentioned types of embodiment, we described the case in which the permission of deleting a device name should be obtained from the terminal management server 3A before deleting the device name when deleting the device name of a terminal device 4. The present invention, however, is not limited to the above-mentioned operation, but it allows the user to delete the device name of a terminal device 4 first and then to send the deletion request of the device name to the terminal management server 3A. In this case, the communications between the terminal device 4 and the terminal management server 3A can be simplified.

In the above-mentioned types of embodiment, we stated the case in which SSL is to be used for all the communications between the terminal device 4 and the terminal management server 3A. The present invention, however, is not limited to the above-mentioned operation, but it allows the use of other encryption methods or communication systems to prevent the leakage of information.

In the above-mentioned types of embodiment, we described the case in which the management device of the service utilizing system 1 is to be configured with the terminal management server 3A and the content server 3B. The present invention, however, is not limited to the above-mentioned operation, but it allows the user to configure the management device with only one server or with 3 or more servers.

In the above-mentioned types of embodiment, we stated the case in which the CPU 11 in the terminal device 4 decompresses the service utilizing program stored in the ROM 13 in advance on the RAM 20 to carry out the above-mentioned sequences of device name registration, device name deletion, content purchase and content present in accordance with the service utilizing program. The present invention, however, is not limited to the above-mentioned operation, but it may be arranged to carry out the sequences of device name registration, device name deletion, content purchase and content present by installing the program storage media storing the service utilizing program to the terminal device 4.

In the above-mentioned types of embodiment, we explained the case in which the CPU of the control block 60 decompresses the management program stored in advance in the ROM 61 on the RAM 62, and carries out the sequences of above-mentioned device name registration, device name deletion, content purchase and content present in the terminal management server 3A. The present invention, however, is not limited to the above-mentioned operation, but it may be arranged to carry out the sequences of device name registration, device name deletion, content purchase and content present by installing the program storage media storing the management program to the terminal management server 3A.

In the above-mentioned Embodiment 1, we explained the case in which the terminal device 4 as the service utilizing system may be configured by the CPU 11 and the communication processing block 22 as the means of the registration information transmission and the registration completion information reception, and the terminal management server 3A as the management device may be configured with the control block 60 and the data communication processing block 64 as the means of the registration information reception and the registration completion information transmission. The present invention, however, is not limited to the above-mentioned configuration, but it may allow the user to configure the service utilizing system and the management device with other various combinations of circuits.

In the above-mentioned Embodiment 2, we explained the case in which the service utilizing system may be configured by the control block 1023 and the communication control block 1032 as the means of the registration information transmission and the registration completion information reception, and the portal server 1003 as the management device may be configured by the control block 1050 and the communication control block 1052 as the means of the registration information reception and the registration completion information transmission. The present invention, however, is not limited to the above-mentioned configuration, but it may allow the user to configure the service utilizing system and the management device with other various combinations of circuits.

In the above-mentioned embodiment, the terminal device 4 and the client terminal 1002 use the radiobroadcast that is broadcast from the radio stations as receivable broadcast. In addition to it, the present invention allows the user to design it so that the terminal device 4 and the client terminal 1002 can receive the Internet radiobroadcast and the satellite radiobroadcast to obtain the related information (radiobroadcast information) or they receive the television broadcast that is broadcast by the television stations to obtain various kinds of broadcast information of the television programs of the television broadcast from the server on the network.

In the above-mentioned embodiment, we described the case in which the hardware circuit block, the functional circuit block and the program module are implemented to the terminal device 4 and the client terminal 1002. In addition to it, the present invention allows the user to implement them to the equipment other than the terminal device 4 and the client terminal 1002, for example, to cellular phones and personal computers. Once the hardware circuit block, the functional circuit block and the program module are implemented to a terminal device, it can carry out the processing similar to that of the above-mentioned terminal device 4 and the client terminal 1002.

INDUSTRIAL APPLICABILITY

The present invention can be applied to the service utilizing system that manages various kinds of terminal devices in addition to the terminal devices that receive the content data.

EXPLANATION OF REFERENCE NUMERALS

1 . . . SERVICE UTILIZING SYSTEM, 3A . . . TERMINAL MANAGEMENT SERVER, 3B . . . CONTENT SERVER, 4, 4A1 TO 4A3 AND 4B1 TO 4B2 . . . TERMINAL DEVICE, 11 . . . CPU, 21, 63 AND 73 . . . HARD DISK DRIVE, 22 . . . COMMUNICATION PROCESSING BLOCK, 34 . . . INTEGRATED SERVICE SERVER, 37 . . . COMMUNICATOR PROGRAM, 60, 70, 1023, 1050, 1070, 1090 AND 1110 . . . CONTROL BLOCK, 64 AND 74 . . . DATA COMMUNICATION PROCESSING BLOCK, 1000 . . . MUSIC-RELATED SERVICE PROVISION SYSTEM, 1002 . . . CLIENT TERMINAL, 1003 . . . PORTAL SERVER, 1004 . . . MUSIC DATA DISTRIBUTION SERVER, 1005 . . . CONTENT SALES SERVER, 1006 . . . RADIOBROADCAST INFORMATION DISTRIBUTION SERVER

The invention claimed is:

1. A service utilizing method, comprising:
transmitting, from a first service utilizing apparatus, registration information to a management apparatus according to an external input, the registration information including a first user identification information for use in utilizing a service in the first service utilizing apparatus together with a first password corresponding to the first user identification information, wherein the management apparatus stores second user identification information for at least a second apparatus, and the first user identification information is set to be different than the second user identification information;
subsequently transmitting, from the first service utilizing apparatus, a first apparatus name of the first service utilizing apparatus to the management apparatus, the first apparatus name being entered by a user of the first service utilizing apparatus and is selected independently of any apparatus names entered for the second apparatus such that the first apparatus name entered by the user of the first service utilizing apparatus is the same as an apparatus name entered for the second apparatus;
transmitting, from the first service utilizing apparatus to the management apparatus, disclosure setting information indicating whether or not the existence of the first service utilizing apparatus registered in the management apparatus is to be disclosed to other users;
receiving, at the first service utilizing apparatus, registration completion information transmitted from the management apparatus after completing registration with the first user identification information, the first password, and the first apparatus name entered by the user of the first service utilizing apparatus; and
managing the first service utilizing apparatus by the management apparatus.

2. The service utilizing method according to claim 1, further comprising:
transmitting the first user identification information and the first password as authentication request information to the management apparatus;
receiving an authentication results transmitted from the management apparatus after performing an authentication process according to the authentication information;
transmitting at least contents identification information about contents data to the management apparatus to request predetermined contents data depending on the received authentication results; and
receiving the contents data corresponding to the contents identification information transmitted from the management apparatus.

3. The service utilizing method according to claim 1, further comprising:
transmitting apparatus name request information about a request for a name of the second apparatus registered as associated with the second user identification information different from the first user identification information to the first service utilizing apparatus;
receiving the name of the second apparatus transmitted according to the apparatus name request information from the management apparatus; and
displaying the received name of the second apparatus.

4. The service utilizing method according to claim 3, further comprising:
transmitting distribution request information, contents identification information about predetermined contents data, and the name of the second apparatus to the management apparatus, wherein the distribution request information comprises the first apparatus name of the first service utilizing apparatus which is a distribution requester of contents data, wherein the second apparatus is a distribution destination of the contents data.

5. The service utilizing method according to claim 1, further comprising:
receiving the name of the second apparatus set to be published among the names of additional second apparatuses registered as associated with additional second user identification information.

6. The service utilizing method according to claim 1, further comprising:
transmitting the second user identification information and a second password to the management apparatus; and
displaying information about a second apparatus name corresponding to the second user identification information and the second password in an authentication reply transmitted from the management apparatus.

7. The service utilizing method according to claim 1, further comprising:
transmitting the second user identification information and a second password to the management apparatus;
displaying information about the service used in the apparatus name of the first service utilizing apparatus in an authentication reply transmitted from the management apparatus according to the second identification information about the service; and
transmitting information for permission of deleting the apparatus name registered in the management apparatus according to an external input.

8. The service utilizing method according to claim 1, further comprising:
storing the first apparatus name;
transmitting deletion permission request information about a request for permission of deleting the stored first apparatus name to the management apparatus;
receiving deletion permission information for permission of deleting the first apparatus name according to the deletion permission request information transmitted from the management apparatus;
deleting the stored first apparatus name according to the received deletion permission information;
transmitting, to the management apparatus, deletion request information about a request for deletion of the first apparatus name registered in the management apparatus; and
receiving deletion completion information transmitted after completing deleting the first apparatus name and notification information according to the deletion request information from the management apparatus.

9. The service utilizing method according to claim 1, wherein the first apparatus name is created by the user of the first service utilizing apparatus.

10. A first service utilizing apparatus, comprising:
first registration information transmitting means for transmitting registration information to a management apparatus according to an external input, the registration information including first user identification information for use in utilizing a service in the first service utilizing apparatus together with a first password corresponding to the first user identification information, wherein the management apparatus stores second user identification information for at least a second apparatus, and the first user identification information is set to be different than the second user identification information;
an input operation means configured to receive, as input, a first apparatus name that is entered by a user of the first service utilizing apparatus and that is selected independently of any apparatus names entered for the second apparatus such that the first apparatus name entered by the user of the first service utilizing apparatus is the same as an apparatus name entered for the second apparatus;
second registration transmitting means for subsequently transmitting the first apparatus name of the first service utilizing apparatus to the management apparatus;
disclosure setting information transmitting means for transmitting, to the management apparatus, disclosure setting information indicating whether or not the existence of the first service utilizing apparatus registered in the management apparatus is to be disclosed to other users; and
registration completion information reception means for receiving registration completion information transmitted from the management apparatus after completing registration with the first user identification information, the first password, and the first apparatus name entered by the user of the first service utilizing apparatus, wherein
the management apparatus manages the first service utilizing apparatus.

11. The first service utilizing apparatus according to claim 10, wherein the first registration information transmitting means transmits the first user identification information and the first password as authentication request information to the management apparatus.

12. The first service utilizing apparatus according to claim 10, wherein the first apparatus name is created by the user of the first service utilizing apparatus.

13. A non-transitory computer readable storage medium including computer readable program codes embodied in the computer readable storage medium that, when executed by a processor, cause the processor to perform:
transmitting registration information to a management apparatus according to an external input, the registration information including a first user identification information for use in utilizing a service in a first service utilizing apparatus together with a first password corresponding to the first user identification information, wherein the management apparatus stores second user identification information for at least a second apparatus, and the first user identification information is set to be different than the second user identification information;
subsequently transmitting a first apparatus name of the first service utilizing apparatus to the management apparatus, the first apparatus name being entered by a user of the first service utilizing apparatus and is selected independently of any apparatus names entered for the second apparatus such that the first apparatus name entered by the user of the first service utilizing apparatus is the same as an apparatus name entered for the second apparatus;
transmitting, to the management apparatus, disclosure setting information indicating whether or not the existence of the first service utilizing apparatus registered in the management apparatus is to be disclosed to other users;
receiving registration completion information transmitted from the management apparatus after completing registration with the first user identification information, the first password, and the first apparatus name entered by the user of the first service utilizing apparatus; and
managing the first service utilizing apparatus by the management apparatus.

14. The non-transitory computer readable storage medium according to claim 13, wherein the first apparatus name is created by the user of the first service utilizing apparatus.

15. A management method for managing a first service utilizing apparatus which uses a predetermined service, comprising:
receiving, at a management apparatus, registration information according to an external input which is transmitted from the first service utilizing apparatus, the registration information including a first user identification information for use in utilizing a service in the first service utilizing apparatus together with a first password corresponding to the first user identification information, wherein the management apparatus stores second user identification information for at least a second apparatus, and the first user identification information is set to be different than the second user identification information;

subsequently receiving, at the management apparatus, a first apparatus name of the first service utilizing apparatus;

receiving, at the management apparatus, disclosure setting information indicating whether or not the existence of the first service utilizing apparatus registered in the management apparatus is to be disclosed to other users;

registering the first user identification information, the first password, and the first apparatus name of the registration information as associated with one another;

transmitting registration completion information indicating completion of registration of the first user identification information, the first password, and the first apparatus name entered by the user of the first service utilizing apparatus, when the registration is completed; and managing, by the management apparatus, overlapping apparatus names, the first apparatus name being entered by the user of the first service utilizing apparatus and being selected independently of any apparatus names entered for the second apparatus, the first apparatus name entered by the user of the first service utilizing apparatus being the same as the second apparatus name.

16. The management method according to claim 15, wherein
in the registering, when the first user identification information, the first password, and the first apparatus name received from the first service utilizing apparatus are associated and registered, and the second user identification information, a second password, and a second apparatus name identical to the first apparatus name are received from the second apparatus, and when the second user identification information is different from the first user identification information, the second user identification information, the second password, and the second apparatus name are associated with one another and registered.

17. The management method according to claim 16, further comprising:
receiving authentication request information comprising the first user identification information and the first password transmitted from the first service utilizing apparatus;
performing an authentication process based on the received first user identification information and first password;
transmitting authentication results of the authentication process to the first service utilizing apparatus as a result of transmitting the authentication results to the first service utilizing apparatus;
receiving contents identification information about at least predetermined contents data for request of the contents data transmitted from the first service utilizing apparatus; and
transmitting the contents data corresponding to the received contents identification information to the first service utilizing apparatus.

18. The management method according to claim 17, further comprising:
performing a user authentication process based on the first user identification information and the first password received in the authentication request information receiving, issuing an authentication session ID which is a session ID with the first service utilizing apparatus when authentication is allowed, and transmitting the issued authentication session ID to the first service utilizing apparatus;
receiving the authentication session ID returned from the first service utilizing apparatus, receiving identification information for identification of the server providing the contents, performing a user authentication process based on the received authentication session ID, issuing an authentication ticket corresponding to the received identification information when the authentication is allowed, and transmitting the issued authentication ticket to the first service utilizing apparatus;
receiving from the server an authentication ticket transmitted from the first service utilizing apparatus to the server and then performing an authentication process, and transmitting information about certification acknowledgement when the authentication is allowed to the server; and
issuing a service session ID which is a session ID with the first service utilizing apparatus according to the received information about certification acknowledgement, and transmitting the issued service session ID to the first service utilizing apparatus, wherein,
in the receiving, the server receives the service session ID and the contents identification information, and
in the transmitting, the authentication process is performed based on the received service session ID, and the contents data corresponding to the contents identification information is transmitted to the service using apparatus when the authentication is allowed.

19. The management method according to claim 16, further comprising:
receiving apparatus name request information about a request for the second apparatus name associated with the second user identification information other than the first user identification information from the first service utilizing apparatus; and
transmitting the name of the second apparatus to the first service utilizing apparatus according to the apparatus name request information.

20. The management method according to claim 19, further comprising:
registering the received disclosure setting information and the first apparatus name of the first service utilizing apparatus as associated with each other.

21. The management method according to claim 20, further comprising:
transmitting the second apparatus name of the second apparatus set to be published among the names of second apparatuses registered as associated with the second user identification information.

22. The management method according to claim 19, further comprising:
receiving distribution request information which is transmitted from the first service utilizing apparatus as a distribution requester of predetermined contents data and comprising the apparatus name of the first service utilizing apparatus, contents identification information about the contents data, and the second apparatus name of the second service utilizing apparatus which is a provider of the contents data; and
transmitting the contents data according to the received distribution request information to the second service utilizing apparatus.

23. The management method according to claim 16, further comprising:
authenticating the first user identification information and the first password transmitted from the first service utilizing apparatus; and transmitting information about an apparatus name corresponding to the first user identification information and the first password to the first service utilizing apparatus together with an authentication reply corresponding to the authentication.

24. The management method according to claim 16, further comprising:
authenticating the first user identification information and the first password transmitted from the first service utilizing apparatus; and
transmitting identification information about a service used by the first apparatus name of the first service utilizing apparatus together with an authentication reply to the first service utilizing apparatus.

25. The management method according to claim 16, further comprising:
receiving deletion permission request information about a request for permission of deleting the first apparatus name stored in the first service utilizing apparatus transmitted from the first service utilizing apparatus;
transmitting deletion permission information for permission of deleting the first apparatus name stored in the first service utilizing apparatus according to the deletion permission request information to the service using apparatus;
receiving deletion request information about a request for deletion of the registered apparatus name which is transmitted as a result of the deletion of the first apparatus name according to the deletion permission information from the first service utilizing apparatus;
deleting the registered apparatus name and disclosure setting information according to the deletion request information; and
transmitting deletion completion information indicating that the deletion of the apparatus name is completed to the service using apparatus.

26. The management method according to claim 15, wherein the first apparatus name is created by the user of the first service utilizing apparatus.

27. A management apparatus which manages a first service utilizing apparatus using a predetermined service, comprising:
first registration information reception means for receiving registration information according to an external input, which is transmitted from the first service utilizing apparatus, the registration information including a first user identification information for use in utilizing a service in the first service utilizing apparatus together with a first password corresponding to the first user identification information, wherein the management apparatus stores second user identification for at least a second apparatus, and the first user identification information is set to be different than the second user identification;
second registration information means for subsequently receiving a first apparatus name of the first service utilizing apparatus;
disclosure setting information receiving means for receiving disclosure setting information from the first service utilizing apparatus indicating whether or not the existence of the first service utilizing apparatus registered in the management apparatus is to be disclosed to other users;
registration means for registering the first user identification information, the first password, and the first apparatus name in the received registration information as associated with one another;
registration completion information transmitting means for transmitting registration completion information indicating completion of the registration to the first service utilizing apparatus when the registration of the first user identification information, the first password, and the first apparatus name entered by the user of the first service utilizing apparatus, is completed; and
apparatus name management means for managing overlapping apparatus names, the first apparatus name being entered by the user of the first service utilizing apparatus and being selected independently of any apparatus names entered for the second apparatus, the first apparatus name entered by the user of the first service utilizing apparatus being the same as the second apparatus name.

28. The management apparatus according to claim 27, wherein the first apparatus name is created by the user of the first service utilizing apparatus.

29. A non-transitory computer readable storage medium including computer program codes embodied in the computer readable storage medium that, when executed by a processor, cause the processor to perform:
receiving registration information according to an external input, which is transmitted from a first service utilizing apparatus, the registration information including a first user identification information for use in utilizing a service in the first service utilizing apparatus together with a first password corresponding to the user identification information, wherein the management apparatus stores second user identification for at least a second apparatus, and the first user identification information is set to be different than the second user identification;
subsequently receiving a first apparatus name of the first service utilizing apparatus;
receiving disclosure setting information from the first service utilizing apparatus indicating whether or not the existence of the first service utilizing apparatus registered in the management apparatus is to be disclosed to other users;
registering the first user identification information, the first password, and the first apparatus name in the received registration information as associated with one another;
transmitting registration completion information indicating completion of the registration to the first service utilizing apparatus when the registration of the first user identification information, the first password, and the first apparatus name entered by the user of the first service utilizing apparatus, is completed; and
managing overlapping apparatus names, the first apparatus name being entered by the user of the first service utilizing apparatus and being selected independently of any apparatus names entered for the second apparatus, the first apparatus name entered by the user of the first service utilizing apparatus being is same as the second apparatus name.

30. The non-transitory computer readable storage medium according to claim 29, wherein the first apparatus name is created by the user of the first service utilizing apparatus.

* * * * *